US012294332B2

(12) United States Patent
 Poivet

(10) Patent No.: US 12,294,332 B2
(45) Date of Patent: May 6, 2025

(54) SOLAR CARPORTS, SOLAR-TRACKING CARPORTS, AND METHODS

(71) Applicant: KBFX LLC, Lewes, DE (US)

(72) Inventor: Alain Poivet, Palo Alto, CA (US)

(73) Assignee: KBFX LLC, Lewes, DE (US)

( * ) Notice: Subject to any disclaimer, the term of this patent is extended or adjusted under 35 U.S.C. 154(b) by 0 days.

(21) Appl. No.: 17/374,805

(22) Filed: Jul. 13, 2021

(65) Prior Publication Data

US 2022/0182009 A1    Jun. 9, 2022

Related U.S. Application Data

(63) Continuation of application No. 16/505,537, filed on Jul. 8, 2019, now Pat. No. 11,063,553, which is a
(Continued)

(51) Int. Cl.
*H02S 30/10*    (2014.01)
*E04B 1/343*    (2006.01)
(Continued)

(52) U.S. Cl.
CPC .......... *H02S 30/10* (2014.12); *E04B 1/34363* (2013.01); *G05D 3/105* (2013.01);
(Continued)

(58) Field of Classification Search
CPC .... E04B 1/0046; E04B 1/34363; E04B 7/163; E04B 2001/2454; E04B 2001/2463;
(Continued)

(56) References Cited

U.S. PATENT DOCUMENTS 3,800,358 A    4/1974  Ryan
3,895,604 A    7/1975  Ryan
(Continued)

FOREIGN PATENT DOCUMENTS

DE        20219173       2/2004
DE     202005007855      8/2005
(Continued)

OTHER PUBLICATIONS

U.S. Appl. No. 15/155,015, Poivet.
(Continued)

*Primary Examiner* — James M Ference
(74) *Attorney, Agent, or Firm* — Sheppard Mullin Richter & Hampton LLP

(57) ABSTRACT

A solar tracking carport comprises a supporting structure including a foundation and at least two columns; a three-dimensionally rigid canopy deck having a length from a first edge to a second edge of at least one car, the deck including one or more upper blocks, each upper block being rigid in its longitudinal direction, each upper block including at least one solar panel; a deck frame configured to support the one or more upper blocks, the deck frame including a torque transmitting member; a rotation enabling connection configured to rotatably connect the torque transmitting member to the at least two columns; and a drive system configured to control tilting of the deck about the supporting structure over one axis of rotation to a first maximum angle in a first direction and to a second maximum angle in a second direction.

22 Claims, 16 Drawing Sheets

Related U.S. Application Data continuation-in-part of application No. 16/237,517, filed on Dec. 31, 2018, now Pat. No. 11,283,393, which is a continuation of application No. 14/970,431, filed on Dec. 15, 2015, now Pat. No. 10,277,159.

(60) Provisional application No. 62/694,835, filed on Jul. 6, 2018.

(51) Int. Cl.

| | | |
|---|---|---|
| *G05D 3/10* | (2006.01) | |
| *H02S 20/24* | (2014.01) | |
| *H02S 20/32* | (2014.01) | |
| *H02S 30/20* | (2014.01) | |
| *E04B 7/16* | (2006.01) | |
| *E04H 6/02* | (2006.01) | |

(52) U.S. Cl.
CPC .............. *H02S 20/24* (2014.12); *H02S 20/32* (2014.12); *H02S 30/20* (2014.12); *E04B 7/163* (2013.01); *E04H 6/025* (2013.01)

(58) Field of Classification Search
CPC . E04B 2001/2496; E04H 6/025; G05D 3/105; H02S 20/24; H02S 20/32; H02S 30/10; H02S 30/20; Y02B 10/10; Y02B 10/50
See application file for complete search history.

(56) References Cited

U.S. PATENT DOCUMENTS

| | | | |
|---|---|---|---|
| 4,000,850 A | 1/1977 | Diggs | |
| 4,010,733 A | 3/1977 | Moore | |
| 4,014,133 A | 3/1977 | Brown | |
| 4,029,080 A | 6/1977 | Warren | |
| 4,033,327 A | 7/1977 | Pei | |
| 4,073,283 A | 2/1978 | Lof | |
| 4,096,861 A | 6/1978 | Bowles | |
| 4,098,260 A | 7/1978 | Goettl | |
| 4,114,594 A | 9/1978 | Meyer | |
| 4,119,084 A | 10/1978 | Eckels | |
| 4,136,669 A | 1/1979 | Lane | |
| 4,150,660 A | 4/1979 | Peters | |
| 4,171,694 A | 10/1979 | Parker | |
| 4,172,739 A * | 10/1979 | Tassen | H02S 20/32 353/3 |
| 4,174,703 A | 11/1979 | Blakey | |
| 4,175,542 A | 11/1979 | Duchene | |
| 4,178,910 A | 12/1979 | Gramer | |
| 4,184,476 A | 1/1980 | McArthur | |
| 4,184,479 A | 1/1980 | Ratliff, Jr. | |
| 4,212,291 A | 7/1980 | Erb | |
| 4,215,677 A | 8/1980 | Erickson | |
| 4,223,667 A | 9/1980 | Paymal | |
| 4,233,958 A | 11/1980 | Heden | |
| 4,239,555 A | 12/1980 | Scharlack | |
| 4,274,395 A | 6/1981 | Bangs | |
| 4,280,484 A | 7/1981 | Mancosu | |
| 4,324,232 A | 4/1982 | Quiroz | |
| 4,332,239 A | 6/1982 | Hotine | |
| 4,334,521 A | 6/1982 | Jacoby | |
| 4,375,637 A | 3/1983 | Desjardins | |
| 4,393,859 A | 7/1983 | Marossy | |
| 4,426,999 A | 1/1984 | Evans | |
| 4,526,161 A | 7/1985 | Kaicher | |
| 4,590,719 A * | 5/1986 | McKibbin | E04H 12/34 52/745.18 |
| 4,594,470 A | 6/1986 | Headrick | |
| 4,620,771 A * | 11/1986 | Dominguez | F21S 11/00 136/246 |
| 4,649,899 A * | 3/1987 | Moore | F24S 50/20 250/203.4 |
| 4,677,248 A | 6/1987 | Lacey | |
| 4,718,404 A | 1/1988 | Sadler | |
| 4,724,645 A | 2/1988 | Pigout | |
| 4,751,800 A | 6/1988 | Kida | |
| 4,788,746 A | 12/1988 | Idler | |
| 4,883,340 A | 11/1989 | Dominguez | |
| 4,917,004 A | 4/1990 | Okamoto | |
| 4,928,444 A | 5/1990 | Horie | |
| 4,936,096 A | 6/1990 | Vanderjagt | |
| 4,942,698 A | 7/1990 | Kumagai | |
| 5,038,517 A | 8/1991 | Talbott | |
| 5,092,939 A | 3/1992 | Nath | |
| 5,109,566 A | 5/1992 | Kobayashi | |
| 5,134,827 A | 8/1992 | Hartman | |
| 5,164,020 A | 11/1992 | Wagner | |
| 5,180,442 A | 1/1993 | Elias | |
| 5,189,851 A | 3/1993 | Omika | |
| 5,228,924 A * | 7/1993 | Barker | H02S 20/30 136/246 |
| 5,261,184 A | 11/1993 | Appeldorn | |
| 5,367,843 A | 11/1994 | Hirai | |
| 5,528,789 A | 6/1996 | Rostamo | |
| 5,571,338 A | 11/1996 | Kadonome | |
| 5,576,947 A | 11/1996 | Wienkop | |
| 5,622,078 A | 4/1997 | Mattson | |
| 5,787,653 A | 8/1998 | Sakai | |
| 5,802,762 A | 9/1998 | Stonecypher | |
| 5,813,169 A | 9/1998 | Engerman | |
| 5,968,287 A | 10/1999 | Nath | |
| 6,005,236 A | 12/1999 | Phelan et al. | |
| 6,065,252 A | 5/2000 | Norsen | |
| 6,065,255 A | 5/2000 | Stern | |
| 6,105,317 A | 8/2000 | Tomiuchi | |
| 6,108,597 A | 8/2000 | Kirchner | |
| 6,111,189 A | 8/2000 | Garvison | |
| 6,354,289 B1 | 3/2002 | Ridett | |
| 6,559,371 B2 | 5/2003 | Shingleton | |
| 6,563,040 B2 | 5/2003 | Hayden | |
| 6,590,363 B2 | 7/2003 | Teramoto | |
| 6,617,507 B2 | 9/2003 | Mapes | |
| 6,672,018 B2 | 1/2004 | Shingleton | |
| 6,691,701 B1 | 2/2004 | Roth | |
| 6,799,398 B1 | 10/2004 | Plevyak | |
| 7,260,918 B2 | 8/2007 | Liebendorfer | |
| 7,299,591 B2 | 11/2007 | Broatch | |
| 7,435,897 B2 | 10/2008 | Russell | |
| 7,454,990 B2 | 11/2008 | Hardcastle, III | |
| 7,487,771 B1 | 2/2009 | Eiffert et al. | |
| 7,520,091 B2 * | 4/2009 | Friedman | E04B 7/163 52/63 |
| 7,531,741 B1 | 5/2009 | Melton | |
| 7,592,537 B1 | 9/2009 | West | |
| 7,600,349 B2 | 10/2009 | Liebendorfer | |
| 7,661,391 B2 | 2/2010 | Sia | |
| 7,703,246 B2 | 4/2010 | Chang | |
| 7,745,723 B2 | 6/2010 | Dyson | |
| 7,748,175 B2 | 7/2010 | Liebendorfer | |
| 7,774,998 B2 | 8/2010 | Aschenbrenner | |
| 7,923,624 B2 | 4/2011 | Borton | |
| 7,956,280 B2 | 6/2011 | Kobayashi | |
| 8,039,733 B2 | 10/2011 | Kobayashi | |
| 8,136,783 B2 | 3/2012 | Pietrzak | |
| 8,181,402 B2 | 5/2012 | Tsuzuki | |
| 8,324,496 B1 | 12/2012 | Gross | |
| 8,336,261 B2 | 12/2012 | Hosking | |
| 8,338,771 B2 | 12/2012 | Park | |
| 8,344,239 B2 | 1/2013 | Plaisted | |
| 8,347,556 B2 | 1/2013 | Stelmaszek | |
| 8,371,076 B2 | 2/2013 | Jones et al. | |
| 8,426,792 B2 | 4/2013 | Olsson | |
| 8,459,249 B2 | 6/2013 | Corio | |
| 8,492,645 B1 | 7/2013 | Strahm | |
| 8,578,929 B2 * | 11/2013 | Krabbe | F24S 25/50 136/246 |
| 8,646,230 B2 | 2/2014 | Powers, III | |
| 8,794,583 B2 | 8/2014 | Poivet | |
| 8,939,143 B2 | 1/2015 | Zurtis | |
| 8,972,069 B1 | 3/2015 | Hudson | |
| 8,991,117 B1 | 3/2015 | Walker et al. | |
| 9,275,391 B2 | 3/2016 | Thramann | |
| 9,466,749 B1 | 10/2016 | Au | |

(56) References Cited

U.S. PATENT DOCUMENTS

| | | |
|---|---|---|
| 9,581,678 B2 | 2/2017 | Corio |
| 10,042,030 B2 | 8/2018 | Corio |
| 10,277,159 B2 | 4/2019 | Poivet |
| 11,894,796 B2 | 2/2024 | Rodrigues et al. |
| 2002/0179138 A1 | 12/2002 | Lawheed |
| 2003/0015636 A1 | 1/2003 | Liebendorfer |
| 2003/0201009 A1 | 10/2003 | Nakajima |
| 2004/0011354 A1 | 1/2004 | Erling |
| 2004/0124711 A1 | 7/2004 | Muchow |
| 2004/0144043 A1 | 7/2004 | Stevenson |
| 2004/0187907 A1 | 9/2004 | Morgal |
| 2004/0221886 A1 | 11/2004 | Oono |
| 2004/0231089 A1 | 11/2004 | Vilarasau Alegre |
| 2005/0050811 A1 | 3/2005 | Yen |
| 2005/0092218 A1 | 5/2005 | Saucier |
| 2005/0115603 A1 | 6/2005 | Yoshida |
| 2005/0144903 A1 | 7/2005 | Ceria |
| 2005/0166955 A1 | 8/2005 | Nath |
| 2005/0171644 A1 | 8/2005 | Tani |
| 2006/0086382 A1 | 4/2006 | Plaisted |
| 2006/0118163 A1 | 6/2006 | Plaisted |
| 2006/0277845 A1 | 12/2006 | Warfield |
| 2007/0023080 A1 | 2/2007 | Thurner et al. |
| 2007/0035841 A1 | 2/2007 | Kinney |
| 2007/0079861 A1 | 4/2007 | Morali |
| 2007/0132433 A1 | 6/2007 | Hehmann et al. |
| 2007/0199590 A1 | 8/2007 | Tanaka |
| 2007/0219645 A1 | 9/2007 | Thomas et al. |
| 2007/0227574 A1 | 10/2007 | Cart |
| 2007/0289227 A1 | 12/2007 | Parker |
| 2008/0012310 A1 | 1/2008 | Weaver |
| 2008/0029148 A1 | 2/2008 | Thompson |
| 2008/0035196 A1 | 2/2008 | Monus |
| 2008/0053008 A1 | 3/2008 | Ohkoshi |
| 2008/0053517 A1 | 3/2008 | Plaisted |
| 2008/0087275 A1 | 4/2008 | Sade |
| 2008/0139106 A1 | 6/2008 | Vachon |
| 2008/0176504 A1 | 7/2008 | McClendon |
| 2008/0218307 A1 | 9/2008 | Schoettle |
| 2008/0236571 A1 | 10/2008 | Keshner |
| 2008/0245399 A1 | 10/2008 | DeLiddo |
| 2008/0245404 A1 | 10/2008 | DeLiddo |
| 2008/0264467 A1 | 10/2008 | Doko |
| 2008/0302407 A1 | 12/2008 | Kobayashi |
| 2008/0308091 A1 | 12/2008 | Corio |
| 2008/0313976 A1 | 12/2008 | Allen |
| 2009/0032089 A1 | 2/2009 | Chen et al. |
| 2009/0045936 A1 | 2/2009 | Miller |
| 2009/0050194 A1 | 2/2009 | Noble |
| 2009/0056698 A1 | 3/2009 | Johnson et al. |
| 2009/0095283 A1 | 4/2009 | Curtis et al. |
| 2009/0165843 A1 | 7/2009 | Horioka |
| 2009/0188487 A1 | 7/2009 | Jones et al. |
| 2009/0223142 A1 | 9/2009 | Shingleton |
| 2009/0241994 A1 | 10/2009 | Lee |
| 2009/0250095 A1 | 10/2009 | Thorley |
| 2009/0266353 A1 | 10/2009 | Lee |
| 2009/0277496 A1 | 11/2009 | Khazeni et al. |
| 2009/0293864 A1 | 12/2009 | Augenbraun et al. |
| 2010/0000165 A1 | 1/2010 | Koller |
| 2010/0000570 A1 | 1/2010 | Mertins |
| 2010/0000596 A1 | 1/2010 | Mackler |
| 2010/0006088 A1 | 1/2010 | Campbell et al. |
| 2010/0018570 A1 | 1/2010 | Cashion et al. |
| 2010/0024861 A1 | 2/2010 | Cabanillas Saldana |
| 2010/0043781 A1 | 2/2010 | Jones et al. |
| 2010/0059042 A1* | 3/2010 | Chang ............... G05D 3/105 126/684 |
| 2010/0132769 A1 | 6/2010 | Potter |
| 2010/0139645 A1 | 6/2010 | Whipple et al. |
| 2010/0155547 A1 | 6/2010 | Kobayashi |
| 2010/0175685 A1 | 7/2010 | Campbell et al. |
| 2010/0175741 A1 | 7/2010 | Thorne |
| 2010/0193012 A1 | 8/2010 | Klammer et al. |
| 2010/0193013 A1 | 8/2010 | Kong |
| 2010/0206294 A1 | 8/2010 | Blair |
| 2010/0206302 A1 | 8/2010 | Cheung et al. |
| 2010/0206379 A1 | 8/2010 | Littau et al. |
| 2010/0212654 A1 | 8/2010 | Alejo Trevijano |
| 2010/0223864 A1 | 9/2010 | Dube |
| 2010/0235206 A1 | 9/2010 | Miller |
| 2010/0236183 A1 | 9/2010 | Cusson et al. |
| 2010/0237028 A1 | 9/2010 | Cusson |
| 2010/0237029 A1 | 9/2010 | Cusson et al. |
| 2010/0258110 A1 | 10/2010 | Krabbe |
| 2010/0282315 A1 | 11/2010 | Gilbert |
| 2010/0307991 A1 | 12/2010 | Belikoff et al. |
| 2011/0000515 A1 | 1/2011 | Patwardhan et al. |
| 2011/0005128 A1 | 1/2011 | Chuang et al. |
| 2011/0023938 A1 | 2/2011 | Buchel et al. |
| 2011/0023940 A1 | 2/2011 | Do et al. |
| 2011/0030672 A1 | 2/2011 | Olsson |
| 2011/0068244 A1 | 3/2011 | Hartelius et al. |
| 2011/0073161 A1 | 3/2011 | Scanlon |
| 2011/0079266 A1 | 4/2011 | Pan |
| 2011/0094503 A1 | 4/2011 | Jones et al. |
| 2011/0094559 A1 | 4/2011 | Potter |
| 2011/0126378 A1 | 6/2011 | Ota |
| 2011/0126884 A1 | 6/2011 | Dritsas |
| 2011/0137458 A1 | 6/2011 | Histani |
| 2011/0167735 A1 | 7/2011 | Sumner |
| 2011/0209745 A1 | 9/2011 | Korman |
| 2011/0215213 A1 | 9/2011 | Poivet |
| 2011/0220596 A1 | 9/2011 | Cusson et al. |
| 2011/0240007 A1 | 10/2011 | Currier |
| 2011/0273304 A1 | 11/2011 | Pryor |
| 2011/0284057 A1 | 11/2011 | Swahn |
| 2011/0290306 A1 | 12/2011 | Roberts |
| 2011/0290307 A1 | 12/2011 | Workman et al. |
| 2012/0006381 A1 | 1/2012 | Sorgento |
| 2012/0009009 A1* | 1/2012 | Bub ............... F16B 7/18 403/204 |
| 2012/0023728 A1 | 2/2012 | Britcher et al. |
| 2012/0027550 A1 | 2/2012 | Bellacicco |
| 2012/0031862 A1 | 2/2012 | Belikoff et al. |
| 2012/0117890 A1 | 5/2012 | Adell Argiles |
| 2012/0125399 A1 | 5/2012 | Schatz et al. |
| 2012/0125401 A1 | 5/2012 | DeVillier |
| 2012/0132262 A1 | 5/2012 | Sagayama |
| 2012/0152877 A1 | 6/2012 | Tadayon |
| 2012/0167957 A1 | 7/2012 | Verfuerth et al. |
| 2012/0199266 A1 | 8/2012 | Potter |
| 2012/0216851 A1 | 8/2012 | Jang |
| 2012/0216852 A1 | 8/2012 | Almy et al. |
| 2012/0223033 A1 | 9/2012 | Molek |
| 2012/0234377 A1 | 9/2012 | Erickson |
| 2012/0255540 A1 | 10/2012 | Hutchin |
| 2012/0260968 A1 | 10/2012 | Enrile Medina et al. |
| 2012/0291847 A1 | 11/2012 | Rowe, Jr. et al. |
| 2012/0297704 A1 | 11/2012 | Glynn |
| 2013/0033222 A1 | 2/2013 | Hixson et al. |
| 2013/0056614 A1 | 3/2013 | Balachandreswaran et al. |
| 2013/0118099 A1 | 5/2013 | Scanlon |
| 2013/0139468 A1 | 6/2013 | Poivet |
| 2013/0178951 A1 | 7/2013 | Sandler |
| 2013/0192659 A1* | 8/2013 | Upton ............... H01L 31/052 136/246 |
| 2013/0269181 A1 | 10/2013 | McBride et al. |
| 2013/0319508 A1 | 12/2013 | Sinclair et al. |
| 2014/0041321 A1 | 2/2014 | Poivet |
| 2014/0069481 A1* | 3/2014 | Eom ............... F24S 30/48 136/246 |
| 2014/0137924 A1 | 5/2014 | Hollabaugh |
| 2014/0150251 A1 | 6/2014 | Erickson |
| 2014/0166069 A1 | 6/2014 | Kirchner et al. |
| 2014/0172176 A1 | 6/2014 | Deilman |
| 2014/0196387 A1 | 7/2014 | Neito et al. |
| 2014/0196764 A1 | 7/2014 | Clavelle et al. |
| 2014/0216522 A1 | 8/2014 | Au |
| 2014/0259899 A1 | 9/2014 | Poivet |
| 2014/0288714 A1 | 9/2014 | Poivet |
| 2014/0338659 A1 | 11/2014 | Corio |
| 2014/0366464 A1 | 12/2014 | Rodrigues et al. |
| 2015/0000721 A1 | 1/2015 | Au |

(56) References Cited

U.S. PATENT DOCUMENTS

| | | |
|---|---|---|
| 2015/0000722 A1 | 1/2015 | Au |
| 2015/0001356 A1 | 1/2015 | Au |
| 2015/0054413 A1 | 2/2015 | Chen |
| 2015/0056614 A1 | 2/2015 | Mikolajczyk et al. |
| 2015/0108314 A1 | 4/2015 | Ceron Garcia |
| 2015/0226826 A1 | 8/2015 | Quero Reboul et al. |
| 2015/0234031 A1 | 8/2015 | Corio |
| 2015/0244316 A1 | 8/2015 | Singer et al. |
| 2015/0256124 A1 | 9/2015 | Singer et al. |
| 2015/0316639 A1 | 11/2015 | Russ et al. |
| 2015/0331972 A1 | 11/2015 | McClure |
| 2015/0357966 A1 | 12/2015 | Noriega Gil et al. |
| 2015/0372636 A1 | 12/2015 | Menard |
| 2015/0377518 A1 | 12/2015 | Maxey et al. |
| 2016/0308488 A1 | 10/2016 | Liu |
| 2016/0365825 A1 | 12/2016 | Poivet |
| 2016/0365830 A1 | 12/2016 | Bailey |
| 2016/0377325 A1 | 12/2016 | Au |
| 2017/0138638 A1 | 5/2017 | Lecube Inchausti et al. |
| 2017/0160372 A1 | 6/2017 | Corio |
| 2017/0179872 A1 | 6/2017 | Almy et al. |
| 2017/0294873 A1 | 10/2017 | Mori et al. |
| 2017/0318919 A1 | 11/2017 | Gharabegian |
| 2018/0175783 A1 | 6/2018 | Schimelpfenig |
| 2018/0302024 A1* | 10/2018 | Chaouki Almagro .. H02S 20/32 |
| 2018/0348331 A1 | 12/2018 | Corio |
| 2022/0182009 A1* | 6/2022 | Poivet ................... E04B 1/0046 |

FOREIGN PATENT DOCUMENTS

| | | | | |
|---|---|---|---|---|
| DE | 202005012993 | | 11/2005 | |
| DE | 102005039495 | | 3/2007 | |
| DE | 202011105918 U1 | * | 12/2011 | ............... F24J 2/541 |
| EP | 2422889 | | 2/2012 | |
| FR | 2938566 | | 1/2012 | |
| JP | 06229080 | | 8/1994 | |
| JP | H1113224 | | 1/1999 | |
| JP | 2000154625 | | 6/2000 | |
| JP | 2001164713 | | 6/2001 | |
| JP | 2003343057 | | 12/2003 | |
| WO | 199835766 | | 8/1998 | |
| WO | 1999047761 | | 9/1999 | |
| WO | WO-2008154945 A1 | * | 12/2008 | ............. F24S 25/50 |
| WO | 2010055235 | | 5/2010 | |
| WO | WO-2014082653 A1 | * | 6/2014 | ............ F24S 30/425 |
| WO | 2014145988 | | 9/2014 | |
| WO | 2014159566 | | 10/2014 | |

OTHER PUBLICATIONS

U.S. Appl. No. 15/168,884, Poivet.
U.S. Appl. No. 15/451,340, Poivet.
U.S. Appl. No. 16/505,537, Poivet.
SerbotSwitzerland, "Serbot Product Range," YouTube video located at https://www.youtube.com/watch?v=sfTE3ZgmQ2c, Jan. 14, 2013.
International Application No. PCT/FR2009/001322, International Search Report and Written Opinion mailed Jan. 29, 2010.
International Application No. PCT/US2014/024219, International Search Report and Written Opinion mailed Jul. 14, 2014.
International Application No. PCT/US2014/030855, International Search Report and Written Opinion mailed Aug. 18, 2014.
International Application No. PCT/US2014/030922, International Search Report and Written Opinion mailed Aug. 20, 2014.
International Application No. PCT/US2019/040884, International Search Report and Written Opinion mailed Sep. 30, 2019, 10 pages.

* cited by examiner

SOLAR CARPORTS, SOLAR-TRACKING CARPORTS, AND METHODS

CLAIM OF PRIORITY

This application is a continuation of U.S. patent application Ser. No. 16/505,537, filed Jul. 8, 2019, entitled "Solar Carports, Solar-Tracking Carports, and Methods", now U.S. Pat. No. 11,063,553, which is a continuation-in-part of U.S. patent application Ser. No. 16/237,517 filed on Dec. 31, 2018 by inventor Alain Poivet entitled "Movable Building Crown," which is a continuation of U.S. patent application Ser. No. 14/970,431 filed on Dec. 15, 2015 by inventor Alain Poivet entitled "Finished Multi-Sensor Units," now U.S. Pat. No. 10,277,159, and claims priority to and incorporates by reference U.S. Provisional Application Ser. No. 62/694,835, entitled "Solar Carports", by inventor Alain Poivet, filed on Jul. 6, 2018.

INCORPORATION BY REFERENCE

The following applications are hereby incorporated by reference herein: 1) U.S. patent application Ser. No. 16/237,517 filed Dec. 31, 2018; 2) U.S. patent application Ser. No. 15/451,340 filed Mar. 6, 2017; 3) U.S. patent application Ser. No. 15/168,884 filed May 31, 2016; 4) U.S. patent application Ser. No. 15/155,015 filed May 14, 2016; 5) U.S. patent application Ser. No. 14/970,431 filed Dec. 15, 2015, now U.S. Pat. No. 10,277,159; 6) U.S. patent application Ser. No. 14/217,427 filed Mar. 17, 2014; 7) U.S. patent application Ser. No. 14/217,288 filed Mar. 17, 2014; 8) U.S. patent application Ser. No. 13/831,496 filed Mar. 14, 2013; 9) U.S. patent application Ser. No. 13/760,965 filed Feb. 6, 2013; 10) U.S. patent application Ser. No. 13/129,378 filed May 13, 2011, now U.S. Pat. No. 8,794,583; 11) U.S. Provisional Application Ser. No. 62/694,835 filed Jul. 6, 2018; 12) U.S. Provisional Application Ser. No. 62/161,169 filed May 13, 2015; 13) U.S. Provisional Application Ser. No. 62/092,793 filed Dec. 16, 2014; 14) U.S. Provisional Application Ser. No. 61/801,089 filed Mar. 15, 2013; 15) U.S. Provisional Application Ser. No. 61/789,607 filed Mar. 15, 2013; 16) International Application No. PCT/US2014/030922 filed Mar. 17, 2014; 17) International Application No. PCT/US2014/030855 filed Mar. 17, 2014; 18) International Application No. PCT/US2014/024219 filed Mar. 12, 2014; 19) International Application No. PCT/FR2009/001322 filed Nov. 17, 2009; and 20) French Patent Application Serial No. 0806419 filed Nov. 17, 2008.

TECHNICAL FIELD

This invention relates generally to solar systems, and more particularly provides solar canopies with solar tracking.

BACKGROUND

A long standing and unsolved challenge in the industry, and particularly in the solar industry, has been trying to resolve how best to create canopy structures or solar carports (collectively, "canopies") on various sites efficiently, safely but also cost effectively.

The traditional processes and technologies involved in building canopies, and particularly large canopies, such as carports, including but not limited to solar carports, is extremely conservative and costly. Most of the tasks are still performed by crews working on site, sometimes in difficult or dangerous conditions, to erect metal framings, then to add solar racking systems, then to add solar panels one by one, then to connect the panels one by one, then to add lighting, other equipment, all one by one. This less than optimal process is due to the lack of proper technologies and methods, and results in prohibitive costs and in many cases in occupying the site for an extended period of time, which is often also prohibitive. There is little standardization, and canopies are still designed one by one, then built one by one. Although they may be deployed in ever increasing quantities, there is very little benefit from scaling up their production.

SUMMARY

In some embodiments, the present invention provides a solar tracking carport, comprising a supporting structure including a foundation and at least two columns connected or connectable to the foundation; a three-dimensionally rigid canopy deck having a length from a first edge to a second edge of at least one car, the three-dimensionally rigid canopy deck including one or more upper blocks, each of the upper blocks being rigid at least in its longitudinal direction, each of the upper blocks including at least one solar panel; a deck frame configured to support the one or more upper blocks, the deck frame including a torque transmitting structure; a rotation enabling connection configured to rotatably connect at least the torque transmitting structure of the three-dimensionally rigid canopy deck to the at least two columns of the supporting structure; and a drive system configured to control tilting of the three-dimensionally rigid canopy deck about the supporting structure over one axis of rotation to a first maximum angle in a first direction and to a second maximum angle in a second direction, the first maximum angle preventing the first edge of the three-dimensionally rigid canopy deck from going below a first minimum threshold height, the second maximum angle preventing the second edge of the three-dimensionally rigid canopy deck from going below a second minimum threshold height.

The drive system may include at least two upper supporting column portions configured to couple to the at least two columns. The deck frame may include at least two cross beams or at least two longitudinal beams. Each upper block may include at least two upper block supporting members and at least two transverse members. The torque transmitting structure may include a pipe. The deck frame may be foldable. The drive system may include a self-locking screw. The drive system may include a power screw and a nut, wherein one of the power screw and the nut is travelling and the other of the power screw and the nut is fixed. Each upper block may include supporting points configured to couple to a crane. The rotation enabling connection may include at least three lugs coupled to the deck frame. The rotation enabling connection may include at least one pipe arm. The drive system may be coupled to at the at least one pipe arm. The carport may further comprise a control system configured to control the drive system. The carport may further comprise a user interface configured to enable a user to configure the control system. The carport may further comprise sensors configured to sense environmental factors. The control system may be configured to park the system in a predetermined position based on the environmental factors. The control system may be configured to recalibrate the system in response to a trigger condition. The trigger condition may include passage of a set time period.

DETAILED DESCRIPTION

Figure 1:
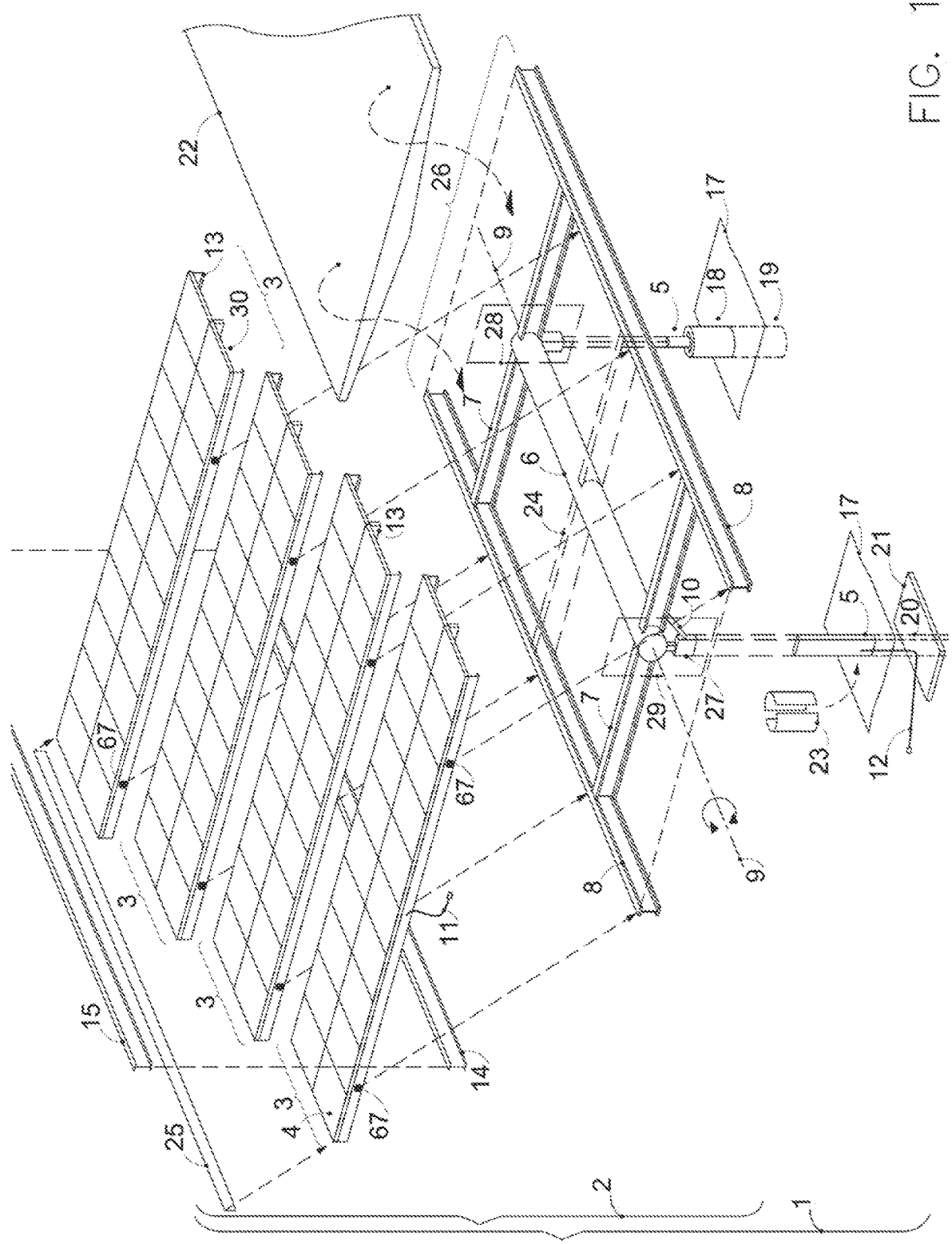
FIG. 1 is an exploded isometric view that illustrates an example of an embodiment of Modular Unit.

The following description is provided to enable a person of ordinary skill in the art to make and use various embodiments of the invention. Modifications are possible. The generic principles defined herein may be applied to the disclosed and other embodiments without departing from the spirit and scope of the invention. Thus, the claims are not intended to be limited to the embodiments disclosed, but are to be accorded the widest scope consistent with the principles, features and teachings herein.

The patents and applications incorporated by reference above provide additional details on the following elements: Finished Multi Sensor Unit (FMU), FMU Carports, sun-tracking CTC, FMU CC, Canopy Top, Canopy Top Carport (CTC), FMU Canopy, Photovoltaic FMU Canopy, Rotating Object (RO), Longitudinal Supporting Component (LSC), rails, Mega-component, Attachment component (A Comp), Data Component, Attachment members, Production component (P Comp), off structure, Constructed off structure, Panels, Transversal Beam (TB), Top Portion, Central Portion, Supporting Portion, Gutter, Sliders, Drip Former, Attachment Portion, Attachment Clamps, Waterproof Barrier, Waterproof Barrier Components, Waterproof Curtain, Lateral Shoulder, Multi Function Board (MFB), Sensors, Fastening Points, Main Fasteners, Attachment Pods, Load Spreader, Spreader Leg, Fixing Point, Load Spreader, Spreader Beam, Fixing Pods, Centering Pods, Fastening Pads, Super Plug, Dressing Elements, Flashing Elements, Lower Face, Channel, Ventilation Channel, Host Structure, Positioning Frame, Mobile Pathway, Construction Bench, Mobile Platform, off structure construction, off structure construction tools, Site Information Analysis, Statistics Analysis, Main Pipe, Column Shell, Sound System, Domestic Canopy, Domestic FMU Canopy, Space Settings, Situations, Self Tune up, Large Scale Commercial carport, Gravity Drive System, Mechanical Drive System, thermal insulation layer, Rigid Board, Computer System, Intelligent device, Outer skin, skin elements, duct, carport, transverse rigidity element, bracing system, roof, anchor points, load carrying element, insulation, spacer, waterproofing, airtightness, framework, prefabrication, walkway, robot, clamps, fixation, supporting frame, mounting frame, transport frame, bracing frame, cross-tie, blocks, pre-mounted blocks, grilles, prefabricated solar system, finished system, and more.

Various inventions are described herein, including a canopy or building with a tilting roof, with a solar version, with a sun tracking version; a modular canopy, even it does not move; Upper Blocks and installation; a prefab deck; erection methods; Plug n Play buildings; with all the accessories.

Embodiments of the present invention pertain generally to apparatuses, systems and methods for quickly and inexpensively creating active building modules. More particularly, but not limited to, embodiments of the invention pertain to a system for securely, yet simply, creating canopies, Finished Multi-Sensor Units (FMUs), Attachment Components (AComps) or Production Components (PComps) FMU canopies, carports, solar carports, sun-tracking solar carports, etc., of various sizes and purposes.

Harvesting solar energy from the sun can produce large amounts of electricity or heat. Solar radiation is by far the largest source of energy on the planet, but its intensity is comparatively low and large areas of energy collecting surfaces are required to convert the sun's energy into significant amounts of electricity. In many cases, it appears easier to install large solar collectors on outdoor canopies or solar carports which also shades large parking lots than it is to install solar panels on roofs.

One of the challenges is using solar panels that are mass produced in various sizes and frame styles and for which the industry is generally still using a wide variety of clamps and racking systems that require being supported by structural members. As consequence, building a canopy often means building a structure on a structure on a structure, all by hand and all on site.

Earlier attempts for creating large scale canopies or solar carports were proven cumbersome, unsafe, expensive, slow, and not easy to assemble, modify or disassemble. None of the solutions provided an apparatus, system and method for installing an apparatus that would be universal. The term "universal" refers to an apparatus or method for creating canopies of a wide variety of shapes, sizes and functions and that can be used in a variety of sites and projects, but also permits the use of prefabrication to reduce considerably the onsite labor time, risk and expense.

Another challenge with harnessing solar energy is that, although it is inexhaustible in supply, non-polluting and reliable, it is directional. Seen from the moving planet earth, the sun turns, rises and descends in the sky, and the sun's rays hit the earth with an ever-changing angle and intensity. The amount of energy received on earth by a collecting surface is maximum when this surface is perpendicular (90°) to the sun rays and decreases proportionally with the decreasing attack angle. A fixed collecting surface can only be optimally oriented for a few minutes per day. Designers have been trying to optimize the collection angle by tilting the panels to an angle that in yearly average is optimal for energy collection, but by definition is never perfect. On the contrary, a sun tracking surface that can be dynamically oriented to better face the sun's rays collects considerably more energy.

Sun tracking devices exist. They are designed to rotate solar energy collectors on one or two axes in order to accurately follow the sun. They are mainly used in large scale solar farms as the ones installed in fields or deserts around the world. They are generally designed to move collectors of small size in order to limit the amount of load they control. Tracking systems may increase considerably the energy production of each collector.

Every solar system designer needs to account for shading, which limits efficiency, especially in sun tracking applications. A shaded solar panel produces less than a non-shaded one. When multiple solar collectors are tilted to face the sun, nearby panels may shade each other at certain times, thereby resulting in large energy production losses. As sun tracking solar panels rise to stop more sun rays, they create a larger shadow than fixed panels when the sun is not vertical. Panels tracking the sun around a horizontal single axis cast shadows on both sides of their rotation axis. For example, they face the east in the morning and cast a shadow on their west side, and face west in the evening and cast shadow on their east side. When their orientation is different, the shading is different too.

If the panels and the axis of rotation are aligned for example with a horizontal axis, the sun tracking panels can form long rows without shading each other. This makes sun tracking carports particularly efficient. The carport's solar panels can form long rows similar to the long rows of parking spaces and never shade each other in the same lane. There is a risk of self-shading when the panels cast a shadow on their side (east or west as in our previous example). However, if the solar arrays are aligned with the parking spots, which are separated by driving lanes, the driving lanes provide a distance between the solar arrays which in many cases is sufficient to avoid most of the self-shading. In some cases, back-tracking can be implemented to avoid self-shading entirely. On the contrary, dual axis tracking panels add another movement. The panels are no longer aligned with a horizontal axis of rotation. They turn around a vertical axis and rise around a horizontal axis and thus may cast a shadow on each other. In order to avoid this self-shading, the panels must be spaced apart, which prevents from creating long panel rows matching the parking spot lane's length. Therefore, a similar land area could use much less dual axis tracking carports than it can single axis tracking carports.

Deploying sun tracking solar energy collectors in inhabited environments is very tempting but it poses multiples challenges. Existing buildings, shading trees, roof penetrations, responsibility issues, etc., are less problematic with carports than with many other ways to implement solar in urban areas. And, solar canopies shade cars. A parking lot can be turned into a solar energy plant in two main ways: 1) By covering the lot with a super-structure that supports solar panels, somewhat independent from the parking lanes layout; this structure needs to be high enough to provide sufficient clearance, for example, for fire trucks to use the drive lanes. In order to avoid self-shading, the structure has to support rows of panels separated by large empty rows. It may be an expensive solution. But, in some cases it allows tilting the panels as desired or even tilting the panels dynamically to track the sun. 2) By using canopies to cover only the parking spot areas and to leave the driving lanes open to the sky. In this option, the solar canopies orientation is not the solar optimal, but more often the azimuth is a mere result of independent factors, for instance, the parking lot layout or the parcel's and drive lanes orientation, which may result in less than optimal solar panels orientation and in energy production losses. If canopies could be made to exactly cover single or double parking spot lanes and to tilt on a horizontal axis to track the sun, the drive lane space between the parking spot areas would prevent the solar collectors from self-shading.

Building mobile or sun-tracking canopies or carports, which as explained above are in some cases more efficient when the solar array or the canopy deck matches the width of one, two or more rows of parking spaces and the length of the parking lane, means that the loads and the mechanical and safety requirements these trackers sometimes must comply with are several orders of magnitude more challenging than building traditional solar trackers in the desert. It requires a new approach.

It would be desirable and of considerable advantage to provide canopy or solar carport systems that can be installed on site in a few minutes or hours. It would be even more desirable for some of these canopies or carports to have additional equipment, accessories, intelligence or functions, such as for example the ability to move to track the sun. A previously unaddressed need exists in the industry for new and powerful systems, apparatus and methods for creating ready to use large sun-tracking canopies or carports that are modular, prefabricated, easily deployed anywhere and affordable. Particularly, there is a significant need for systems, methods and apparatus solving the considerable challenges large, modular and mobile structures pose to human safety in inhabited areas.

Embodiments of the present invention provide numerous advantages in connection with installing the canopies or carports, with adding multiple functions to them and with including mobile parts, such as sun tracking solar roofs. Solar canopies or sun tracking solar canopies can be used for many applications other than carports. They can for example generate shades, barns, domestic canopies, gazebos, even buildings or many other applications.

Methods, systems, apparatuses, user interfaces, and other aspects of the invention are described. Reference will be made to certain embodiments of the invention, examples of which are illustrated in the accompanying drawings. While the invention will be described in conjunction with the embodiments, it will be understood that it is not intended to limit the invention to these particular embodiments alone. On the contrary, the invention is intended to cover alternatives, modifications and equivalents that are within the spirit and scope of the invention. The specification and drawings are, accordingly, to be regarded in an illustrative rather than a restrictive sense.

In the following description, numerous specific details are set forth to provide a thorough understanding of the inventions. However, it will be apparent to one of ordinary skill in the art that the various inventions may be practiced without these particular details. In other instances, methods, procedures, components, and networks that are well known to those of ordinary skill in the art are not described in detail to avoid obscuring aspects of the inventions.

All or a subset of the solutions, methods, principles, devices, technologies described herein can be applied partially or wholly or combined to generate various applications. All the parts, systems, components, methods, concepts, principles, apparatus or devices described or illustrated in this application are to be designed, calculated or adjusted by the engineer, the designer, the maker, the installer or the person with sufficient knowledge, based on the loads, dimensions, applications, requirements and conditions.

The novel features of some embodiments of this invention, both as structure and operation, are best understood from the accompanying drawings, considered in connection with the accompanying description of the drawings.

FIG. 1 is an exploded isometric view that illustrates an example embodiment of a Modular Unit, or MU, (1), with some of the most common components. This description also refers to elements described in other figures. In some cases, elements from this figure and other figures can be combined together.

Modular Units or MUs (1): Large size canopies, carports or solar carports are still generally considered, engineered, built and maintained on a one by one basis by a large number of artisans or fabricators that leverage very little standardization. Therefore, they are not a technology product. They are time consuming and expensive to design, build and maintain, and much of their potential is unused. Canopy projects, including solar carport projects, are all different because the sites are different, but the general problem to solve, as well as the dimensions, is remarkably similar from one site to another. Therefore, considerable benefit will come from developing a standardized Modular Unit, also referred to as Modular Unit (1) that is customizable so it fits almost all cases, can be equipped with a large range of accessories and functionalities, such as for example sun-tracking, and can use pre-designed or pre-assembled components for a more efficient installation. Modular Units can be designed in a large range of sizes and can be equipped to fulfill different functions or solve a large variety of problems, not only carports but many other types of structures. In some embodiments, Modular Units can be installed in hours instead of days or weeks with traditional methods and technologies. Modular Units can be fixed or mobile, active or static. Juxtaposing any number of Modular Units instead of designing or building one off structure enables the designer to equip sites faster, better and cheaper. Moving away from one-off static canopy projects to a system of easy-to-deploy modules requires new apparatus, systems, methods and technologies. It allows investing much more engineering resources, technology and methods in a product that is going to be produced in large quantities and may take advantage of industrial methods and economies of scale. In some embodiments, Modular Units can be analyzed as a combination of standardized or adjustable components like for example foundations, columns or supporting structure, roof deck or upper blocks, deck frame, drives, solar systems, accessories, electronics, computer programs, etc., which can be fabricated repetitively at industrial scale. Being modules, which in some cases are completely autonomous, Modular Units (1) can be placed anywhere, in any position, orientation or site. Modular Units can be designed for any size or function. For example, they can be designed to shade, cover, protect or host any number of cars, people, equipment, land or any type of space, activity or structure, to produce energy, track the sun or perform a large number of other tasks on a site, including but not limited to parking lots, buildings, urban areas, agricultural facilities or other indoor and outdoor locations or structures (canopies). In some embodiments, Modular Units are Plug n' Play, intelligent, sun-tracking carports.

Load, also referred to as LD: Modular Unit design has to take into account the dead loads such as the weight, and the live loads such as the wind loads. In embodiments in which the Modular Unit includes mobile parts, e.g., a tilting roof, some of these loads are likely to be considerably higher than when the roof is sensibly horizontal or than in smaller traditional trackers. When tilted, the roof may act as a large sail raised in the wind and may collect very large loads. The loads vary depending on the site, the wind speeds, the seismic or other site characteristics, the Modular Unit design, size, height, function, accessories, the local building codes, exposure map, exposure category, as well as design factors of the Canopy Deck (dimensions, porosity, shape, location of the axis of rotation, etc.) and many other factors. In some embodiments, there are for example vertical loads, horizontal loads, like wind or seismic, complex loads, like wind or turbulences, torsional loads, torque, etc. Therefore, Modular Units and their components are likely to be made in several versions or to be adjusted case by case. It will be understood that the principles, members, connections and structures described here may need to be adapted by the engineer or the professional based on the actual case parameters.

Canopy Deck, also referred to as CD (2): When the Modular Unit has one of the following: a roof, a canopy top, a shading structure, a Rotating Object (RO), a Canopy Top Carport, a Production Component (PComp), an FMU Canopy, an FMU Canopy Carport (CC), a canopy Top Carport, a solar array, a solar panel, a frame, a deck or upper structure or component, this component will be referred to as a Canopy Deck or CD (2). In some embodiments, the Canopy Deck includes roofing components, cover components, solar components, shading components, structural components, accessories, or other components, blocks or sub-blocks. The Canopy Deck can have dimensions, components, functions, accessories, frames, and/or framing. It can be fixed or mobile or tilting or active. It can be supported directly or on a structure or on columns or on the ground. It may be completely or partly pre-assembled. In some embodiments it is used as a roof, a solar array, a solar roof, or any other function. In some embodiments, the Canopy Deck is enabled to tilt on one or more axes of rotation, also referred to as axis of rotation (9).

Column, also referred to as CL (5): In some embodiments, the Canopy Deck (2) is supported by columns or a supporting structure. The columns (5) can be any type of column, of any size or design, for example, I beams, tubes, squares, rectangles, trusses, made of metal concrete, wood or any other material or any combination. It will be understood that in some embodiments of Modular Units, other supporting structures that are not columns can be used. For example, other supporting structures may include an existing structure, a building, a mobile frame, a frame, the ground, etc. When columns are used, the columns (5) can be anchored in the ground (17), on pedestals (18) or on any supporting structure, and can be equipped with any Drive System, equipment, accessory or function. Modular Units may have any number of columns, which can be located anywhere like centered with regard to the Canopy Deck, on the side, on the edge, outside side the Canopy Deck, or elsewhere.

Deck Frame, also referred to as DF (26): In addition to the weight, loads are primarily collected by the Modular Unit's front, side or top surfaces, like a Canopy Deck's top or lower skins. In some embodiments, large loads are collected by the roof top or bottom and are transmitted to a set of structural members, also referred to as Deck Frame or DF (26), which transmits them to the columns (5), the ground or other supporting structures. In some embodiments, the Canopy Deck rests on just a few columns, for example, two, which in many cases are not distributed under all the Canopy Deck's area, and which in some cases are aligned. Therefore, the Deck Frame transmits loads from their collection point like the Canopy Deck's surface, to distant columns, e.g., to two columns aligned with the Canopy Deck's axis of rotation (9), which can be centered or not relative to the Canopy Deck. In a fixed Canopy Deck embodiment, the loads can be easily transmitted by creating a connection, in some cases a rigid connection like a moment connection, between the main structural Canopy Deck members and the columns. In a moving or rotating Canopy Deck embodiment, this Canopy Deck to column connection cannot be rigid since it must allow for movement or rotation. Therefore, the Canopy Deck's frame, the Deck Frame, has to be designed to both transmit the loads and remain rigid and undeflected without the help of moment connections (except in specific cases in which deflection is accepted or desired). These Deck Frame embodiments aim at making the Canopy Deck a large rigid deck, which can be done in several ways such as for instance creating a 3D truss or 3D mesh or using structural members like beams united together. When the Canopy Deck's rotation or movements is controlled by one or more Drive Systems (10), some of the Deck Frame's structural members may be subject to different forces, which, as it is the only permitted movement, will translate into rotation. For example, the Canopy Deck's rotation may be controlled by Drive Systems in one or more points, while the wind or other loads is applied to structural members that are not held by these Drive Systems or may be held differently by different Drive Systems. In such cases, the structural members might tend to move independently. When they are mounted on a rotation enabling connection, they may rotate independently and twist the Canopy Deck. In embodiments wherein the Canopy Deck must remain undeflected, for example if it carries solar panels, the Deck Frame must be designed so its structural members are united in order to move together wherever the loads or Drive Systems forces are applied. In some Deck Frame embodiments, this is achieved by using a truss or 3 structural mesh system that distributes the loads.

In some embodiments, the Deck Frame's structural members include for example: Cross Beams, also referred to as CRB, (7) which are sensibly perpendicular to the line of columns, Longitudinal Beams, also referred to as LBE, (8) which are sensibly parallel to the line of columns. It will be understood that the structural members illustrated in the figures are represented sensibly perpendicular to each other for simplification, but any other angle, design or diagram could be engineered in some cases. It will be understood that any structural member can be replaced in some embodiments by trusses or two dimensional or three-dimensional trusses, or other structural systems and that the entire Canopy Deck's frame can be a truss instead of a set of beams as in the figures. The Cross Beams (7), the Longitudinal Beam (8), and other possible structural members are any type of beam: made up beams, built up beams, I beams with a web and flanges, tubes, HSS, trusses, built-up beams, 3d structural assemblies, any type of profile and made of any material. In some embodiments, the main members like the Longitudinal Beams and Cross Beams are united by a structural member designed to transmit torque, like a torsion bar, between distant points or distant structural members, which in some cases allows a single Drive System to control an entire Deck Frame's rotation or movements. This torque transmitting member is referred to as the Pipe, or PI (6). In some cases, pipe support structural members like non-column supported Cross Beam (24) or other loads. The pipe may be a hollow pipe, a tube, a beam, a bar, a truss, a structural member or set of structural members calculated to handle the loads, and particularly the torque or torsional loads between different sides of the Canopy Deck or other loads. In many embodiments, Deck Frame components are made of metal, which in some cases is painted, galvanized, coated or protected, but other materials are possible too. All Deck Frames and components will be designed with regard to the functions and loads.

Upper Block, also referred to as UB (3): In some embodiments, Canopy Decks are built traditionally by adding components one at a time like roofing, framing, purlins, panels, or others, and are often built from the bottom up, but in some embodiments, Upper Blocks are used to add several components or functions at a time. In some embodiments, Upper Blocks include some or all of the Canopy Deck's skin, cover, roof, panels, solar panels or other components or accessories as well as their attaching systems. In some embodiments, Upper Blocks are attached to a supporting structure, for example a Deck Frame (26). In some embodiments, Upper Blocks (3) are blocks or solar blocks which may include multiple sheets, panels, plates or solar panels (4) as well as some of their Supporting Structural Members also referred to as Upper Block Structural Members or Upper Block Supporting Members (13), attaching system, wiring or other features. In some embodiments, Upper Block Supporting Members are rails, Longitudinal Supporting Components (LSCs), beams, profiles or structural members which are rigid enough to give the Upper Block a rigidity that allows it to be moved, transported or manipulated and to require very few supporting points. In some embodiments, Upper Blocks include wires, cables (11) or connectors or fluid hoses to be connected to the host structures' cables (12) or hoses and are wired or tested before they are moved onto the Deck Frame. In some embodiments, these wires, cables (11) or hoses are reduced to a small number, or even to a single connector or a Super Plug in order to make the connection to a host structure easier or to enable Plug n' Play systems. In some embodiments, the Canopy Deck (2) or the Upper Block (3) is equipped with underlayers (22), fascia (25), accessories for waterproofing, architectural, functional or technical purposes. Several Upper Blocks (3) can in some cases be combined together, or with additional components in a Canopy Deck (2). The Upper Blocks may be longer than the distance between two or more Longitudinal Beams and overhang. A Canopy Deck may include one or several Upper Blocks (3) which can be connected together or connected individually to the Deck Frame or the Modular Unit's electrical or fluid system. When the Upper Blocks include waterproofing systems, the systems may be designed to overlap so that when juxtaposed to each other on the Deck Frame they constitute a complete waterproof system, or a complete decorative system. An underlaying waterproof system can also be added to the Modular Unit as a whole. In some cases, a channel is created between the underlayer and the panels.

In some embodiments, Upper Blocks are pre-assembled functional blocks that are sufficiently rigid to be transported or manipulated and can be used independently or can be part of a Canopy Deck (2) in which, in some embodiments, they are supported by a Deck Frame (26). In some embodiments, Upper Block Supporting Members give the Upper Block sufficient longitudinal rigidity but in order to keep the Upper Blocks (3) sufficiently rigid in the transversal direction, temporary or permanent Transversal Members (14, 15) or ad-hoc structural members are used to support the Upper Blocks from above, from below or from other connection place. Upper Blocks (3) may be assembled on site or pre-assembled. In some embodiments, Upper Blocks are used independently without Canopy Deck or Deck Frame as rigid blocks including one or more panels or solar panels (4) and can be used in a diversity of solar or non-solar applications, e.g., in rooftop, ground-mount, stand alone, trackers, mobile structures, with or without additional framing or components. In an example embodiment, Upper Blocks are solar blocks that include panels or solar panels (4) of any type, orientation or quantity (for example 4, 6, 16, 24, 45, 96 panels or any other number) mounted on their racking system or to a frame of rigid Upper Block Supporting Members, electrically connected, grounded, bonded, in some cases tested, wherein the Upper Block may include accessories and can be moved, lifted or manipulated and attached to a supporting structure by only a few points, and connected to a data or power or fluids network or to one or more inverters (which is either part of the Upper Blocks or located either elsewhere on the Modular Unit or outside the Modular Unit) by only a few cables, hoses or connectors like in a Plug n' Play device. In some embodiments, the solar panels are attached but connected afterwards by multiple cables.

In some embodiments, as illustrated in FIG. 1, a Canopy Deck is essentially made of a Deck Frame and one or more rigid pre-assembled Upper Blocks that include multiple structural or functional components and accessories. The Upper Blocks' (3) attachment to the Deck Frame (26) may be designed by the engineer as a bolted connection or a clamp-based connection or as a fixed connection for instance screwed or welded or other types of connection, e.g., snapped. In some embodiments, Upper Blocks are removable. In some embodiments the Upper Block (3) is attached to a supporting structure (26) only in a few points. As the Upper Block is rigid, it can span long distance between supporting points. Each supporting point will be referred to as a Upper Block Supporting Point (67) or UBSP. In some cases, the Upper Block's Upper Block Supporting Members are attached to a supporting structure such as for example a Deck Frame in a few Upper Block Supporting Points (67), e.g., two Upper Block Supporting Points per Upper Block Supporting Member. In some cases, the Upper Block Supporting Members are themselves connected, in a few Upper Block Supporting Points, and supported by a Transversal Member, or TM, or a framework or any type of temporary or permanent structure or member, and this structure or member, which can in some cases support several Upper Blocks, is attached to a supporting structure in a few points. The stronger the Upper Block Supporting Members, the fewer Upper Block Supporting Points are needed or the longer the distance between them. The Upper Block's Upper Block Supporting Members rigidly span between these distant Upper Block Supporting Points. In some cases, the Upper Block length exceeds the frame width or the distance between Upper Block Supporting Points and the Upper Block overhangs. In some embodiments, a favorable load distribution is reached when, as illustrated in FIG. 1, each Upper Blocks is attached to two Longitudinal Beam (8) and the distance between the two Upper Block Supporting Points is around ½ of the Upper Block or Upper Block Supporting Member length and the Upper Blocks overhang approximately ¼ of their length beyond each attachment points. Other designs are possible as well for example with no overhang or with one or more than two attachment points.

Sun-tracking: In some embodiments, the Canopy Deck (2) moves or tilts to track the sun or for other purposes. Some embodiments of the present invention allow a Modular Unit (1), solar canopy or carport to function as a sun-tracking device with built-in mechanical systems, drive systems, control systems, and connections, as well as accessories or other features. In some embodiments, each autonomous Modular Unit has one or more drive systems and one or more tilting roofs, arrays or Canopy Decks. Installing a large, efficient sun tracking solar field made of multiple Modular Units modules is thus simple. Rotating or sun tracking Modular Unit embodiments bring new possibilities, new functions and, in the case of sun tracking solar embodiments, a dramatic increase in efficiency, energy output and profitability. Some of the mobile Modular Unit embodiments, including sun tracking or other mobile functions or components may, for safety purposes, include one or more safety features like mechanical stops, electrical and electronic stops in order to allow for several levels of safety and protection even in case of catastrophic failure of some of the components.

Drive System, or Drive and Control System, also referred to as DS (10): concepts and examples of embodiments of Drive Systems are described in other figures. In some embodiments, Modular Units use Drive Systems to control Canopy Decks' movements, positions or angles, by controlling a difference, a distance, or a relationship between the supporting structure, for instance the column (5), the ground (17) or other supporting elements, which can be fixed or mobile, and the moving part, such as a Canopy Deck (2), a Deck Frame (26), a Cross Beam (7), a pipe (6), a truss or any structural member of the moving or tilting part, e.g., for sun-tracking applications. One or more Drive Systems may be used on the same Modular Unit, or one Drive System can be used to control and power several connected Modular Units. Using only one Drive System per Canopy Deck makes the Modular Unit or the Canopy Deck autonomous, rids synchronization problems, makes the mechanical design simpler, and generates less stress on the Drive System than when multiple Canopy Decks or Modular Units are driven by one Drive System. In some embodiments, a Drive System (10) is connected to and controls a distance between a column (5) and a Canopy Deck (2) by extending or retracting itself in order to increase or reduce this distance; when the Drive System is connected to the Canopy Deck in a point distant from the Canopy Deck's axis of rotation (9), pushing or pulling this point causes the Canopy Deck to tilt around its axis of rotation (9) and not moving this point causes the Canopy Deck to stay immobile. In some embodiments, the Canopy Deck's connections to the column allow the Canopy Deck to rotate around one axis but not to have any, or to have very little, other movements. In some embodiments, the Drive System combines the functions of moving the Canopy Deck and stopping it or keeping it immobile and safe at times. In some embodiments, these functions are separate and are exercised by different devices. The Drive System is the assembly of all the components, including in some embodiments, for example, screws, nuts, collars, bearings, joints or connections at one or both at ends, motor, gears, gear boxes, lubrication systems and all other parts used to increase or reduce the distance between the fixed point (column or fixed structure) and the Canopy Deck attachment point.

Accessories, Built-in functionalities: Examples of Modular Unit or Canopy Deck accessories include architectural elements like a waterproof roof, waterproofing component, gutter, underlayer (22), fascia (25), architectural element, decoration elements, fixed or mobile walls, dressing elements, flexible or rigid curtains or panels or other types of fixed or mobile components, systems or devices flashing systems, insulation elements, fire protection elements, boards, grilles, heating or cooling systems, blowing systems, water systems, gutters, other liquid systems, various kinds of loads, awnings, shades, blinds, storage systems, fixed or mobile sculptural, fixing members, attachment members, clamps, structural elements, etc.; sensors like 2d or 3d vision, infrared, sonar, volume, sound, presence, movement, wind, hygrometry airflow, temperature, GPS, position, azimuth, slope inclinometer, pressure, light, odor, electrical, torque sensors, etc.; electronic or active components like programmable electronics, electrical or mechanical devices, electrical panels et boxes, power inverters, micro-inverters, power systems, radio or communication systems, computer systems, computer interface devices, buttons, screens, displays, panels, tablets, command pads, information elements, motors, drive systems, control systems, brake systems, actuators, robotic arms, mobile systems, devices, technical gear, cables, wires, hoses, connectors, control systems, connection systems, partitions, artificial intelligence or programs, monitoring systems, interaction systems, intelligent systems. It will be understood that "Accessories" or "ACS" refers to any number or type of accessory or functionality included with any Modular Unit component.

Rotation Enabling Connection, also referred to as REC (28). In Modular Unit embodiments that include a tilting Canopy Deck or rotating parts, several connections, for instance, the column to Canopy Deck connections or the Drive System to column and Canopy Deck connections need to be designed so they allow the necessary rotation or flexibility between the connected components while providing the required strength and stability. Some of these connections could be designed so the connected parts move along a perfect plane or circle, in which case a single axis connection could work, e.g., using a pin perpendicular to the rotation, as well as any type of connection allowing flexibility in this plane. However, in some cases, the design is different and a single axis connection isn't sufficient. For example, if the rotation does not happen in such a perpendicular plane, or if for various reasons misalignment occurs and the rotation does not happen in a perfect plane. In some cases, a second axis of rotation or flexibility is needed and rotula systems, gimbals, misalignment tolerant systems or other two axis rotation enabling connection systems may be used in lieu of the described single axis system. It will be understood that all connections or joints used in Modular Units, such as for example Drive System connection, Canopy Deck to column, or any connection, can in some cases be designed with a one or two axis rotation enabling connections, even though some of the drawings and descriptions refer to the single axis rotation only. In some embodiments, for example, at the column to Canopy Deck connection, a Rotation Enabling Connection (28) is associated with a Drive System. Such a "Rotation Enabling Connection and Drive" will be referred to as RDC (29).

Off location assembling: In some embodiments, Modular Units include several components, blocks or sub-blocks, assemblies or sub-systems, e.g., Deck Frames, Canopy Decks, Upper Blocks, or others, some of which are pre-assembled and then combined onsite in order to erect the unit in a few minutes or hours. In some embodiments, instead of building the Canopy Decks at their final location, in some cases up in the air, some Canopy Deck or Modular Unit components, e.g., Upper Blocks or Deck Frames are partly or fully assembled off structure, off site, in a remote shop, before being moved, lifted or craned onto the Deck Frame (26), the Canopy Deck or the Modular Unit components. In some embodiments, they are assembled on the final site but not in their final position, location or setup. For example, in order to allow workers and machines easier access to the components they are preparing than when they are erected up in the air or in hard to access locations, they can be assembled or pre-assembled either on the Canopy Deck (2), the Deck Frame (26), on the ground (17), or on special structures or at a different angle, position or set-up before being moved, lifted or craned onto the Deck Frame (26), the Canopy Deck or the Modular Unit components. In an example embodiment, as described in other figures, Upper Blocks (3) are pre-assembled off site and brought to the erection site where they are mated with fully or partly preassembled Canopy Deck or Modular Unit framings, which allows one or more high quality Modular Units to be erected in minutes or hours instead of days or weeks and to generate power almost immediately after. The onsite, sometimes prohibitive, labor time as well as the cost are therefore considerably reduced, while the quality control is increased. Much of the labor is displaced from the host site or the host structure to a pre-assembly site, location or position where it can be performed more efficiently at industrial scale, quality and cost. In some cases, pre-assembling the Modular Unit on site or even on a framework or structure but before its erection allows to perform the assembly tasks for instance mounting, panelizing, connecting, etc. easier, better, faster as well as to use automation. Another advantage is that the sometimes very busy host site is less disturbed while units are being pre-assembled elsewhere. For example, installing Modular Units as solar carports on a parking lot will take only a few hours, possibly in two steps a few weeks apart (e.g., foundations first in a first phase, then assembly and erection in a second phase) versus days or weeks with traditional methods and components. Some designs better enable prefabrication, and simpler delivery and assembly onsite.

Plug and Play: In some embodiments, Upper Blocks are Plug and Play blocks, or Plug and Play solar blocks, which can be very quickly affixed to the Modular Unit or to the host structure and can be connected to a host electrical system by only a few cables. In some embodiments, Upper Blocks are tested before installation. In some embodiments, Modular Units, or solar Modular Units are built by combining pre-assembled components, e.g., Upper Blocks or other sub-systems like framing, drive systems or accessories, and they are ready to be connected, in some cases to work or to track the sun, only a few minutes or hours after their installation. In this case, Modular Units are Plug and Play systems which connect to an existing network by only connecting a few cables, which reduces considerably the difficulty and cost of installing, connecting and testing canopies or carports, including solar canopies, solar carports or solar systems, ground mount solar systems, other structures or systems. In some embodiments, Modular Units or Upper Blocks can also be used on buildings, to create building roof or facades or can be installed on existing buildings or structures, for example they can be used over an existing building's flat roof, even above rooftop equipment, or on top of existing roofs, or many other uses.

Removable: Another advantage of Modular Units made of pre-assembled sub-components is they can be removed easily. Some or all of the elements can be easily disassembled, modified or even removed from the site using a reverse process. The panels can be removed from the Upper Blocks, or replaced, the Upper Blocks can be detached from the Deck Frame, the Deck Frame can be detached from the supporting structure, the Canopy Deck as a whole can be detached and removed, sometimes even the columns can be removed.

An example of Modular Unit includes one or more columns (5) founded in the ground (17) either using piers (19) or other types of foundation (20), which may include spread footers (21), which are slabs made of concrete or metal or other materials, which serve to hold the column in place, possibly using their own weight or friction. In some embodiments, the column include pedestals (18) or outer shells (23) or other components for protection, aesthetical reinforcement or other functions. The column number, spacing, alignment or number may vary based on the project's specifics. On top of the column (5), or on the upper part of the column, is mounted a fixed or rotating roof, a Canopy Deck (2) or a solar array, which can be waterproof or not, solar or not. Some embodiments of the invention allow the Canopy Deck (2) to be a unit that can be assembled off structure, moved as a block and that can be animated when at least one Drive System (10) is included.

In some embodiments of the invention, the Canopy Deck is fixed and is attached to the column, sometimes via supporting members using rigid moment connections. In some embodiments, e.g., as shown in FIG. 1, the Canopy Deck (2) is mobile and can turn about an axis of rotation (9). It uses a Deck Frame (26) which includes a pipe (6), one or more Cross Beams (7), and one or more Longitudinal Beams (8). The Canopy Deck is connected to the columns using at least a Rotation Enabling Connection (28) or a Rotation and Drive Connection (29) that may be part of the Canopy Deck assembly and that is attached to the Deck Frame's pipe (6) or Cross Beams (7).

In some embodiments, the Longitudinal Beams can also be used for the installation or lifting operations and may need to be designed for this effort, as described in other figures.

Upper Supporting Column: In some embodiments, especially for making erection methods easier, a column may be split in two parts and may include an Upper Supporting Column, also referred to as UPSCL (27). The Upper Supporting Column is designed to be installed on top or side of a column that has been previously installed. Having an Upper Supporting Column allows doing precision-requiring or time-intensive tasks in the pre-assembly site before final installation. For example, it is possible to create, assemble, adjust the Rotation Enabling Connection off site, or to perform off site some electrical connections, some electronic preparation job, to install junction boxes or flexible cables between the Canopy Deck and the Upper Supporting Column, or many other pre-installation tasks. For example, the Drive System can be attached to the Upper Supporting Column and/or to the Canopy Deck before erection, which may be very useful either to work in better conditions or to use this connection. For example, having a pre-installed Drive System enables locking an angle at the time of hauling or erection. Having an Upper Supporting Column pre-attached or pre-connected to a Canopy Deck may help the Canopy Deck become a more complete assembly that is very easy to install. At the time of erection, the attaching the Canopy Deck to the column simply includes connecting the two parts of the column.

The columns (5) can be located at the pipe's (6) tip or at the Cross Beam's (7) location, or at any other point, and the engineer can calculate the best location and spacing between the Canopy Deck's supporting points and adjust the design to the project's requirements. For example, when the Modular Unit is used as a carport or a solar carport, the designer may need to space apart the columns in accordance with the predesigned parking spots and design the pipe and Cross Beam as needed, or to pick among pre-designed options. In some embodiments, these adjustments do not affect the Upper Blocks, which rest on unchanged Longitudinal Beams but other embodiments are possible. If the Canopy Deck is used to build a building, a large room, a storage facility or other functions, the designer may get the maximum possible space between the columns or any specific spacing, by placing the columns at the Canopy Deck's limits or at any other point, and extending the pipe so it spans from column to column. When the column location or the Deck Frame design does not change the Canopy Deck's area, the loads applied to the drive and control systems do not change.

In order to limit the loads, or to enable the handling, prefabrication or erection, the overall size of the Canopy Deck to be moved or tilted may be limited to what can safely be controlled and to components sizes that can be transported or manipulated. Modular Units allow the large size of some canopy projects, e.g., solar carport projects for hundreds of vehicles, to be achieved by juxtaposing any number of Modular Units or Canopy Decks. Therefore, Modular Units or Canopy Deck sizes can be limited reasonably easy to handle values, e.g., 40 feet by 40 feet, 50 feet by 50 feet, 50 feet by 40 feet, each Modular Unit covering 6, 8, 10, 12, 20 cars, but any size is possible.

In some embodiments, the canopy deck width may be designed to be a multiple of parking spot widths, e.g., 1, 2, 3, 4, 5 or more parking spot widths. The canopy deck length may be designed to be a multiple of parking spot lengths. For example, the canopy deck may be 45 feet wide (approximately 4 parking spot widths of 10 or 11 feet each) by 40 feet long (e.g., two parking space lengths of 20 feet each). Alternatively, the canopy deck length may be designed to span over the driving lane between parking rows. In some embodiments, the columns may be for example 20 feet high. The pipe may be 45 feet long. In some embodiments, the maximum angle may be 30 degrees. The clearance on each edge of the canopy deck may dictate the maximum angle and the length of the canopy deck. It should be noted that the canopy deck may tilt equally in each directions, although this is not required, e.g., when the ground is inclined. In such case, there would be a first clearance on one side and a second clearance on the other side. In some embodiments, minimum clearance height may be chosen to be about 8 feet, about the height of an average parking garage. In some embodiments, the minimum clearance height may be chosen to be about 16 feet to support the height of the average fire truck. Other minimum clearance heights are also possible based on the situation, e.g., person height, animal height, building structure height, tree height, or other natural or artificial impediment height.

In some embodiments, the Upper Blocks (3) are attached to the Deck Frame (26) perpendicular to the pipe (6). In other embodiments, the Upper Blocks are attached parallel to the pipe (6). Any other orientation is possible. Going parallel may be simpler to build and use fewer beams, but going perpendicular is particularly effective when used with a waterproof Canopy Deck or with underlayers (22). For example, when a waterproof sheet is used and creates a channel between the Upper Block Supporting Members (13), and the Canopy Deck is rotating for sun tracking, it may be preferable, like in FIG. 1, to orient the channel (30) perpendicular to the axis of rotation (9) so the rainwater collected in the channel (30) flows downslope and the hot air flows upslope, considering that at any point of the rotation the slope is perpendicular to the pipe (6).

In solar or solar photovoltaic Modular Unit embodiments, inverters are used in some cases. The inverters are installed either as a part of the Upper Blocks or on the column or on other parts of the Modular Unit, or in some cases away from the Modular Unit. In sun-tracking solar Modular Unit embodiments, as well as any Modular Unit embodiment that has a mobile part, flexible cables may be used between the mobile part and the fixed part.

Figure 2:
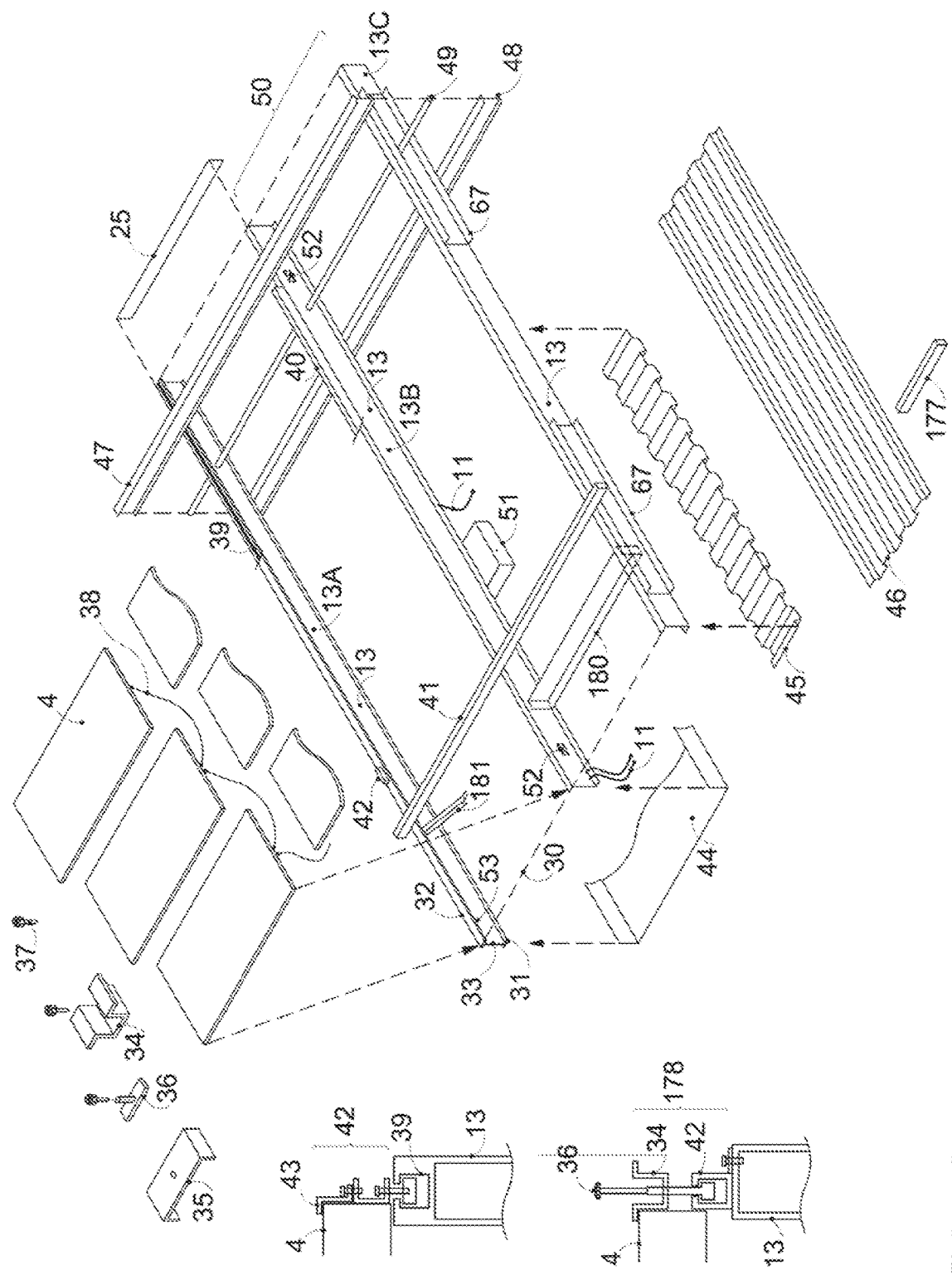
FIG. 2 is an exploded isometric view that illustrates an example of embodiment of an Upper Block.

FIG. 2 is an exploded isometric view that illustrates an example embodiment of the Upper Block. The Upper Block includes roofing components, plates, panels (4) or solar panels which are attached to Upper Block Supporting Members (13) using attachment means like clamps. This description also refers to elements described in other figures. In some cases, elements from this figure and other figures can be combined together.

Upper Block Supporting Member, or UBSM: In some embodiments, Upper Blocks use longitudinal structural members which make them rigid in at least their longitudinal dimension so they can be moved, transported, craned, manipulated, tilted and can span between distant Upper Block Supporting Points (67), sometimes without other support and without damaging deflection. These structural members are also referred to as Upper Block Structural Members or Upper Block Supporting Member (13). Upper Block Supporting Member (13A, 13B, 13C) illustrate example embodiments of Upper Block Supporting Members (13). In some embodiments, for example when Upper Block Supporting Members are made of light gauge cold formed metal profiles, their rigidity is increased by adding cross profiles (180) (or fascia, track, or Transversal Member) between them or connected to them, or legs (181) connected to another member and designed to prevent UBSM bending. Upper Block Supporting Members are made of one or several parts and can be LSC, rails, purlins, beams, Z beams, I beams, HSS beams, standard beams or other beams, profiles and can have any size, shape or material or design. In some embodiments, Upper Block Supporting Members include gutters, drip formers (53), sliders, grooves or Top Portion, Central Portion, Supporting Portion (31). Upper Block Supporting Members can be designed with various dimensions, materials or shapes for instance a Z shape (13B), a I shape, an Omega shape, a C shape (13C), a complex shape (13A), or any other shape and include one or several components. Upper Block Supporting Members can be made of aluminum, extruded aluminum, steel, cold formed steel, wood, composite material or of any other material or design and are in some cases designed specifically to meet a project's requirements, e.g., stiffness requirements, channel height requirements, accessories bearing or load bearing requirements, cable tray, or additional functions or features, or other requirements. In some embodiments, Upper Block Supporting Members include a top portion (32) and a central portion (33). In some embodiments, the Upper Block Supporting Member is made of one piece that includes everything necessary, and in some embodiments, the Upper Block Supporting Member refers to an assembly of several parts, e.g., a main supporting member and additional parts providing specific functions such an attachment component, a top profile for use with specific clamps, or any type of additional component. It will be understood that clamp means any type of clamp or panel attachment system. In some embodiments, the panels (4) are attached directly to the Upper Block Supporting Member, e.g., screwed to the Upper Block Supporting Member without using clamps. Upper Block Supporting Members can be installed in any direction, e.g., parallel to the short or to the long side of the panels (4) or other directions. An Upper Block includes one or more Upper Block Supporting Members or other structural components, which can be parallel to each other or not.

The panels or, in some embodiments, other components like dressing or accessories, are attached to the Upper Block Supporting Member either directly or via intermediate parts. In some cases, the Upper Block Supporting Members are spaced apart the dimension of a panel (4) and are aligned with the panel's edges, which allows two panels to be supported by the same Upper Block Supporting Member. In other cases, the Upper Block Supporting Members are installed so they meet the panel or the accessories or the dressings or other Modular Unit installation requirements. For example, a panel can be installed on more than two Upper Block Supporting Members (13), or a panel can need its supporting Upper Block Supporting Members to be some distance away from the edges. In some cases, the Upper Block Supporting Members are not parallel to each other. The space (50) between two Upper Block Supporting Members (13) may be open to below or closed, e.g., using a bent sheet (44) or a Waterproof Barrier spanning between two Upper Block Supporting Members and going up on the Upper Block Supporting Member's side face in order to create a channel, a ventilation channel or a waterproof channel, a flat or transversally corrugated sheet (45) or longitudinally corrugated sheet (46) which may be supported by profiles (177) affixed to Upper Block Supporting Members, Deck Frame or other members.

In some embodiments, Upper Blocks include panels, solar panels (4), skin or roofing components, or other components that are attached to Upper Block Supporting Members (13), either attached directly to the Upper Block Supporting Members, e.g., using snap systems or fast fasteners or other fastening systems, or secured using any type of clamp systems (34, 35, 36, 37) or any attachment systems, and are in some cases wired together (38). In some cases, panels are connected and grounded at the same time that they are attached. Clamps can be short or long. Clamps can be designed so they attach to the Upper Block Supporting Member and press the panel (4) against the Upper Block Supporting Member in order to hold it. Some embodiments use U clamps (34), Z shape clamps (43), top clamps (35), screws or self-tapping screws (37), T nuts and bolts (36) locked in a groove (39) that exists on the top of some embodiments of Upper Block Supporting Member, or other clamp shapes. Depending on the Upper Block Supporting Member design, the clamps can be screwed directly into the Upper Block Supporting Member, or can be attached using bolts adjusted in sliders or grooves part of the Upper Block Supporting Member system or other systems, or be attached to the side or the bottom of the Upper Block Supporting Member. In some cases, a gutter is created in order to collect water penetrating through the clamp attachment screw holes. In some embodiments, the panel frame and the Upper Block Supporting Member, or a component added to the Upper Block Supporting Member or to the panel, have shapes and features that allow the panel to just snap into place without the need of traditional screwing.

In some embodiments, the panels are not attached directly to the Upper Block Supporting Member but are attached to one or more secondary systems like attachment profiles (41), or additional devices (40) which can be for example approved attachment profiles or clamps and can be longitudinal, transversal or in any other position, or panel attachment systems (42) affixed to the Upper Block Supporting Member (13) which can directly hold the panel (4) or hold an attachment system for instance a clamp or other systems. For example, it is sometimes beneficial to use pre-approved attachment systems, such as UL rated rails (42) or UL rated rails plus screw, nut and clamp systems (178), because this system or other systems combine mechanical and electrical properties or because they are already listed, certified, approved or simply more convenient. Such systems, or other accessories or systems, are in some embodiments added to or integrated in the Upper Block system in order to add one or more particular functions or properties. In some embodiments, the panels are attached to Upper Block Supporting Member from below, either directly or using connectors. For example, in the case of solar panels which have a lower frame with attachment holes, the panels may be attached to the Upper Block Supporting Member using screws in these holes or in other locations, or they can be attached from below using clamps or other systems.

Waterproofing: In some embodiments, Canopy Decks are waterproof, or even airtight in some cases, or include underlayers or waterproofing components. Waterproofing is achieved by using a "Waterproof barrier" (44), or WB, that prevents water coming from outside the Modular Unit e.g., from rain or from the inside the Modular Unit like condensation, to reach below or behind the Modular Unit. Some embodiments of Modular Units can be used to provide waterproofing to a place or a structure, e.g., when used to create a roof, a façade, a canopy, an awning or other structures. In some embodiments, a waterproof layer (44) spans from Upper Block Supporting Member to Upper Block Supporting Member and goes up on the vertical walls of the Upper Block Supporting Member on each side like a flashing system. In some embodiments, a board or a membrane spans from Upper Block Supporting Member to Upper Block Supporting Member and is connected to the Upper Block Supporting Member or to the flashing systems or to the waterproofing systems in a waterproof manner so a waterproof layer is created below or behind the panels. In some embodiments, a waterproof layer (45, 46) spans several Upper Block Supporting Members or is installed below or behind the Upper Block Supporting Member. In some cases, this waterproof layer (45, 46) is a corrugated product, such as a metal decking for example, which is able to span long distance between supporting Upper Block Supporting Member or they can be supported by other members, which may be attached to Upper Block Supporting Members or to other components. In some embodiments, the waterproof layer is a sheet supported by a board or a structure. In some cases, the Upper Block Supporting Member or other components provide drip formers that prevent water from going behind or below the Waterproof Barrier. The Waterproof Barrier can be made of any impervious material, for instance membrane, metallic sheet, plastic, fiber glass, synthetic materials, molded, extruded or formed materials or other materials. In some cases, the waterproof sheet is as long as the Canopy Deck or as the rails, so there is no leak. The Waterproof Barrier can be self-standing or it can be supported by an underlying material or a board. All waterproofing systems can also be designed for protection against other liquids or fluids, dust or other threats. Such underlying system can also be used for purpose non related to waterproofing like ventilation, shading, protection against hits like stones or flying objects, stones, plants, animals or for other purposes. In some embodiments, Upper Blocks include channels (30), ventilation channels, MFBs, boards, fascia, insulation and other features or accessories.

Transversal Members, or TM (47, 48, 49): In some embodiments of the invention, Modular Units use Upper Block Supporting Members (13), which provide the Upper Block with rigidity in their longitudinal direction. If the Modular Unit or Canopy Deck is to be transported, moved or craned without excessive deflection, it may also need rigidity in the transversal direction. In some cases, one or more Transversal Beams or TBs, profile members or structural members, is used to create additional rigidity to the Upper Block and will be referred to as Transversal Member or TM (47, 48, 49). Transversal Members can have any design, size or material and can be attached to the Upper Block Supporting Members or to any structural member at any convenient location, any angle or position. Transversal Members can be a permanent feature of the Upper Block or of the Canopy Deck. For example, it can be a part of the Deck Frame or of the supporting structure, can be used to strengthen the Upper Block Supporting Member as the cross profiles (180) do, or can be a temporary device used for example during manipulation, craning, transportation or other temporary phases and then removed or placed differently. In some cases, a forklift's fork can act as a temporary Transversal Member. When Transversal Members are used, they may support the Upper Block from below (48) or from above (47) or in some cases they can go through (49) the Upper Block, through the Upper Block Supporting Member (13), at the tip of the Upper Block Supporting Member or be in any location and have any design. Adding one or more Transversal Members to the Upper Block helps in some cases make the Upper Block, or the Modular Unit stiffer by providing rigidity, which means the Upper Block or Modular Unit can span longer distances in both directions between supporting points and thus can be attached or supported in fewer points. Different solutions can be used. The Modular Unit, Canopy Deck or Upper Block may be temporarily rigidified during the transport phase using reinforcing Transversal Members, frames, jigs, frameworks, frames, bars or members that can be attached to the Upper Block, Modular Unit or the Canopy Deck and removed afterwards, or the FMU may be built structurally rigid in one or several directions by using one or more Transversal Members. An Upper Block Supporting Member may be attached to one or several Transversal Members.

In some embodiments, Modular Units, Canopy Decks or Upper Blocks have one or more Transversal Members, for example located substantially close to the ends of the Upper Block Supporting Member or at a distance from the ends or located anywhere along the Upper Block Supporting Member, and each one of the one or more Transversal Members may need to be supported in two points or more. The Transversal Member, in some cases of application, can also be part of or fastened to a pre-installed structure, Deck Frame, Attachment Component (AComp) or supporting system. In some embodiments, a Canopy Deck or a Upper Block may include more than two Transversal Members. Not all the Transversal Members are necessarily used to provide fastening to a supporting structure. In some cases, sheathing systems or bracing systems or "MFBs" can be used to complement the Canopy Deck's rigidity. Transversal Members may help the Upper Block remain rigid when it is manipulated or lifted and can be used as a beam used to rig the Upper Block, so it can be craned or moved without deflection and without the lifting cables touching the panels or covering material. In some embodiments, one or more small or large Upper Blocks are attached, for example close to their Upper Block Supporting Points (67), to one or more Transversal Members, which can be attached to a supporting structure. This allows numerous different scenarios. For example, several large multi panel prefabricated Upper Blocks, equipped with Accessories, can be mounted on one or two Transversal Members, which are lifted or moved to a host structure and attached to it in only two or four points, which can be done in minutes. In such an example of Plug and Play embodiment, a hundred solar panels can be attached and connected in minutes.

In some example embodiments, when the Upper Block is equipped with solar panels (4) that are wired together (38), the Upper Block offers one or several cables (11) or hoses to be connected to the cable (12) or fluid circuit of the host structure or the mainframe. The Upper Block in some cases also includes power inverters (51), sensors (52), cameras or other Accessories. In some embodiments, the Upper Block includes one of several fascia (25) elements which can serve for aesthetic reasons, for protecting a channel from undesired penetrations for instance natural elements, animals, plants, sand, or any other element, for creating a rigid connection between Upper Block Supporting Members (13), or for other purposes like holding of lifting the Upper Block. In some embodiments, the fascia is an active component, e.g., a luminous device, a sensor, a screen, an active louvre, it can include accessories, fans, etc. It can be solid, hollow, drilled or have any shape, material or function.

Being made as described above, the Upper Block has the advantage of being a rigid block that can be manipulated, moved, craned or rotated, and as such, it can be assembled away from the structure it is to be attached to. In a solar, electrical or electronic embodiment, or in a fluid-based embodiment, the Upper Block appears as a finished or semi-finished and wired, or hosed, unit where the internal connections are already made and in some cases tested and that provides a very simple set of connectors (11) so connecting this Upper Block unit to a system or a network is very quick and simple. For example, if the Upper Block is a 24 solar panel unit, connecting them to a larger electrical circuit only takes connecting a few cables in lieu of traditionally connecting all the panels individually.

Figure 3:
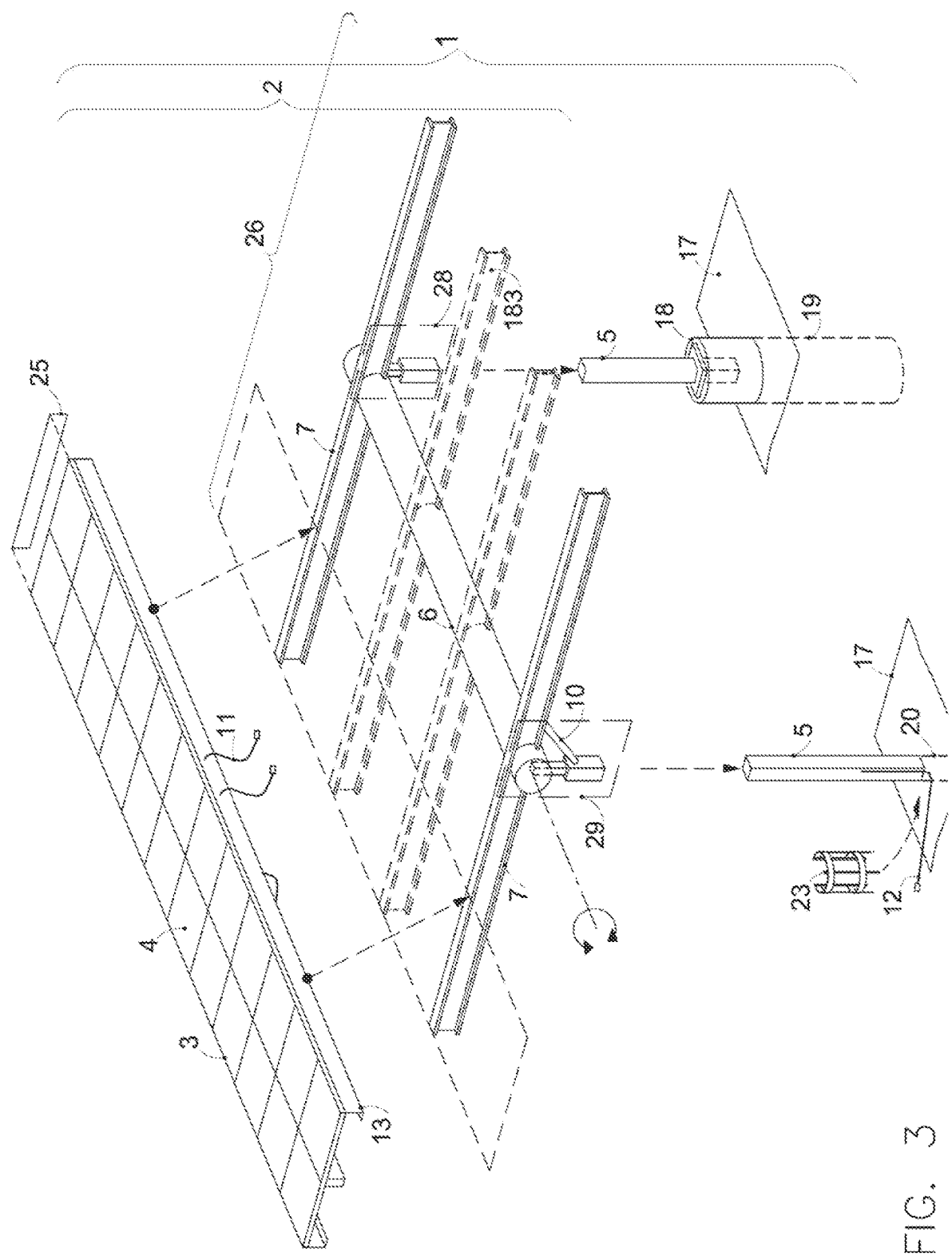
FIG. 3 is similar to FIG. 1 but illustrates another embodiment of the invention in which the Upper Blocks' (3) Upper Block Supporting Member are parallel to the Pipe.

FIG. 3 is similar to FIG. 1 but illustrates another embodiment of the invention in which the Upper Block Supporting Members (13) are parallel to the pipe (6) instead of being perpendicular as in FIG. 1. This description also refers to elements described in other figures. In some cases, elements from this figure and other figures can be combined together.

Figure 4:
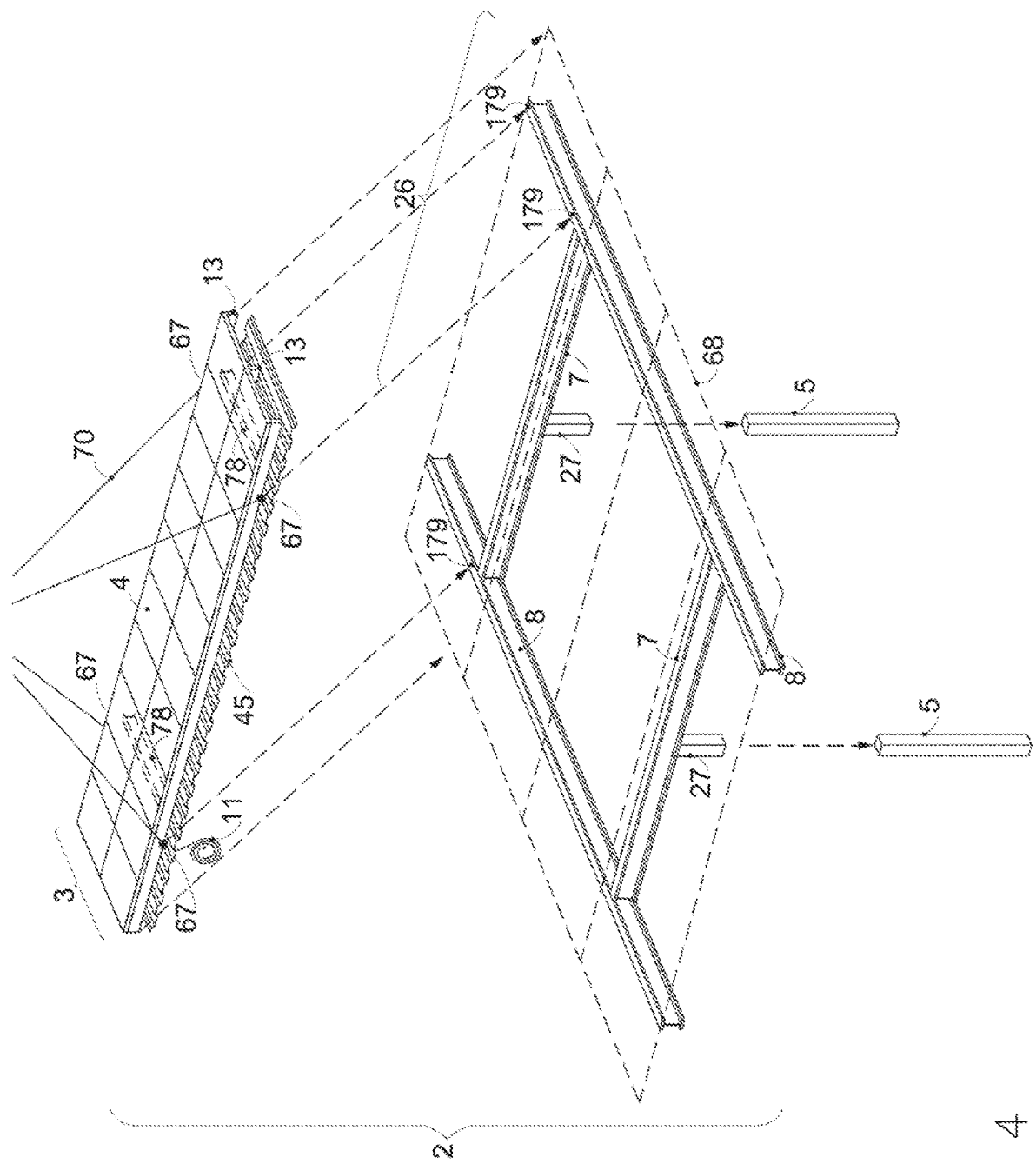
FIG. 4 is similar to FIG. 1 but illustrates another embodiment in which the Canopy Deck is fixed.

In this example embodiment, the Modular Unit (1) includes one or more columns (5) founded in the ground (17) either using piers (19) or other types of foundation (20), anchorage or spread footer or attachment. Other types of foundations are possible too, for example for using special erection techniques. The columns can include pedestals (18) or outer shells (23) for protection or aesthetics. In cases with several columns, the columns spacing and design may vary based on the project's specifics. In some cases, other structural members are used in lieu of columns. On top or on the side of the columns is mounted a fixed or rotating Canopy Deck (2) using one or more Drive Systems (10). In this example embodiment, the Upper Blocks may be assembled on site or moved, conveyed or craned from a place of preparation to a place of installation like illustrated. The Upper Blocks may be moved or craned onto the already installed host structure or Deck Frame, or may be moved or craned onto the host structure or the Deck Frame (26) while the Deck Frame is still in a position of preparation for instance on the ground (17) or on an ad-hoc supporting structure. The Canopy Deck is connected to the columns using at least a Rotation Enabling Connection (28) or a Rotation and Drive Connection (29), which in some embodiments is part of the Canopy Deck assembly and that is attached to the Deck Frame's pipe (6) or Cross Beams (7) or structural members. In the embodiment of FIG. 1 or FIG. 4, the Canopy Deck uses a Deck Frame (26) which includes a pipe (6) and one or more Cross Beams (7). The Upper Blocks (3) are attached to the Deck Frame. In this embodiment, the Upper Block's Upper Block Supporting Members are attached to two Cross Beams (7) or more (183).

In this embodiment, the columns (5) appear substantially centered relative to the width of the Modular Unit. The columns (5) and the pipe (6) are substantially aligned with the center of the Cross Beams (7). In other applications, for example, when a Modular Unit is used to create solar carports covering a single lane of cars, the columns or supporting members or pipe may be on one side of the Canopy Deck so the Modular Unit is not symmetric. The columns and pipe may not always be aligned in order to allow for any number of configurations.

FIG. 4 is similar to FIG. 1 but illustrates another embodiment in which the Canopy Deck is fixed. This description also refers to elements described in other figures. In some cases, elements from this figure and other figures can be combined together.

In other embodiments, the Canopy Deck (2) does not have a pipe to coordinate the tilt angles of the Cross Beams (7) and could move or tilt if more than one Cross Beam or more than one side of the Canopy Deck (e.g., when a Canopy Deck uses a 3d truss in lieu of Cross Beams) is equipped with a Drive System, or if the torsional rigidity is provided with another system, e.g., a 3d structural mesh or truss. Several Drive Systems may be synchronized so the Canopy Deck will not deflect when the Drive System is in action or under loads, which is useful for some applications like photovoltaic solar Canopy Deck or other applications, or the drive systems may be used to create unequal movements, in order for the Canopy Deck to deflect and take various shapes, which may be very useful in some applications. In some embodiments, the Canopy Deck is meant to be fixed and does not need a drive or a control system. Therefore, in this particular embodiment, there is no need for a pipe to synchronize the Longitudinal Beams' motion. However, as could any other Deck Frame or framing design, it takes advantage of some of the processes, described in other figures, which allow installing a Modular Unit in a very short time and thus for less labor cost.

Thanks to its Upper Block Supporting Members (13), the Upper Block (3) is structurally rigid in its lengthwise dimension and only needs to be supported by two Upper Block Supporting Points (67) per Upper Block Supporting Member but in other cases, one, three or more supporting points could be used. In this embodiment, the pre-wired (11) Upper Block is to be installed on the Deck Frame (26) with the Upper Block Supporting Member (13) perpendicular to the Longitudinal Beam (8), which are advantageously located to meet the Upper Block Supporting Points (67) in Fastening Points (179). In this embodiment, the Longitudinal Beam (8) are the element that brings transversal rigidity to the Upper Block (3) once it is definitely installed at its final position (68). Once several Upper Blocks are installed on the Deck Frame, the two Longitudinal Beams are the main supporting structure for a large number of solar panels (4) or for a large area of cover material. However, while the Upper Block is being manipulated, transported or craned before being attached to the Longitudinal Beams, it may need a temporary transversal beam or Transversal Member (78) or a member connecting together the Upper Block Supporting Points (67) of one or more Upper Block Supporting Member (13) to prevent transversal deformation. The Transversal Member (78) may be permanently installed or can be used only during the time of transportation or as long as the Upper Block is not safely attached to the Longitudinal Beam (8) or to any other rigid supporting member. The Transversal Member (78) can also be used as attachment points for a crane rigging (70) or for other holding systems when the Upper Block is to be moved or manipulated.

In this embodiment, in order to simplify the installation phase, an Upper Supporting Column (27) is provided at the point of connection between the columns (5) and the Deck Frame, so if the finished and equipped Deck Frame is craned down onto the column or lifted up to the column the installer finds an Upper Supporting Column ready to be bolted, connect or weld in a few minutes. When there are several columns (5), the distance between them can be set to any value as long as the Cross Beams can be placed in accordance with the columns.

In other embodiments, the Upper Blocks (3) can be installed on a Deck Frame (26) that does not have Cross Beams (7). For example, if the columns or supporting points, instead of being close to the center of the Deck Frame's width and supporting to Cross Beams, are located such that they can support the Longitudinal Beams, the Cross Beams may not be needed if the Upper Blocks are designed to span the distance between the Longitudinal Beams. Such an embodiment will still be able to be moved or lifted from an off-structure assembly location to its final destination, possibly with adding a temporary Cross Beam or any rigidity providing member, above or below the Upper Block, to help keeping the crane rigs at a constant spacing while the assembly is being moved or lifted by angled rigs.

Figure 5:
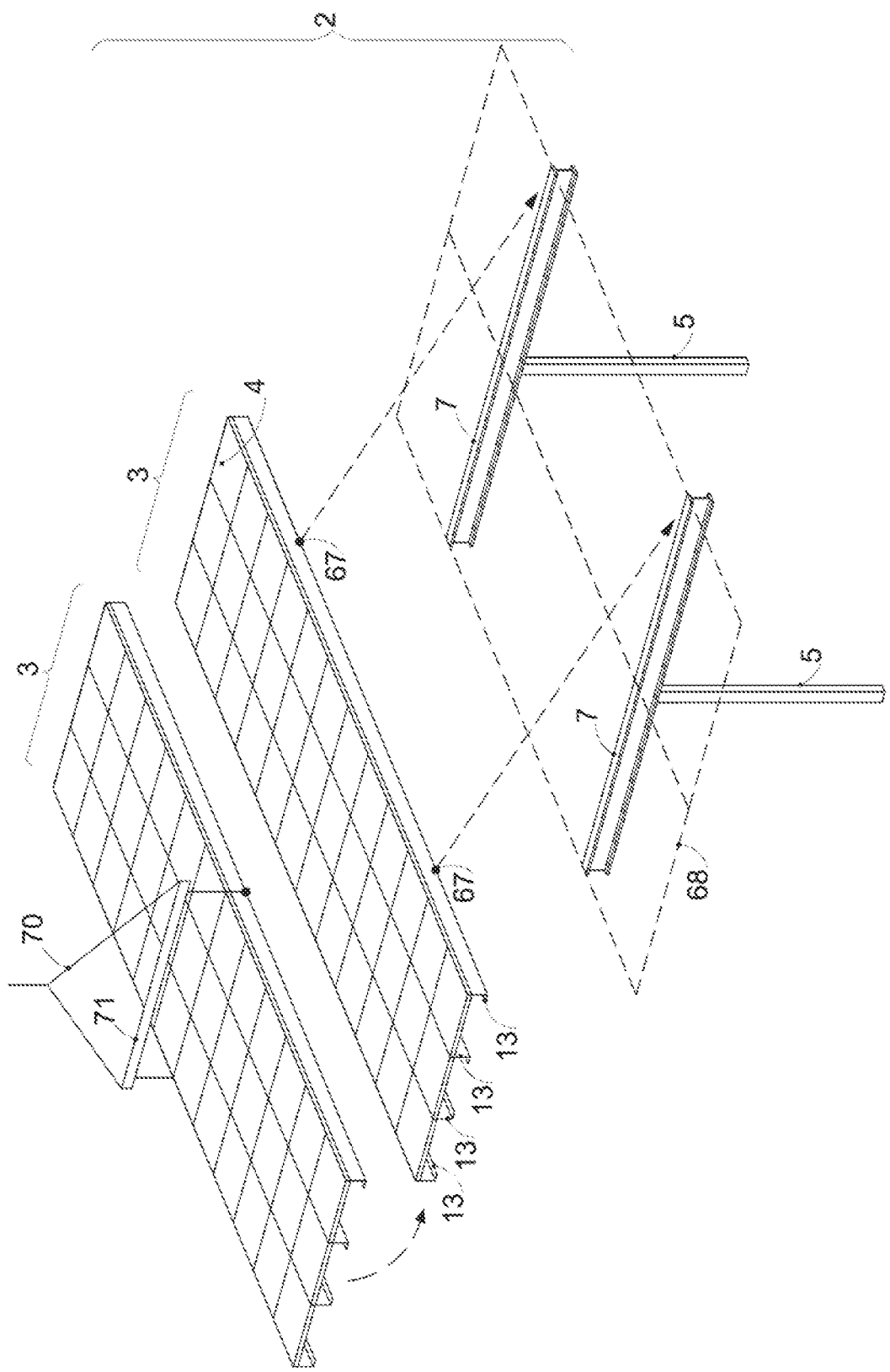
FIG. 5 illustrates another embodiment in which the Upper Block's long dimension is perpendicular to the Cross Beam instead of parallel to the Cross Beams.

FIG. 5 illustrates another embodiment in which the Upper Blocks long dimension is perpendicular to the Cross Beam instead of parallel to the Cross Beams. This description also refers to elements described in other figures. In some cases, elements from this figure and other figures can be combined together.

In this embodiment, the Longitudinal Beams are not needed as the Upper Blocks (3) have structural Upper Block Supporting Members (13) designed to span between two or more Upper Block Supporting Points (67) without other intermediate support. In this example, the Upper Block Supporting Points (67) are supported by two Cross Beams (7), but embodiments with one, three or more Cross Beams, or with other types of supporting structure are also possible. This embodiment of Modular Unit is meant to have a fixed Canopy Deck so the Upper Blocks do not move after their installation, but in other embodiment, adding drive systems controlling the Cross Beams would allow the Canopy Deck to move or tilt.

The Upper Blocks in this example embodiment have four Upper Block Supporting Members and three rows of photovoltaic panels (4) but Upper Blocks could be designed with any number of panels and any number of Upper Block Supporting Members. The Upper Blocks (3) can be assembled on site. However, it is sometimes more efficient to assemble them off structure, or on the Deck Frame but in another location or position, and to move them to their final destination (68).

The Canopy Deck (2), which in this embodiment is the assembly including any number of Upper Blocks (3), Cross Beams (2), Upper Block Supporting Members (13) and panels (4) or cover material, can be assembled off structure and moved to its destination, which is on top of one or more columns (5) or on any pre designed supporting structure. The Canopy Deck or the Upper Block can be moved or lifted to its final destination by means that does not create deflection, torsion, or tension, e.g., a lifting table, a forklift, a crane (70), a robotic arm or system, or other moving device. If it is moved or crane by means that involve creating a tension, like the crane riggings tend to do, then a permanent or temporary jig, Transversal Member, or frame or framework (71) or Longitudinal Beams, placed above, below or laterally to the Upper Block, may be used to prevent these tensions from affecting the Upper Blocks.

Figure 6:
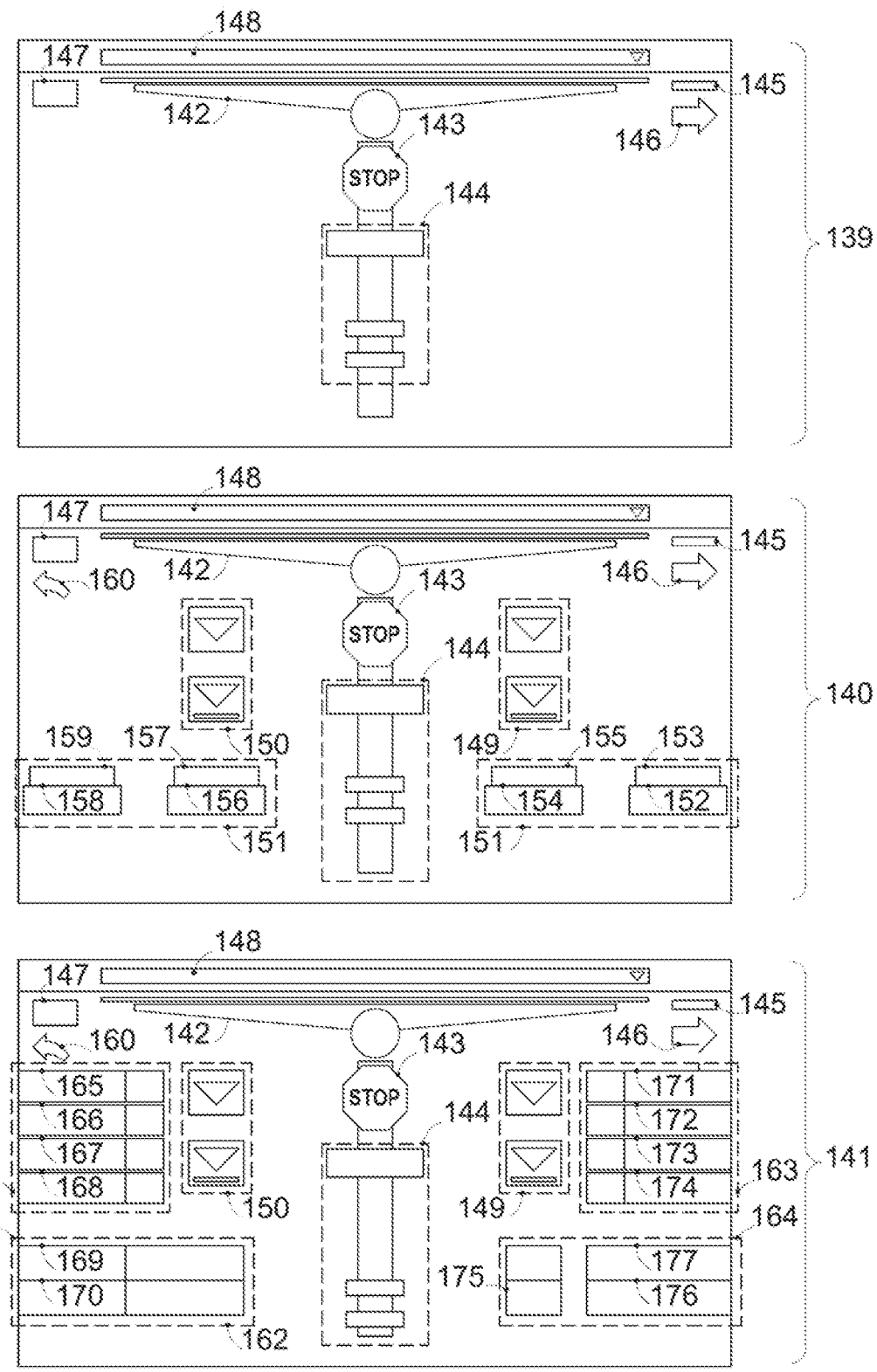
FIG. 6 illustrates examples of embodiments of Modular Unit control screens.

FIG. 6 illustrates examples of embodiments of Modular Unit control screens. This description also refers to elements described in other figures. In some cases, elements from this figure and other figures can be combined together.

When Modular Units are controlled electronically, they are controlled by a computer, a micro controller, a PLC (programmable Logic Controller), or other electronic systems, which use the data collected by sensors (for instance, tilt angle) to order a drive to take an action (tilt the Canopy Deck, for example). In some embodiments, each Modular Unit is fully autonomous, and its own electronic controller runs independently. In some embodiments, several Modular Units are controlled by one or more controller, which can be installed on one or more Modular Unit or elsewhere. In some embodiments, Modular Units are controlled remotely, for example, via a data connection. In some embodiments, several Modular Units are coordinated by a group controller which regulates if or how they work in synchronous mode. In an example embodiment, each Modular Unit has its own local PLC, which reads a tilt measurement system (for example an inclinometer measuring the Canopy Deck's tilt angle, an encoder or a pulse generator counting the drive's revolutions, or other systems) and runs a program it has in memory to control its own motor. In some embodiments, each Modular Unit's PLC is a slave, or is connected to or controlled a master controller, like another PLC or a computer or a remote controller.

An example architecture is as follows: A master controller is located at a head point, for example, in a manager's office. The master controller is in charge of connections to the exterior world, e.g., the internet or VPN connections, and in some cases allows, through an identification system—sometimes with several levels of authorization, external managers to monitor the systems, in some cases to give instruction, change parameters, or even update the programs, and in some cases to upload data to remote data servers for analysis. In some cases, a remote system can be monitored or even controlled from a smartphone. In some cases, the master controller, or one of the controllers also monitors a local or remote weather station for example to instruct the Modular Units to reach a pre-defined safe position when winds exceed a pre-defined threshold, or to go to any setting or position in reaction to any information or data point (for example, solar radiation level, temperature, snow, rain, human activity, etc.). Weather or event alerts can also be provided by internet or by a manager. The master control in some cases controls one or more Modular Units, or one or more groups of Modular Units. For example, complex sites may include a large number of Modular Units located in various areas, which may deal with different conditions like different axis azimuth, different shading or wind patterns, or different user requirements (e.g., clearance requirements, cleaning, snow or other parameters), which may result in several groups or sub-groups of Modular Units running different programs or programs with different parameters. In some embodiments, Modular Units, be they large scale canopies, carports, buildings or smaller domestic canopies, are able to Tune Up themselves, to react to Situations, to record and apply Space Settings or to learn from experience. Users or site managers in some cases have control over the Modular Units, either locally or remotely. Several types of user interface can be used. In some embodiments, a single Modular Unit is controlled by a touch screen or a computer. In some cases, the control panel also includes physical buttons with additional functions. In some cases, each Modular Unit or electronic controller has a touch screen or other human machine interface systems, which allow the user to control the program, or the parameters or the machine's behavior. In some cases, this human control is done at the master controller level, or even remotely, for example, via the internet or via electronic networks. Various users may have access to different functions in relation with their role and clearance levels. The access may be controlled by passwords or other identification systems.

In some embodiments, Modular Units run complex programs or participate in complex programs. For example, Modular Units in some cases have sensors like weather, environment, temperature, cameras or other sensors which may be used either locally or at a large scale to monitor an environment: weather data, security applications, surveillance, parking spaces monitoring, agricultural or industrial applications, or many other applications. Modular Units can be active. They can emit sound, voice, lights, signal, radio signal. They can move, etc. in order to make a difference in the environment. They can do it autonomously, or at a site level. They can be part of a wider network. Some embodiments of Modular Units have special programs for snow times (e.g., tilt to a pre-defined position to keep the snow on the roof and/or tilt to let it fall on the ground, tilt to a certain angle to collect more heat or extract more heat, tilt to a certain angle to facilitate cleaning operations or self-cleaning in case of rain, tilt to take advantage of certain sun light patterns, tilt to optimize nightly lighting, tilt to certain angles in case of fire, in case of truck circulation, in reaction to certain factors, upon a software order, etc.)

In some embodiments of Modular Units as sun-tracking solar carports, the person responsible for managing a site's Modular Units has access to some of the following settings or functions, in some cases either for each Modular Unit individually or for a group or for the whole site. Example functions include stop the system, run one of the preset automatic modes, modify the preset modes or create new modes, move the tilting roof or in some cases other active parts to a specified angle, position or setting, e.g., go to a certain tilt angle, go to the max angle, define a clearance level, run one or more cycles of predefined behaviors (e.g., go to the max right, then max left and back, set a specific clearance level, set angle tilt limits or movement limits, define or modify the automatic sun-tracking system, define what to do at night and when (e.g., stay where it is, go to a pre-determined position, go the next morning's position, etc.), define the movement speed, define how often and how much the tilt angle or the position is updated based on the driving parameter (e.g., define how often to move in order to track the sun, either measured in time or in angle), define what to do in case of strong wind, define what strong wind is and how it is measured, define what data to export, store, etc., and many other parameters or settings. In some embodiments, more parameters are added when more functions are added like lighting, surveillance, sound, etc.

At system setup, some parameters may be set either on the site or at the time of preparation: location, azimuth, altitude, local settings, connection systems and protocol, etc. In some cases, additional parameters may be added like environmental specific patterns, self-shading, site shading, backtracking, etc. In some cases, programs may be loaded or pre-loaded. In some embodiments, one of these programs is used to calculate the Modular Unit's sun-tracking movements. In some cases, it uses a table which contains the sun's position hour by hour for the next decades. The program then calculates the Canopy Deck's optimal angle based on its location, azimuth or local parameters, measures the difference between the optimal angle and the current angle and starts moving the Canopy Deck until the optimal angle is reached. This process is repeated multiple times during the day.

In some embodiments, the Modular Units or their controlling systems record or log data, e.g., the inputs on the controlling screens or devices, the data coming from the sensors, the motor actions, all other actions, communications records, etc. When they include sensors or cameras that need to exchange data, the Modular Units in some cases use this data for themselves or export the data to a master controller or to an outside network or internet, sometimes vis secured VPN connections or other secured protocols.

For a simpler user interface, the software program that runs on the computer or controller that controls the drive enables, in some embodiments, the user to set a permanent or temporary clearance or maximum height value and to store values in memory, possibly matched with schedules. The program then calculates the required Canopy Deck angle.

In some embodiments, the user can also program much of the drive's or Modular Unit's behavior for instance how, when, and why it moves or takes any action. It can also define one or several areas or angles to avoid at certain times or required passage points and times. The user can also program the drive's behavior in case of strong wind based either on local sensors or on information provided. The user can also program the device to perform certain actions in response to certain triggers or parameters. In some cases, the computer is able to use camera visions technologies to take action based on its understanding of what its cameras show. For example, it can analyze the images to see if the parking lot is occupied or if an obstacle is in the Canopy Deck's way or if the light intensity justifies changes in the sun tracking program, it can measure or verify the Canopy Deck's angle, or detect any abnormal situation, or detect specific conditions, a car break-in, or can manage EV charging stations, parking rights, parking payment, etc.

The system may be equipped with various sensors to monitor various metrics, such as wind speeds, forces applied, etc. to adjust the various angles at the various times of day or times during the calendar year. For example, if the system detects high winds during certain times of day during certain times of the calendar year, the system may adjust the angles to avoid unwanted stresses.

An example of control screens and displays is described below. Many other screens designs or variations are possible. The illustrations are given as examples.

Display 1 (139) is the home screen. It shows a schematic image (142) of the Modular Unit viewed from the user's point of view in order to make it easy for anyone to understand. In some cases, it has either a fixed or mobile Canopy Deck. It also shows a "Stop" button for emergency stop (143) and a Menu button (148). This screen shows a dashboard of current conditions (144) such as for example the sun's angle, the solar array's angle, the wind speed, the temperature, the time and date (145), the Modular Unit's identification (147). Non identified users can only press the emergency stop button, which in some cases triggers an alarm or warning either locally or on the manager's desk. In order to gain control of the Modular Unit, the user hits the enter key (146), which leads to display 2. In some cases, all data is logged, which in some cases allows to record the actions performed by users, or sensor or activity records, and save or export this record for future analysis. In some cases, hitting the Stop button opens a new screen which display a big Stop sign and gives the option to "undo" hitting Stop or to revert to normal operation, or to call for help, or to sign in. All screens may have a navigation window, for example at the top.

Display 2: identification. In some embodiments, this screen gives access to one Modular Unit's next screens, or it gives access to a network page which defines which network of Modular Units, group of Modular Units or individual Modular Units in a network will be addressed in the next screens. In some embodiments, when the control occurs on a large computer screen, it is possible to display several screens at a time, which gives a better view of complex networks. In some embodiments, control after identification can be granted for a limited time, in some cases with password or other identification techniques and several levels of authorization giving various levels of control, and the screen after a predetermined time goes back to the home screen.

Display 3 (140) opens once ID check, if any, was successful and control of one or more Modular Unit has been granted. It displays some of the information of Screen 1, like a dashboard of conditions (144), a back button (160), actions buttons (149, 150), a choice of programs (151): the currently running program is highlighted or blinking or indicated another way. In some cases, a program button is surmounted with an indication of the current setting. It shows for example "track" (152) which blinks when automatic sun-tracking is the active program, or is to be hit to start tracking, and the surmounting (153) box shows the name of the currently selected program. Button (154) is "Go To", which tells the system to move to a predetermined angle or position or configuration, and the preset angle or configuration name is indicated in the box above it (155). Button (156) is "Cycle", which instructs the system to perform a number of predetermined cycles, and the number of cycles to perform is indicated above (157). This is useful when the system needs to run for example from full tilt east to full tilt west, or any other set of operations, for example for maintenance or testing purposes, for snow removal, for greasing, for demonstration, etc. Button (158) instructs the system to go to a "Park" position which has been predefined, and the predefined value is indicated above (159). In a simple sun tracking tilting Modular Unit, a park position may be pre-defined, for example a wind safe position, a max clearance position, a night rest position, etc. can be pre-determined. In this example, there are actions buttons: two arrows (149) on the right, and two on the left (150). One of the arrows, in this case the upper one, runs the Drive System in the rightward direction as long as the button is pressed. The lower button is of the "hit and forget type": press it once and the system will run until it reaches the maximum allowed angle or position in this direction. Button (146) leads to more settings pages. Button (143) is a "Stop" button.

Display 4 (141) still shows in the background a profile of the concerned Modular Unit, and still has a "Stop" button (143), an identification (147), a time indication (145), an "enter/settings" button (146), the same arrow groups (149, 150) and information group (144) as other screens, as well a menu button (148). Depending on the manager's choices, this screen may be available to everyone, it may be restricted to an authorized category of users. This screen shows the core settings, in this example, of the sun-tracking system: Four groups of buttons (161, 162, 163, 164) show several lines each one having a button name and a box for setting the value. Button (165): "Max angle left" defines at what measured angle the system will stop moving this direction; Button (166): Max angle right" defines at what measured angle the system will stop moving this direction; These two max angle values are program settings, they are independent from any electrical disconnection that can be implemented at a maximum angle for example by using limit switches or proximity sensors, which are an additional safety measure; Button (167): "Delta angle" defines how closely the solar Canopy Deck tracks the sun by defining the how many degrees, or fraction of degrees, the sun angle may change until the Canopy Deck turns to match it again (another parameter defines if the Canopy Deck moves beyond the sun angle by the same value in order to reduce the number of movements); Button "Axis alpha" (168) is about axis alignment; Button (169) defines the Modular Unit longitude and latitude so the program can accurately calculate the sun path and the sun-tracking strategy; Button (170) "Log time" defines the frequency of the information logging; Button (171) defines what angle the Canopy Deck must go to in case of stormy wind; Button (172) "Storm speed" defines what wind speed is a stormy wind; Button (173) "Delay" defines the period of time the wind speed is averaged on and monitored on; More sophisticated settings or programs are implemented in some cases in order to predict upcoming wind gusts or storms. Button (174) "Park" defines the Canopy Deck's park angle; Button (176) is a save button for the program settings; Button (177) sets the auto modes; Button (175) sets the "Go To" angle mentioned on Screen 3.

In some embodiments, more screens contain more technical information, more settings, communication logs, network and safety parameters, network administration, back tracking parameters and other information. Master controller screens or remotely accessible screen, or smartphone versions of the screen are different in some embodiments.

Figure 7:
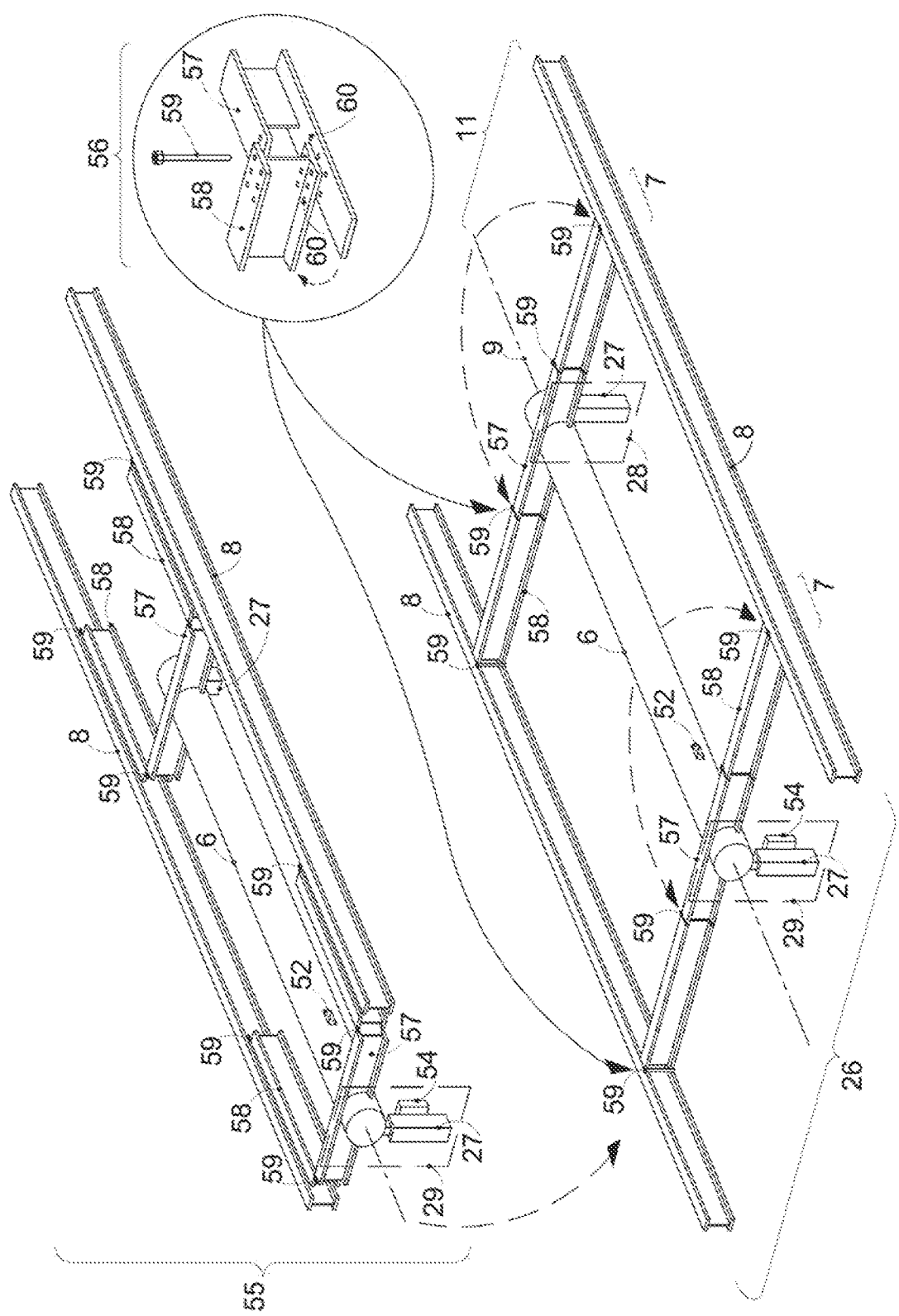
FIG. 7 illustrates an example of Deck Frame in a foldable embodiment.

FIG. 7 illustrates an example of Deck Frame in a foldable embodiment. This description also refers to elements described in other figures. In some cases, elements from this figure and other figures can be combined together.

This example of Deck Frame (26) includes a pipe (6) to which are attached two Cross Beams (7) to which are attached two Longitudinal Beams (8). Foldable solutions exist in various Deck Frame embodiments and this figures only illustrates one example. The Deck Frame (26) is designed such that it can be affixed to columns or via Upper Supporting Columns (27) that are attached to the Deck Frame using Rotation and Drive Connections (29) or Rotation Enabling Connections (28). The Deck Frame's rigid structure allows it to move or to rotate around an axis of rotation (9). Upper Blocks or accessories like electrical or electronic boxes (54), inverters, cameras, sensors or other accessories (52), as well as Drive System can be affixed to it as described in other figures.

In this embodiment, in order to improve the installation labor time and the quality control, the Deck Frame (26) is foldable so it can be largely finished, equipped and tested in the shop, folded to a size compatible with road transportation and quickly unfolded on site. This figure illustrates examples of the folded Deck Frame (55), the unfolded Deck Frame (26) as well as the main hinges (56). This figure illustrates an example of folding/unfolding process and technologies for one example of Deck Frame embodiment, but other embodiments of pre-mounted or partly pre-mounted Deck Frames include other folding or pre-assembling solutions. For example, Deck Frames with no Longitudinal Beams, as described in other figures, may also be pre-mounted and folded for transportation, for example with the Cross Beam articulated to the pipe, or with column articulated to the Cross Beam, or other embodiments. In other embodiments, for example in the case of Deck Frames with no pipe, other components for instance Cross Beam and Longitudinal Beam or Cross Beam and column, or other combinations, may be pre-assembled with articulated connections to be unfolded on site. Another figure illustrates an example of a Modular Unit using column and Cross Beams that may be articulated and folded for the early phases of erection: in such a case the column/Cross Beam assembly may be pre-assembled off site and transported as an assembled unit that will be unfolded on-site and the pipe, if there is a pipe, may be connected on the site. Other embodiments with more than one column or Cross Beam or other structural components connected together and unfolded are possible too. Other embodiments using other combinations are possible.

In this embodiment, the Cross Beams (7) are made of two parts: a central part (57) which is affixed, bolted or welded, to the pipe (6) and is fixed, and a foldable arm (58), which is connected via hinges (56) to the central part (57) and to the Longitudinal Beam (8). When the Deck Frame is to be transported, it is folded, which reduces its width to a dimension compatible with a hauling means like a truck, a train or a container. The Cross Beams rotate up to 90 degrees and the Longitudinal Beam (8) comes closer to the pipe (6) in a sensibly parallel position. The Deck Frame can be locked in this position until it is unfolded.

Some embodiments of the invention allow turning Cross Beams (7, 57, 58) into foldable beams by splitting it in two or more parts, the Cross Beam central part (57) and the Cross Beam foldable arms (58), which while folded are temporarily connected by a pin or bolt (59) going through holes aligned on the upper and lower flanges of one side of both the Cross Beam central part (57) and the Cross Beam foldable arm (58). This pin or bolt is calculated to withstand the dead load of beams and doesn't need to be sized to support other loads like live loads or environmental loads. A similar system is used for connecting the Cross Beam foldable arm (58) to the Longitudinal Beam (8). When the Deck Frame is being unfolded, the hinged member rotates around the pin or bolt (59) until they reach their unfolded position, at which point the pre-drilled bolt holes (60) of the corresponding beams align. Bolts are placed and tightened in these holes and the unfolded mainframe is ready to use.

In some embodiments, the Deck Frame may be designed to remain fixed. In case of a mobile, rotating or sun-tracking embodiments in which a Rotation and Drive Connection (29) is able to lock in place an Upper Supporting Column (27), this Drive System may be used to provide stability to the folded Deck Frame while on the truck or train bed, and while it is being unfolded, or while Upper Blocks are being affixed to it, simply by strongly locking the Upper Supporting Column (27) to a fixed supporting system affixed to the truck or train bed.

Figure 8:
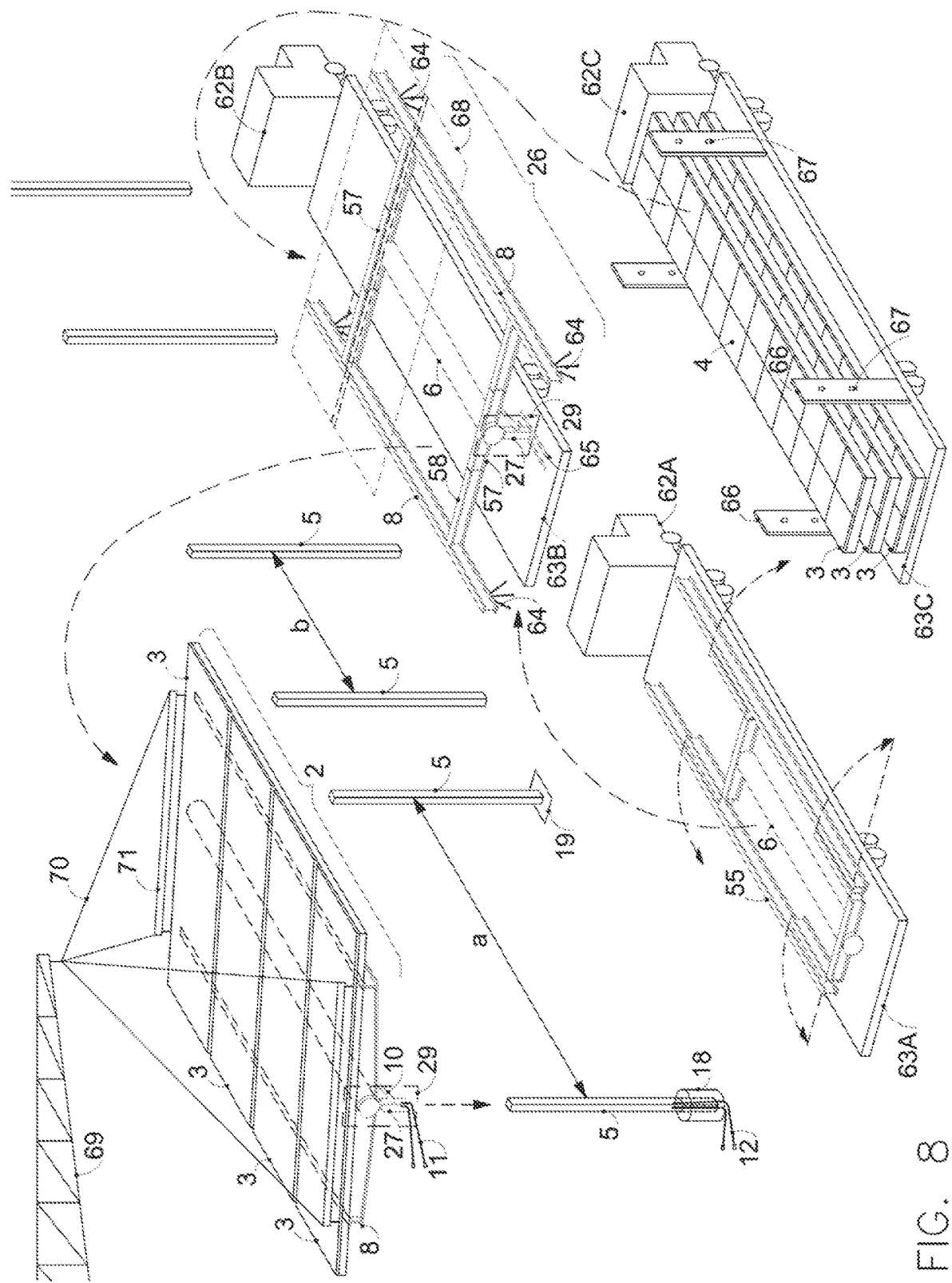
FIG. 8 illustrates an example of process of installation of Modular Units in a certain embodiment.

FIG. 8 illustrates an example of process of installation of Modular Units in a certain embodiment. This description also refers to elements described in other figures. In some cases, elements from this figure and other figures can be combined together.

A truck (62A) is at an installation site. In some embodiments, trucks, trailers, trains, cranes, platforms or any other means of transportation could be used in lieu of the trucks and trailers described here. In this example, the trailer (63A) is a regular flat bed or in some cases it is a trailer specially equipped to hold and deploy the folded Deck Frame (55) attached to it. Foldable Deck Frame are described in other figures. In this embodiment, the Deck Frame, as is illustrated on truck (62B) where a folded Deck Frame similar to that of truck (62A) is being unfolded, includes a pipe (6), two Longitudinal Beams (8) and folding Cross Beams including Cross Beam central part (57) attached to the pipe (6) and Cross Beam foldable arm (58) which have already been unfolded such that the folded Deck Frame (55) of truck (62A) is illustrated in its full extension as an unfolded Deck Frame (26) from Longitudinal Beam (8) to Longitudinal Beam (8). The foldable Deck Frame invention described here can be used with several variations of Deck Frames or mainframes designed to work with any load, any angle, any number of components or any setting. Even truss-based Deck Frames can be made foldable.

In some embodiments, in order to ensure the stability of the Deck Frame (55, 26) while it is being unfolded and equipped, the Deck Frame can be supported or stabilized by adjustable pods (64) supporting the outer Longitudinal Beams (8) or the Deck Frame can be held in place using the pre-installed Rotation and Drive Connection (29) locked in place and angle by a special clamp (65) when the example of embodiment to be built is a sun-tracking Modular Unit that comes with a pre-installed Rotation and Drive Connection (29). Such pods (64), or other types of temporary supports can be used in many variations of Modular Unit or Canopy Deck or Upper Block pre-assembling process either on-site or off-site.

On the truck (62C) is illustrated an example embodiment of several Upper Blocks (3) stacked on a trailer (63C) using Trailer Racking Systems (66) that allow to safely haul multiple Upper Blocks on a trailer, a train or sometimes in a container. These Upper Blocks, in some cases completely finished, connected, tested or protected at the factory, held by the Trailer Racking Systems (66) hover over each other without damaging each other's solar panels (4) if there is any. In this embodiment, the Upper Blocks use their structural rigidity to remain flat while they are only supported in a few Upper Block Supporting Points (67) such as for example the points where they will be attached when mounted on their destination structure, or other predefined points. Additional temporary supporting points could be added.

On the ground, or on the truck or on an ad-hoc supporting structure, the Deck Frame, which can be a folding Deck Frame as in this example or a non-folding Deck Frame, or any type of supporting structure, and which could for example be a Deck Frame for longitudinal Upper Blocks or a Deck Frame (55) for transversal Upper Blocks (3) as in this example, is being prepared. In some embodiments, the Upper Blocks are simply built or assembled, either on the ground or on an ad-hoc supporting structure, and transferred on to the Deck Frame, or they are in some cases assembled on the Deck Frame before the Deck Frame is moved to its location of installation. In this example of embodiment, the Upper Blocks (3) are lifted, using a lifting means or a crane, and are installed on the Deck Frame (26) and attached to it in their mounted position (68). A similar process can take place on the ground, in the shop, on a special structure, or it can be performed directly on the truck bed (63B) that brought one or several folded or unfolded Deck Frame (26). The whole Canopy Deck (2) can be lifted, craned (69) or moved altogether from the ground, truck or structure to the column (5), or the Deck Frame and the Upper Blocks are moved or lifted separately in order to assemble the Canopy Deck in its final position, or an intermediate position. In some cases, the process involves lifting the Upper Blocks. In some cases, the process involves transferring, sliding or rolling the Upper Blocks onto an already installed or erected supporting structure or Deck Frame. In some cases, the process involves assembling the Upper Blocks, or simply the panels, on the Deck Frame while the Deck Frame is on the truck as illustrated in this example, or on the ground or on an ad-hoc supporting structure, before the Deck Frame plus its completely or partly assembled equipment is moved or lifted to the supporting structure, or erected.

A very efficient process is to bring in the same time a truck (62C) carrying the pre-assembled Upper Blocks (3) and a truck (62A) carrying one or more folded Deck Frames (55), and to crane directly the Upper Blocks onto the Deck Frame (26) once it is unfolded and to attach them thereafter. A similar process can take place without a truck, for example on the ground on an ad-hoc structure. Variations of this process can take place with different embodiments of Deck Frames or structural components and Upper Blocks, including embodiments with Deck Frames partly or not all pre-assembled. In case of solar or electric or fluid based Upper Blocks, the necessary connections or tests, like electrical, electronic or fluids, can be performed on the ground, in the shop or on the truck before lifting, if labor is easier this way, in order to quickly deliver a finished Canopy Deck, or they can be performed once the Upper Blocks or some of their components are installed on the destination structure. If the Canopy Deck includes other Accessories, for example underlayers or other equipment, they can, in some cases, be installed at this time too.

In this embodiment, four Upper Blocks (3) are being attached to a Deck Frame (26) in order to form a finished Canopy Deck (2), which could be a sun-tracking solar Canopy Deck. The finished Canopy Deck (2), whether prepared or assembled on the truck (62B) or elsewhere, is lifted so its Upper Supporting Column (27) connect to the top of previously installed columns (5). In the Canopy Deck, the Upper Blocks (3) have been connected together on the ground and the circuits have been prepared so they offer only a set of cables (11), hoses or connectors that only need to be connected to the corresponding cables (12), hoses or connectors, which have been preinstalled in or on the columns (5) and their pedestals (18) or foundation (19). The Canopy Deck (2) can be either lifted from atop using a crane (69) using riggings (70) attached to the Canopy Deck (2). In order to avoid deflections, it is in some embodiments useful to attach the riggings to the tips of the Longitudinal Beam (8), or to other sufficiently strong structural members, or to use an additional framework, and sometimes to use a spacer (71) or a framework to keep a constant distance between the attachment points while the Canopy Deck is being lifted.

A similar process can be used in embodiments which do not include columns, or which use a different type of Canopy Deck. In some cases, it is not practical to use a crane and the Canopy Deck can be lifted from below using an appropriate lifting machine. In some cases, the Canopy Deck components are assembled on folded columns and then erected as illustrated in other figures.

In this example embodiment, the Canopy Deck, or some of its structural components, may be equipped at the factory, or during the assembly phase, with a Drive System (10), or with a Rotation and Drive Connection (29), which is in some cases used to maintain the folded (55) or unfolded Deck Frame (26) on the truck or the supporting structure, and which can also be used to keep a fixed angle between the Upper Supporting Column (27) and the Canopy Deck (2) while the Canopy Deck is being attached to its supporting columns (5). This way, the crane only needs to bring the one or more Upper Supporting Column (27) on top of the one or more columns (5) and to connect them to complete installation of the Modular Unit. Soon after the mechanical attachment and the electrical or fluid connection, the Modular Unit is ready to work, and, as in this example, to rotate to track the sun.

The Modular Units and Canopy Decks can be designed to match different distances (a, b) between the columns (5) when there are several columns, or complex supporting structures.

Figure 9:
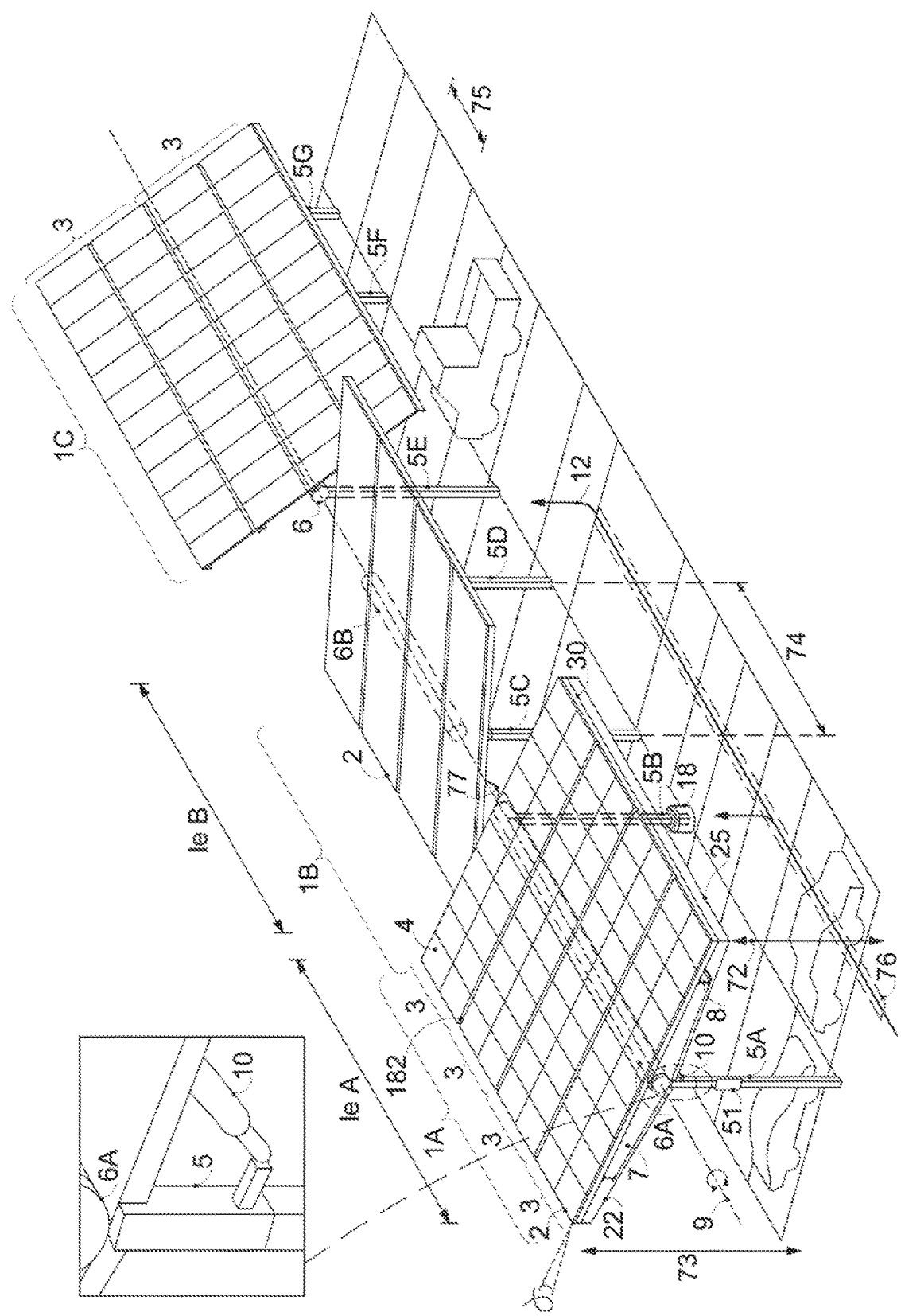
FIG. 9 illustrates three different examples of Modular Unit embodiments installed on a typical parking lot site.

FIG. 9 illustrates an example of a site equipped with three different examples of Modular Unit embodiments installed on a typical parking lot site. This description also refers to elements described in other figures. In some cases, elements from this figure and other figures can be combined together. Other examples could be illustrated in any other environment as the Modular Unit can be used as shade structures, as buildings, as stage equipment, as architectural systems, as industrial equipment, as farm equipment, as solar farm facility or many other applications.

In this figure, three example embodiments of Modular Units (1A, 1B, 1C) are juxtaposed and aligned although they do not have to be. Modular Units are modular and can be placed anywhere, in any orientation or elevation. In solar array embodiments, it is sometimes more efficient to align the Modular Units and to have them rotate in a synchronized manner in order to reduce the risk of self-shading.

In this example, Modular Unit (1A) is an example of waterproof, architecturally decorated, sun-tracking commercial carport, but it could be used in any other application. It includes two embodiments of column (5A, 5B) spaced apart to match the Canopy Deck's length (le A). In this example, one the columns (5B) rests on a concrete pedestal (18) and the other column (5A) is anchored on an underground foundation. In this example, the Canopy Deck (2) is rotating on a sensibly horizontal axis of rotation (9) to track the sun using a Drive System (10), which is attached to a Cross Beam (7) connected to Longitudinal Beams (8). The clearance (72) under the lowest part of the Canopy Deck, as well as the maximum height (73), is determined by one or more of the following parameters: the Canopy Deck's size, thickness, maximum angle of rotation ($\alpha$), the axis of rotation (9) elevation above the ground or other factors. Some embodiments of the invention enable the designer to set a wide range of Modular Unit or Canopy Deck rotation ranges and elevations, and therefore to set a wide range of clearance levels (72) or maximum heights (73).

In the embodiment of Modular Unit (1A), the spacing (le A) between the columns is such that the column's exterior faces are aligned with the Canopy Deck's (1A) exterior sides but the Modular Unit could have been designed with columns in a different location, for instance farther apart or closer to each other. The columns (5A, 5B) are typically centered with the pipe (6A) but, in some embodiments, the columns could be off axis, or each column could be replaced with several columns or any other supporting system in order to solve a particular case. In the embodiment of Modular Unit (1A), the Canopy Deck includes an underlayer (22) for decoration or functional purposes. The Canopy Deck's lower face may include any Accessories. In the embodiment of Modular Unit (1A), the Canopy Deck includes four Upper Blocks (3), placed side by side, with or without a gap between, with their lengthwise direction perpendicular to the axis of rotation (9). The Canopy Deck (1A) could include any number of Upper Blocks and the Upper Blocks could have any angle (e.g., different angles) relative to the pipe (6A) or to the axis of rotation (9). The Canopy Deck could be mobile as in this embodiment, or it could be fixed. In Modular Unit (1A), the Upper Blocks (3)

include two rows of twelve solar panels (4), but an Upper Block could include any number of rows and panels placed in any direction and any number of Upper Block Supporting Member. The Upper Block's outer face can include solar panels, or any panels, or any type of material. In the embodiment of Modular Unit (1A), Upper Blocks (3) include internal channels (30), hidden behind a fascia in this figure, which may act as a ventilation channel or as a rainwater or fluids evacuation channel or fulfill other functions, such as rigidifying the Upper Block Supporting Members. In this example, when the Canopy Deck is sloped due to its rotation, the water flows down the channel. In some cases, a power fan system can be added to increase the air flow in the ventilation channels. In some embodiments, the channel (30) tips may be simply open. In some embodiments, the channel tips are equipped with a fascia (25) which may be used to enhance the assembly's aesthetics, or to prevent animals or any exterior element like leaves or other elements to enter the channel, and can be designed to let the air flow into the channel and to let the water flowing in the channel to flow out. Fascia (25) may be designed in many ways, they can be solid or perforated or louvres, they may have any design and material, they may be mounted on the Upper Block (3) at the time of its pre-assembly or it can be a longer element that addresses the whole length of the Canopy Deck, or it can be integrated in a broader complex that involves for example the underlayer (22) or an architectural treatment of the Canopy Deck's sides, or any other design feature. The fascia can also include any number of Accessories, which could also be placed anywhere on the Modular Unit and can include a gutter system. In case of rain, if the Canopy Deck includes panels or solar panels and the rain falls between the panels into the channel, the channel may carry significant amounts of water, which will flow downwards. It may be chosen to let the water fall from the channel onto the ground or it may be preferred to collect the water and bring it to a predesigned location. In some embodiments, the water flowing from the channel (30) into the gutter can be pumped to a central place, preferably near the Canopy Deck's center of rotation, for example near the column (5A) or inside the column (5A) and then evacuated towards the ground or a sewer system. The pump can be central or there can be a pump for each gutter, and this pump may run only when water is detected in the gutter or in the channel.

In some embodiments, a gutter (182) or water collector is installed between the Upper Blocks in order to provide a continuous waterproof protection between the blocks. In other embodiments, when the waterproofing is achieved with an underlaying sheet coming with the pre-fabricated Upper Blocks, the underlaying sheet can be designed to overlap the next block's sheet so the assembly is a continuous waterproof system.

In this example, the Modular Unit (1B) embodiment includes two embodiments of column (5C, 5D) and the distance (74) between the columns is smaller than the length (le B) of the Canopy Deck. The columns spacing could for example be spaced apart based on a multiple of the parking spots spacing (75) or on some ground level requirements or any other reason, or simply to achieve the most efficient design possible. In this example, the pipe embodiment (6B), spans between the two columns (5C, 5D). Modular Unit's (1B) Canopy Deck (2) is not tilted the same way as in the Modular Unit (1A). Each Canopy Deck or Modular Unit may have it is own Drive System and be driven independently. All Modular Units of a site may be controlled locally or they can be remotely controlled from a central location. Same site Modular Units may run the same program and perform the same tasks simultaneously or they can run the same program at separate times, or they can run different programs. Modular Unit (1A) and Modular Unit (1B) may be running different programs at the time of the figure, which explains why they are not at the same angle. Modular Unit (1A) could for example be running a pure sun tracking program, while Modular Unit (1B) Canopy Deck could be tilted another way for multiple reasons: it could be performing maintenance tasks like cleaning, greasing, drive maintenance, etc., it could be tilted another way because its program is reacting to a specific parameter, for example, wind speed, temperature, energy output monitoring or any other parameter, or it could be running a completely different program for example showing a specific angle when triggered by a specific parameter, for example triggered by an external event like a car passing, a specific information, a specific parameter, or it could have been manually tilted at the specific angle by an authorized user, or it could have detected an obstacle and gone to a safer angles, for example if a tall truck is parked underneath or if a danger was detected or anticipated.

Not all Modular Units are active. Not all Modular Units have mobile or rotating Canopy Decks or components. Some Modular Units are fixed. In some embodiments, Modular Units may be moved manually, for example, for seasonal adjustments. Modular Unit (1B) could in other embodiments be a fixed canopy, which might still include accessories and intelligent functions, but these functions do not necessarily include rotating the Canopy Deck. In a non-rotating Canopy Deck embodiment, the Modular Unit (1B) could be designed without a pipe but still prepared off structure and still using Upper Blocks.

Modular Unit (1C) is an example that includes three columns (5E, 5F, 5G) and the distance between the columns is not directly related to the total Canopy Deck length. A Modular Unit may have any number of columns or can be supported by any type of fixed or mobile structure. The example embodiment of Modular Unit (1C) includes Upper Blocks (3) whose longer dimension is parallel to the pipe (6), which means the Deck Frame may not need to include Longitudinal Beams. The Modular Unit (1C) is illustrated in a strongly tilted position, which is possible if the Drive System and the various safety stops are designed to allow such an angle.

When, as in this figure, several Modular Units, for example in a solar carport embodiment, are installed close to each other, their wiring may circulate in trenches (76) which in some cases connect each Modular Unit to a remote point such as for example an electric panel or a data connection point. In some cases, cables circulate from the trench to the Canopy Deck inside or outside the column. In some cases, juxtaposed Modular Units are connected by junction cables (77) or hoses, which in some cases allow the trench (76) cable (12) to connect the site to a row of several Modular Units by reaching only one column. In some cases, energy producing Modular Units include inverters (51) located on the Canopy Deck, on the column or on other structures. In some cases, one or more solar Modular Units are connected to remote electrical systems, for example large inverters. In some cases, Modular Units are not connected to the grid or to electrical networks and are autonomous, for example when they are used to provide electric car charging stations. In some cases, Modular Units have no inverters.

Figure 10:
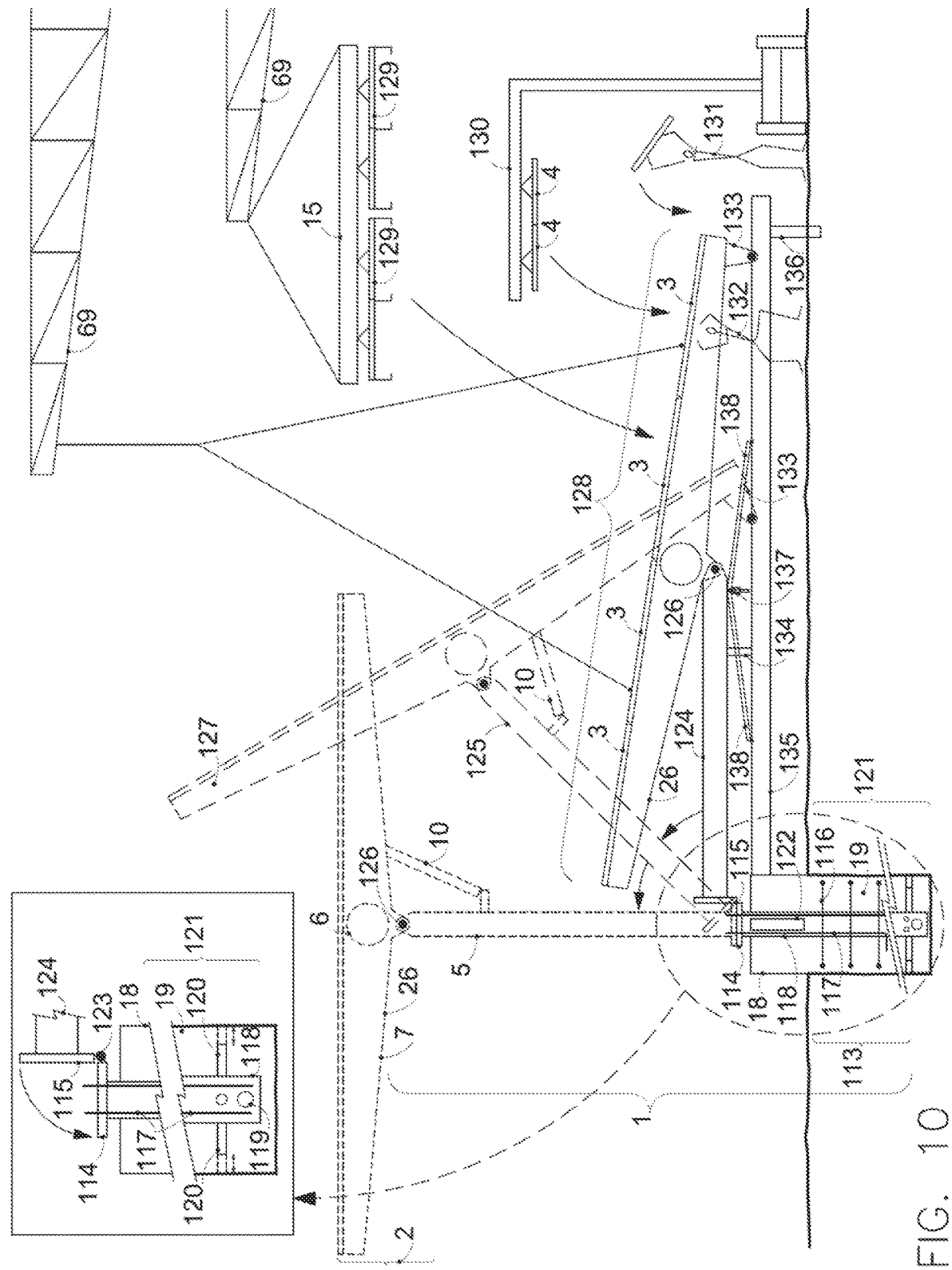
FIG. 10 illustrates some of the steps included in an example erection method of some embodiments of Modular Unit.

FIG. 10 illustrates some of the steps included in an example of erection method for some embodiments of Modular Unit. This description also refers to elements described in other figures. In some cases, elements from this figure and other figures can be combined together.

A Modular Unit (1), for example in a sun-tracking solar carport embodiment, to be erected includes one or more foundation systems (113), one or more columns (5), one or more Canopy Decks (2) and one or more Drive System (10). The Modular Unit is first laid out or unfolded on the ground or close to the ground, with its column base plates hinged to the foundation. All or some of the components are installed and the finished unit is lifted or erected in minutes.

The foundation designed to support the one or more columns could be a spread footer system, or other systems, or a drilled pier filled with concrete (19) as in this example. The engineer will select the best solution based on the data. Several columns may have different foundation systems. In some embodiments, a concrete, or other material, pedestal (18) is provided. A column supporting member (114) is provided. In this example, the member (114) is a base plate or another connection system designed to connect to a base plate (115) united to the column but other foundation to column connection systems can be used. In this example, the column supporting member (114) is anchored to the ground either by anchor bolts (117) connected to rebars (116), or by a Foundation Tube, also referred to as FTU (118) or ad-hoc anchoring structure. The column supporting member (114) and the column base plate (115) are connected by bolts and nuts. In other embodiments, the base plate (114) is not used and the column's base plate (114), or the column may have a different attachment system, is attached directly to the anchor bolts (117) using levelling nuts which allow for adjustment. The anchor bolts (117) are anchored in the concrete (19) and the rebars (116) or are affixed to a structure coming from the foundation for example a Foundation Tube (118). In some embodiments, in order to simplify the column erection and the foundation creation, the Foundation Tube (118) or ad-hoc structure is designed some or all of the foundation concrete is poured inside the Foundation Tube (118) using top, bottom and sometimes side (119) holes. An example of efficient way to use such a system is as follows: The Foundation Tube or ad-hoc structure (118) is installed on a mobile horse or support, or for example on the form used to pour the concrete pedestal (18), and is carefully aligned with the other foundation systems for example using jigs or laser alignment systems as well as shims or levelling systems as needed. The Foundation Tube (118) is thus suspended from this horse into the pre-drilled foundation pier. The concrete is poured inside the Foundation Tube and flows through the Foundation Tube into the pier without excessively moving the Foundation Tube which remains properly aligned. In some embodiments, the Foundation Tube includes adjustment systems: a set of rods (120) placed on two or more sides of the Foundation Tube (118) are designed to extend or retract so they reach the sides of the foundation well (121) and maintain or set the Foundation Tube in the right place. These rods extend or retract for example using manual or motorized drive systems, hydraulic systems or other systems and can be manually operated or automatically controlled by a computerized system. In some embodiments, a level sensor device is placed on the Foundation Tube (118), or it may also be a device that reads alignment with other foundation devices, and a computer system reads the information and calculates how the alignment needs to be modified by pushing the rods (120) before or while, or even after the concrete is poured either inside the tube or outside the Foundation Tube (118). In some embodiments, the system includes elevation control systems for instance Screws, shims, pneumatic systems or other systems to perform tube or anchor bolts elevation control operations, so each column support is aligned in elevation with the next one. Such a system, be it manual or automated, makes the foundation installation faster and of higher precision. In some embodiments, the Foundation Tube (118) is not founded in the ground but affixed onto an existing structure. For example, that would be the case when the column is to be attached to a structure like a pre-existing pedestal, wall or any other type of supporting structural component. A good example is installing a solar carport on top of a parking garage structure in which the columns must be attached on top of concrete pods (122): an ad-hoc structure is designed to meet the load and other requirements and to be affixed to the top of the side of a pod (122) or of a member created to provide structural support. Many other cases of application would similarly involve attaching to structure to be built to pre-existing points or to points that are not foundations dug in the ground.

The Foundation Tube (118) or anchor bolts (117), or any other available anchoring system is connected to a hinge system (123), which can be temporary or final. The receiving part of the hinge system is affixed to the concrete (19) or to the anchor bolts (117) or to the Foundation Tube (118) or to any usable supporting system either when the foundations are prepared or afterwards. The structure to be erected, for example the column (124), is equipped with a compatible hinge system, which can be temporary or final. In some embodiments, the receiving and column parts of the hinge system (123) are simple tubes. The column is moved until its hinge system is aligned with the receiving hinge and a simple rod is slipped inside the hinge tubes when they are aligned. In some cases, the hinges are adjustable. Once the hinge's fixed and mobile parts of the hinge are completed with the rod, or with any other component of sufficient strength, the column (5, 124, 125) is attached to the foundation or support and can be moved or lifted around this hinge's axis.

In this figure, the column (5, 124, 125), which is hinged at its bottom part, but it could be hinged elsewhere, is to be erected until it reaches its final position (5) passing by intermediate positions as illustrated (125) as an example. The column, or the one or more columns, is connected via another hinged system or articulated system (126) to one or more Canopy Decks (128), which is to be erected to its final position (2) passing by intermediate positions as illustrated (127) as an example.

Canopies, and particularly solar canopies or solar carports are traditionally built like a building is. Workers start from the ground and erect the supporting frame. Then they install the roof purlins. Then they install the roof or the solar panels. Then they work up in the air to attached and connect the solar panels, etc. It is a long and expensive process, which is also uncomfortable as much of the work is performed above the heads of workers who stand on person lifts. The example of method illustrated in this figure is radically different. This example of method applies to Modular Units, canopies, solar carports and many other types of structure, such as for example buildings. The Canopy Deck, which sometimes has a solar array, is fully or partly assembled before it is lifted to its final height. In this example of embodiment as a sun-tracking solar carport, the Canopy Deck (2, 128, 127) includes a Deck Frame (26) as described in other figures. Deck Frames exist in several embodiments. In this example of a two column (5) Modular Unit, two Cross Beams (7) are united by a pipe (6). In this example, the Deck Frame (26, 128) supports one or more Upper Blocks (3), which may for example include solar panels (4), and which may be assembled elsewhere and moved on the Deck Frame after full or partial completion or may be assembled on the Deck Frame wherever it is located. The Canopy Deck may be executed in several versions and include many different components or features. In order to facilitate the Upper Blocks assembly or the attachment and connection of prefabricated Upper Blocks on the Deck Frame structural members, the Deck Frame may in some cases be placed at a convenient location. For example, it is much easier and faster to work at man's height with the feet on the ground than high in the air on man lifts. Using this system, any convenient setting to facilitate the construction operations. In this example the Canopy Deck (128) is illustrated in a position where it is a few feet above the ground, but it could be any other height or location, so workers or machines or robotic automated processes can easily install or test the components before they are lifted. The Canopy Deck (128) is hinged to its column, which is hinged to its foundation. The column may be supported by a member (134). Several of many more options are illustrated in this figure. This process may occur anywhere like outdoor on site, indoor, indoor on site under cover of a temporary structure or anywhere. One way is to use fully or partly prefabricated Upper Blocks (129) and to move, lift or crane (69) one or more of them onto the Deck Frame using a crane or lifting or moving device. In some cases, one or several Upper Blocks are transported using temporary or permanent supporting or rigidifying devices (15) or frameworks, which can be installed above, under or laterally to the Upper Blocks to be moved. Another way is to use a panel moving device (130), which can be a robotic tool, a simple rolling crane, prefabrication machinery, a construction bench, a mobile walkway, or other types of lifting devices, which work independently or is connected to the Deck Frame, which if it rolls on the ground or on rails or on temporary or permanent members of the Deck Frame, and which carries either one or more single components for instance solar panels (4) or other components or pre-assembled components, substructures or Upper Blocks (3, 129) from a place of storage or preparation to the place they are attached to the Deck Frame (128). In some cases, fully or partly automated machines or robots accomplish some or all of the installation tasks. Another way is to use human labor (131) to place, install, attach, connect the panels (4) or components on the Deck Frame. Some of these methods may be used together or combined and can use human labor or computer controlled robotic machines for all or some of the tasks. In some cases, it is useful to place the Deck Frame at a height or position that allows workers (132) or machines to work from below, above or the side of the Deck Frame to perform some of the tasks like mounting, connecting, testing, etc. Several Canopy Deck positions are in some cases successively used during the construction process.

The Canopy Deck (128) can be maintained at the desired height by temporary or permanent supporting structures like horses, tables or other systems, or it can use temporary or permanent devices like a Deck Holder (133) which is attached to the Deck Frame, Cross Beam or Longitudinal Beam for example. In some cases, an erection rail or beam (135) is attached both to the column (5) base or pedestal and to an anchor in the ground so it can resist lifting efforts. The Deck Holder (133) can rest on the ground for example via a foot system and be affixed temporarily to an ad-hoc foundation or ground anchor, or it can have a wheel system or a slider that attaches it to the erection rail (135).

Once the Canopy Deck (128) has reached the desired level of completion, it can be lifted by a crane (69) or other means until it reaches its final position or intermediate positions (126, 127) that may be necessary in the process. Working this way allows to perform all or much of the assembly work in a place or position that is much more convenient than up in the air at the final canopy top's location.

In some embodiments, by attaching the Canopy Deck to the column by an embodiment of Rotation Enabling Connection (126) and by attaching the column to the foundations, anchors or supporting structures by articulated joints (123), the risks linked to lifting a large canopy top in the wind or in tight locations are greatly reduced as the whole system is attached to the anchors during its rising.

Another way to make the lifting process even safer, or to use it in place where a crane cannot be used, or in addition to a crane system, is to is to use a variation of the temporary erection rail system: an erection rail (135) or beam or profile of any design or material is either lying on the ground or attached to the ground or supporting structure or is attached both to the column foot, pedestal (18) or foundation and to another point (136) which can be another foundation, an existing structural point like an existing pedestal or any strong enough member. The erection rail is sometimes sensibly horizontal but it may be in other positions in some cases. In some embodiments, the Canopy Deck is attached to the columns by articulated joints (126) and the columns are attached to the foundations, anchors or supporting structures by articulated joints (123), and the Canopy Deck is also attached to a Deck Holder (133) which includes a wheel system or a slider system that attaches it to the erection rail (135). When the Canopy Deck is lifted (2, 128, 127), the Deck Holder (133) remains attached to the erection rail (135) until a safe angle is reached. A wind gust could not fly the Canopy Deck away as the Canopy Deck is held both by the Column footing and the Deck Holder (133) attached to a stable erection rail (135). When the Canopy Deck is lifted, the angle between the Canopy Deck and the column changes. In some cases, the Drive System (10) is attached at the desired angle to unite the column to the Canopy Deck. At the desired point during the lifting process, the Deck Holder (133) is detached from the Canopy Deck or from the erection rail (135). In some embodiments, a Lifting Machine (137) is used in lieu or in addition to the crane (69). The Lifting Machine can take advantage of the erection rail (135). In some embodiments, it has arms (138) which slide or roll on the erection rail (135) and are controlled by a drive so they can push the column (124) or the Canopy Deck upwards or downwards and control their movement so the wind or other external forces cannot move them. In some embodiments, these arms (138) are able to hold and control the column or the Canopy Deck until they have reached their final position, which makes the erection very safe even in presence of wind. This Lifting Machine can also be used when a crane cannot be used.

Once the column has reached its final position, vertical in this example but it could be different, the column base plate (115), or any other attachment system, is connected to the supporting structure like the anchor bolts (117), the Foundation Tube (118) or other systems. The lower column hinge (123) is removed in some cases or remains in some cases. In some cases, he column's position may be finely adjusted using levelling nuts or other systems.

In some embodiments, a temporary or permanent bracing systems, like cables, bracing beams, moment connections or other systems, is used to keep the Modular Unit rigid and undeflected, particularly in the plane passing by the column during the erection.

In some embodiments, for example when Modular Units are erected on a non-flat ground, or on parking garage structures or in other cases, the column's hinge is not located at the bottom of the column. For example, if the Modular Unit's column is designed to be erected on the side of an existing pedestal or column or structure instead of on top of it, the hinge may be slightly different and allow the column to be articulated to the top of this supporting element, or elsewhere, so the column can extend below the hinge level, for example on the side of the pedestal, in order to provide the stability that a foundation would provide in some other embodiments.

Figure 11:
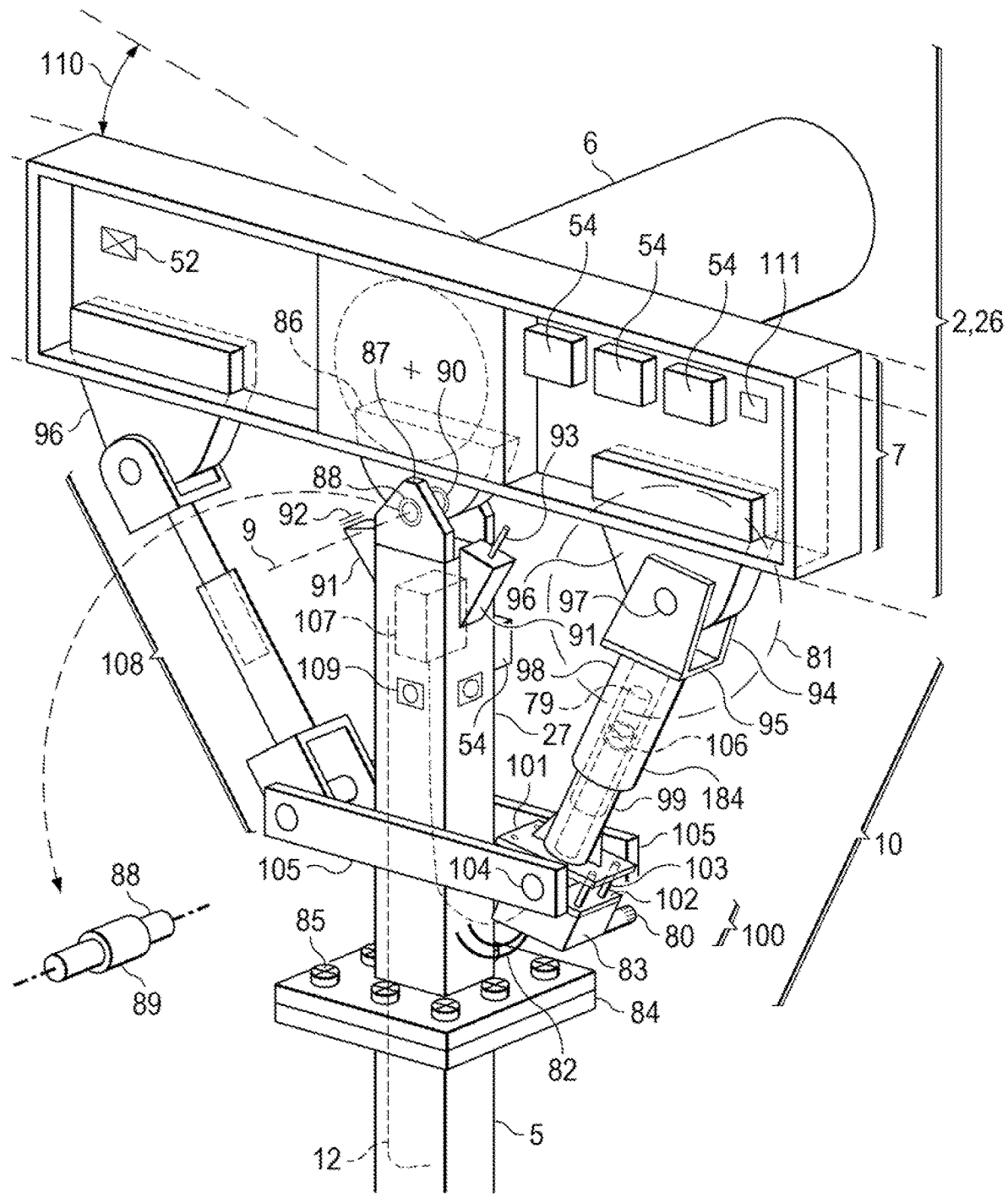
FIG. 11 illustrates an embodiment of Canopy Deck to Column (or Supporting Structure) connection and Drive System for a Modular Unit.

FIG. 11 illustrates an example of embodiment of Canopy Deck to column connection and Drive System (10) for Modular Unit. This description also refers to elements described in other figures. In some cases, elements from this figure and other figures can be combined together.

In some Modular Unit embodiments, the Canopy Deck (2) tilts around one axis of rotation (9), for example to track the sun, and the loads applied to the Canopy Deck can be extremely large. In some embodiments, the Canopy Deck's position or tilt is controlled by a device, also referred to as Drive System, or DS, (10), which controls a distance or a difference between a fixed point like the ground, a supporting structure, a column (5) and one or more points on the Canopy Deck structure, for instance one or more points on the Deck Frame (26) like a point of a pipe (6), a Cross Beam (7) or any other Canopy Deck structural member.

Several types of Drive System could be used to control a Modular Unit's mobile parts, namely, hydraulic drives, hydraulic pistons, actuators, cable based systems, electric drives, linear actuators, worm gear systems, gear based systems, chain based systems, pushing rod based systems, or other types of drive systems, which can use a motor or any other type of power for automatic or man driven control, or be manually adjusted. Many of these systems can be used in Modular Unit embodiments.

In a hydraulic drive system embodiment, one or more hydraulic pistons attached to one or more column or supporting structure and to one or more Canopy Deck structural members extend or retract to move the Canopy Deck. The system may include a hydraulic motor, a hydraulic pump, valves, tanks, balancing and controls systems as well as other components.

In an actuator-based drive system embodiment, one or more linear actuators, electric powered for example, do the same job. For example, in a worm gear-based system, a set of gears, some of which may be worm gears, powered by a motor controlled by electronic systems, turn the pipe (6) or push Canopy Deck's structural members to move the Canopy Deck. For example, in a gear-based system, one or more large gears or wheels, connected to the tilting Canopy Deck are turned by a gear system, which may be any gear system, or worm gear system or a chain-based system or other drive systems. One of the gears or wheels may have a large radius, for example several feet, in order to reduce the effort on the motor or the controlling gears and does not always need to be a full circle. In some embodiments, a gear 60 degree, a ⅙ of a circle circumference, is sufficient.

In a cable drive system embodiment, one or more cables attached to one or more points of Canopy Deck's structural members, for example on both sides of the axis of rotation (9), are controlled by one or more drive systems. For example, a cable attached on both sides of the Canopy Deck (2) and forming a triangle or another shape with one or more gears located under the Canopy Deck, for example close to the column or to the ground or to a supporting structure, is driven by a motor possibly via gears or worm gears and thus turning the motor controls the Canopy Deck's angle.

In a push rod system embodiment, one or more rods attached to the column or a supporting structure push the Canopy Deck (2), for instance the Cross Beam (7) or the pipe (6), up and down in order to control the Canopy Deck's angle. In some cases, when the rod is close to the axis of rotation (9), the stroke is only a few inches long, which in some cases allows for simple mechanical drive systems, or thermal expansion-based systems or even magnetic drive systems.

Many mobile devices use brakes or mechanical stopping mechanisms to lock in place the mobile part when desired. This is not practical in some Modular Unit applications. A solar tracker or a solar carport in a public space needs to be perfectly safe at any time and without excessive maintenance costs, and unmaintained brake systems are not free of reliability problems. Similarly, hydraulic, chain or cable-based systems are not 100% reliable on very long-term maintenance-free applications. Many sun tracking systems use worm gears to turn and control the arrays because worm gears can be designed to resist back-tracking. But, when heavy loads are applied to them, the loads may crush the tiny areas of metal pressing against each other in worm gear systems and damage the gear. In large Modular Unit embodiments, the wind or seismic events may generate enormous loads on the Canopy Deck which acts as a sail, these efforts are transmitted to the drive, which needs to be calculated to withstand them multiple times without failure, and worm gears, or most gear-based systems or chain based systems might fail under these loads.

In the example embodiment of Drive System illustrated in FIG. 11, the Drive System (10) is connected to a column (5), or to an Upper Supporting Column (27) and to a Canopy Deck (2) or Deck Frame (26). The Drive System has the ability to extend, retract or stay immobile. The goal is to be able to extend or retract the Drive System at will and, for evident safety reasons, to make sure the Canopy Deck cannot move and stays immobile when the Drive System is in rest mode. Some Modular Unit embodiments use several Drive Systems.

Power Screw, screw or lead screw, also referred to as PS (79): Power Screws exist in multiple forms and big screws can move or hold very large loads. When a screw turns inside a nut which does not turn, the screw's rotational movement is converted in a linear movement. If the screw is blocked from traveling along its own longitudinal axis, the non-turning nut will travel along the screw, up or down depending on the screw rotation direction. Although many other systems are possible, the examples of embodiment of Drive System illustrated in these figures are based on this principle: either the screw or the nut is traveling. In the example of this figure, a Power Screw Collar System also referred to as PSCS, prevents the Power Screw from traveling and attaches the Power Screw to a column; a nut, also referred to as a Longitudinally Travelling Nut, or LTN (106) is connected via ad-hoc systems to the Canopy Deck using a Deck Frame Lug, also referred to as DFLU (96). When the Motor, also referred to as motor (80) spins the Power Screw (79), the Longitudinally Travelling Nut (106) pushes or pulls the Canopy Deck's Deck Frame Lug. When the Canopy Deck is able to turn on an axis of rotation (9), and the Deck Frame Lug is distant from the axis of rotation in a plane perpendicular to the axis of rotation, the Canopy Deck tilts when the Drive System extends or retracts. In some reversed embodiments, the nut turns and the screw is fixed.

Self-Locking: Power Screws, particularly ACME screws, when made with a specific profile, pitch and coefficient of friction, can be designed to be self-locking. This means that applying a torque to the Power Screw (79) will cause the Power Screw to turn and the nut to move along the Power Screw axis. The Drive System built around the Power Screw will extend or retract as the nut moves along the screw, but no amount of axial load force applied to the Power Screw or the nut will cause the Power Screw to turn back the other way, even if the torque applied to the Power Screw by the motor is zero. This is in contrast to some other simple machines which are "reciprocal" or "non locking" which means if the load force is great enough they will move backwards or "overhaul". Therefore, with a properly sized self-locking Power Screw, also referred to as SLPS (79), even if loads push the Canopy Deck (2), which pushes the Drive System (10), the self-locking Power Screw will not turn, the Longitudinally Travelling Nut (106) will not move, the mechanism will lock itself, the Drive System will not back-drive and the Canopy Deck will not move. This warranties the Canopy Deck's safety. Even if all controls, motors and other systems are out of order, the Canopy Deck will be safely maintained in place by a very stable Self-Locking Power Screw system, as long as the Power Screw and nut are not damaged. In some applications, this means the Power Screw needs to be properly lubricated and protected from contaminations to conserve its properties for many years. A Self-Locking Power Screw (79) can be calculated to handle the amount of load necessary. In some embodiments, Self-Locking Power Screws are ACME screws. With a Self-Locking Power Screw, the Drive System (10) is a passive safety system as well as an active drive system. It will be understood that, in this set of description and drawings, Power Screws (79) and Self-Locking Power Screws (79) are not differentiated, and Self-Locking Power Screws are expected to be used. However, in some embodiments, non-self-locking Power Screws are used. In some embodiments non-self-locking screw based systems are rendered self-locking using systems like gears, for example in the gear box or in the Drive System. Some embodiments of Drive System use more than one Power Screw.

Most of the effort applied to the Power Screw depends on loads, for example the wind loads, on the Canopy Deck's design (dimensions, porosity, shape, etc.), and on how these loads are transferred to the Drive System, namely, for example, on the lever (the longer the distance between the Canopy Deck's axis of rotation and the Power Screw, the less effort comes on the Drive System but the longer the Drive System travel is) as well as on the angle between the Power Screw and the column and between the Drive System and the Canopy Deck at any given time, and on other factors. Another factor in the Power Screw calculation is buckling. When the distance between the points holding the Power Screw is too long or the load too high at any given time, the Power Screw may buckle under compression loads. Extending the lever may result in extending the Power Screw length and increasing the risk of buckling. Therefore, the engineer looks for the best combination of Canopy Deck size, wind exposure, wind load, Power Screw to axis of rotation distance, Power Screw diameter and cost. As a result, the Power Screw sizing depends on the Modular Unit's design, many Drive System embodiments are possible.

Drive System Connection or DSC (81): When the Canopy Deck turns, the path followed by the point the Drive System is attached to is an arc of a circle. If some embodiments, the Drive System is attached both to the Canopy Deck's Deck Frame Lug, which travels along a circle, and to a fixed point connected to a column or a fixed structure. The Drive System extends and retracts to follow or move the Deck Frame Lug, but also needs to rotate to follow the Deck Frame Lug's circular path. In addition, when the Deck Frame Lug travels, the Canopy Deck tilts and the angle between the Drive System and the Canopy Deck changes. Therefore, in these embodiments, both ends of the Drive System need an embodiment of Rotation Enabling Connection that will be referred to as Drive System Connection or DSC (81). If the Drive System and the Canopy Deck are perfectly aligned in a plane perpendicular to axis of rotation, one axis rotating Drive System Connections are acceptable. But if the Drive System does not work in such a perpendicular plane, or if misalignments occur, Drive System Connections (81) may need to allow flexibility or rotation on a second axis. Rotula systems, gimbals, misalignment tolerant systems or other connection systems may be used. It will be understood that all Drive System Connections can be designed with a one or two axis rotation and may or may not allow for misalignment even if they are illustrated or described as single axis rotation enabling connections. Various Drive System Connection examples of embodiment are illustrated in this set of description and drawings. They can be combined or mixed, or replaced with other systems. In some embodiments, a one or two axis rotation is enabled at the nut level in the nut housing, which in some cases allows reducing or eliminating the need for the Drive System Connection to rotate or allow flexibility on two axes.

Motor, also referred to as MT (80): Not all Modular Unit Canopy Decks need move automatically or be powered. When they are, and a Power Screw based Drive System is used, one or more motors may be used to spin the Power Screw. The motor, as well as possible other accessories, is in some embodiments powered by flexible cables (82) which may run outside or inside the column or Upper Supporting Column, the Cross Beam, the Deck Frame or the Canopy Deck or other members, to connect systems and electrical boxes (54) located inside or outside the column (5), Upper Supporting Column, Deck Frame or Canopy Deck or in other locations. In some embodiments, the motor is powered by the electrical network, or by batteries or by solar panels. In some embodiments, the motor turns faster than the Power Screw should turn, and gears, gear boxes (83) or other systems are used to reduce the rotation speed and increase the torque. Any type of motor speed, Power Screw speed and Canopy Deck turning or moving speed can exist. But in sun-tracking Modular Unit embodiments which are expected to turn very slowly and at a low energy cost, the motor speed in some cases needs to be reduced, for instance from a standard 1500-2000 rpm (whether or not a Variable Frequency Drive is used) to 3-6 rpm or approximately a 200 to 700 ratio, but many other ratios could be used. In some examples of embodiment, using a four turns per inch Power Screw, the drive extends or retracts ¾ inch per minute, which generates a slow movement of the Canopy Deck, which may for example travel through its full range of rotation is 15 to 20 minutes. The Canopy Deck's rotation speed then depends on the distance between the Drive System (10) and the axis of rotation (9). This distance also controls the load the Drive System has to handle. In other embodiments, depending on the Canopy Deck's use and the functional requirements, the Drive System and its connection to the moving parts can be designed and calculated to comply with a large number of scenarios and application cases. For example, for much faster applications, the Drive System or Modular Unit parameters may be changed as explained above. Variable speeds are possible too. When gears or a gear box (83) is used, it can be independent as in these figures, or it can be integrated with the motor or the Drive System. It can require lubrication or not. It can work in any position or not. It can also be self-locking or not, for example using worm gears, or have many other specifications. In some cases, speed reduction gears, or other systems are integrated into the Drive System assembly. Any type of motor can be used, for example AC or DC electric motors, other motors or engines.

In this example of embodiment, the column (5) or Upper Supporting Column (27) is located under or close to the Cross Beam (7). In other examples of embodiment, the Cross Beam or the pipe (6) are on the side of the column top or of the supporting component, which may change the attachment systems but not fundamentally the Drive System concept. The Cross Beam is connected to a pipe (6) and both may be, but not necessarily, part of a Deck Frame, which may in some cases support Upper Blocks or any other type of material and form a Canopy Deck. The column may be in one piece or it may, as in this example, be split into an Upper Supporting Column (27), which may come with the Deck Frame, and a lower column (5) both connected via connection plates (84) and bolts (85) or any other type of connection.

The Cross Beam (7), Deck Frame or Canopy Deck are supported by an embodiment of Rotation Enabling Connection, which in this example of embodiment, includes one or more Rotating Lug, or RLU (86) united to the rotating Cross Beam or Deck Frame, one or several Fixed Lugs, or FLU (87) which are connected to the Upper Supporting Column (27), a Pin (88) which goes through the lugs in order to transmit the loads coming from the Canopy Deck to the column. In some cases, the Pin (88) is wrapped, or goes through, a layer of bearing material (89) such as for example bronze or bronze with embedded oil so no lubrication is needed. In the examples of embodiments of these figures, these single axis connections are fabricated in a very simple way, which works in most cases. The lugs are plates with a round hole for the Pin and the Pin is a round rod or tube of strong material or of bearing material. The Pin is slipped and secured in one or more Lug holes, which enables the lugs to rotate around the Pin's axis. In some cases a layer of bearing material is inserted between the moving lugs in order to reduce friction related issues. In some cases, refinements like bearings, bearing materials, high strength materials or complex machined parts can be used. However, in other embodiments of the invention, more sophisticated connections can be used, for example to allow some flexibility on two axes in order to accommodate misalignments or movements, either by allowing some play or flexibility, or by mechanical systems. For example, a rotula type of connection can be included with the column to Canopy Deck connections, with the drive connections or other connections.

When the Cross Beam (7) rotates around the axis of rotation (9), the Rotating Lug (86) united to the Cross Beam (7) or the Canopy Deck turns around the Pin (88) or makes the pin turn with it. In embodiments including at least two Fixed Lugs (87), the Rotating Lug (86) moves between the two Fixed Lugs (87), which ensures the Cross Beam and therefore the Deck Frame or the Canopy Deck can only slide within the gap provided between the two fixed lugs, which can be a desired functional play. In other embodiments, there are two Rotating Lugs and one Fixed Lug, and other embodiments allow for two axis flexibility or rotation. Therefore, the mobile part is allowed to rotate within the allowed range but not to do any other movement. A layer of bearing material (90), such as for example bronze or bronze with embedded oil so no additional lubrication is needed, can be used on each side of the mobile lug in order to ensure a smooth rotation.

Circumstances may occur, for instance when the Drive System is missing or not working as expected, in which the Canopy Deck would be pushed by loads to move beyond its permitted rotation range. Therefore, some embodiments include mechanical stopping systems to stop the Canopy Deck's rotation even if every other safety system has failed. Other figures show different systems. In this example, two strong stop blocks (91) are affixed to the Upper Supporting Column (27) and designed with a sloped top with a specific angle. If the Cross Beam rotates beyond the authorized range, its lower plate, or any other member united to the Canopy Deck, hits the top of one of the stop blocks, which stops its travel. The stop block is designed to match the maximum authorized rotation angle. The stop block's (91) top slope or the Cross Beam may include dampening systems (92) to reduce the shock in case of a fast Canopy Deck rotation. This device may also be used to adjust the maximum rotation angle. In some embodiments, anti-back drive systems are added so that, if the Canopy Deck reaches the maximum permitted angle, it is mechanically stopped and locked at this angle. It cannot rebound and move or turn backwards until the maintenance team has disengaged this additional safety system.

It may be necessary in some cases, for example if the Drive System is to be replaced, to hold the Canopy Deck or the Cross Beam immobile. In such a case, an adjustable device, like add-on stop blocks or adjustable screws (93) can be used as a jack would be used. The screws on both sides can be turned to extend or retract as much as needed to reach a point where they block the Cross Beam on both sides. A special receptacle may be provided in the Cross Beam's lower part to ensure a perfect contact between the adjustable screw tip and the beam.

In the embodiment of this example, the Drive System (10) is connected to the Deck Frame using a special kind of clevis fork using lugs. The Drive System includes one Drive Lug, also referred to as DLU (94) or two Drive Lugs connected by a plate (95), or in two Drive Lugs made out of a machined or cast block. On the Canopy Deck side, one or two lugs, also referred to as Deck Frame Lug (96), is connected to the Deck Frame. The Drive Lugs and the Deck Frame Lug are connected and allowed to rotate by a Pin (97). In some cases, bearing materials are used between the Drive Lug and the Deck Frame Lug or around the Pin.

Telescopic tubes: In this example of embodiment, the Drive System extends or retracts thanks to a Longitudinally Travelling Nut (106) that travels along a Power Screw (79). The Longitudinally Travelling Nut is connected to a structural, load bearing tube which slides up and down when pushed by the Longitudinally Travelling Nut. This tube is referred to as Sliding Tube or SLTU (98) and has one or more Drive Lugs (94) at its tip. When the Power Screw turns, the Longitudinally Travelling Nut (106) and the Sliding Tube (98) travel along the Power Screw (79) and its Drive Lug (94) pushes the Canopy Deck's Deck Frame Lug (96), which tilts the Canopy Deck (2). A part of the Power Screw is inside the Sliding Tube. The more the Drive System retracts, the more the Sliding Tube covers the Power Screw, which protects the Power Screw and its lubricant from environmental contamination. In addition, bellows, outer sliding tube (184), boots, sliding tubes or protection systems can be added for a better protection of the Power Screw. In some cases, a lubrication system is used and a lubricant tank (107) is included inside or outside the column. When heavy loads press the Drive System, the risk is either to see the Power Screw buckle or the Longitudinally Travelling Nut go out of alignment with the Power Screw. Systems can keep the Drive System in line, for instance a rigid system like a rail, a beam, a profile connected to both ends of the Canopy Deck in order to be properly aligned with the loads: connecting the Longitudinally Travelling Nut to it and allowing the nut to slide along it ensures the nut remains in line. But the example of embodiment described here is a very simple one. Two tubes, for example steel tubes, are made to slide like a telescopic system. A Sliding Tube (98) slides inside a fixed tube, also referred to as Fixed Tube or FXTU (99), which allows the Drive System as a whole to extend or retract. The Sliding Tube is connected to the Canopy Deck via Drive Lugs and the Fixed Tube is connected to the column. In some embodiments, the Sliding Tube and the Fixed Tube have a tight fit so the Fixed Tube guides the Sliding Tube and prevents the Sliding Tube and its Longitudinally Travelling Nut from going out of alignment with the Power Screw longitudinal axis. In some embodiments, this tight guidance is achieved by the Sliding Tube overlapping the Fixed Tube several inches even at the maximum Drive System extension, which keeps the two tubes aligned. It will be understood that in some embodiments the Sliding Tube and Fixed Tube roles are reversed with the sliding tube going outside the fixed tube.

The Power Screw is prevented from moving along its longitudinal axis, and perpendicularly to it, by a Power Screw Collar System, also referred to as PSCSY which is inserted in a Collar Housing Component, also referred to as CHC (100). The Fixed Tube (99) is connected to the Collar Housing Component. When an effort is applied to the Canopy Deck, it is transmitted by the Power Screw to the column via the Collar Housing Component and the Power Screw Collar System. In some embodiments, the Drive System needs to rotate to follow the Deck Frame Lug's circular path. Some Collar Housing Components and Power Screw Collar Systems allow single or dual axis rotations. In the example embodiment of this figure, the Collar Housing Component is connected to the column by a Rotation Enabling Connection. It will be understood that this Collar Housing Component may be designed and fabricated in multiple ways depending on the materials, cost and industrial machinery used. This set of figures illustrate an example embodiment that is relatively easy and economical to fabricate by using assembled plates and simple material. In some embodiments, the Collar Housing Component may be a machined part with a different design, or it may use machined parts for example designed to allow some degree of flexibility or rotation while holding the Power Screw and allowing it to spin, which may reduce or eliminate the need for the Collar Housing Component to be articulated.

In this example embodiment, the Collar Housing Component includes an upper plate (101), which is connected to the lower plate (102) using bolts (103) or other means. Lugs connected to the column, also referred to as Column Lugs or CLLUs (105), attach the Collar Housing Component to the column or Upper Supporting Column (27) via Pins (104) going through the Column Lug and blocks part of the Collar Housing Component. Bearing material may be used around the Pin to provide smooth movements and between the plates (101, 102) and the Column Lugs (105). Connected to the lower plate (102) is a motor (80) or a gearbox (83) connected to a motor (80). A Power Screw Collar System is located in the Collar Housing Component between the Collar Housing Component plates (101, 102). The Canopy Deck's loads travel from the Deck Frame Lug to the Drive Lug to the Sliding Tube to the Power Screw Collar System to the Collar Housing Component to the Column Lug to the column. When the motor turns and spins the Power Screw, the Longitudinally Travelling Nut (106) is pushed or pulled upwards or downwards, which drives the Sliding Tube (98) to slide along the Fixed Tube (99), either extending the telescopic Drive System or retracting it. As a result, the distance between the Column Lugs (105) and the Deck Frame Lug (96) is increased or reduced. The Canopy Deck is pushed upwards or downwards and, as it is hinged by its Pin (88), tilts one way or the other.

In some embodiments, the Modular Unit includes a temporary locking system (108). For example when the Drive System is not present or not properly working, a temporary drive is installed either on the same side as the regular Drive System, possibly using the same attachment systems, or elsewhere on the Modular Unit. In this example embodiment, one or more Deck Frame Lugs (96) is installed on the Canopy Deck and an embodiment of Column Lug is installed on the column. When the Canopy Deck needs to be locked, a temporary drive (108) or holding device can be installed to secure the Canopy Deck. In this example, the temporary holding device has a fixed length or a telescopic arm, it has lugs on both ends and connects using Pins to the lugs provided both on the column and the Cross Beam or Deck Frame. This temporary holding device can be a simple beam, or a more sophisticated adjustable length device, or it can be a complete Drive System. The Canopy Deck can also be temporarily locked or moved using cables on one or more sides. In some embodiments, the lugs and attachment systems are available on both sides of the column. In this case, if the Drive System needs to be replaced, the maintenance team can install the new Drive System on the unused side and then remove the Drive System to be replaced.

Sensors (52), cameras (109) or accessories may be installed on or in the column, Cross Beam, Deck Frame or Canopy Deck. Electrical cables (12), signal cables or hoses may run inside or outside the column.

In embodiments where the Canopy Deck tilts either automatically or with manual control, it is useful to know both what angle the user wants the Canopy Deck to be at and what angle it is at (this would be true for movements other than rotation as well). In order to measure the current angle (110), the Drive System's electronic controller uses measurement sensors, like an inclinometer (111) affixed to the Canopy Deck and compares the angle reading with the desired angle. Other angle measuring systems or distance measuring systems can be used in some embodiments. In other embodiments, encoders, absolute encoders, pulse generators, or other rotation measurements systems are connected to the motor, the Power Screw, the gear box or other rotating parts, and allow to calculate the number of revolutions or the angle the Power Screw or the Canopy Deck has made. The computer can then calculate if the angle or position reached by Canopy Deck needs to be modified and order the motor to turn until the desired position has been reached. Limit switches, proximity sensors or other limit systems may be added to electrically power off the motor if for some reason the rotation was from going beyond the preset limits, or to inform the controller than a predefined position has been reached. Limit switches, proximity sensors, or other position detection devices can be used either, or both, to limit the range of movement or to inform the computer of the current position. In some embodiments, these devices are used as a homing system. When the computer needs to reset its angle or movement measurement or information, it uses the Drive System to push the Canopy Deck until it reaches the point the detection devices have been set to detect. It then knows this point is its home, or zero point, from which it can calculate its next movements. In some embodiments, the Canopy Deck systematically goes to its home position once a day, or when needed, in order to reset the position information and calculation.

In some embodiments, the Modular Unit or the Drive System include one or more cameras (109) or vision sensor or systems, which can be used for multiple purposes, for instance surveillance, parking monitoring, computer vision based intelligent applications, etc., but can also be used to calculate or check the Canopy Deck or other components position or angle. In some cases, graphic signs or patterns are added to the Modular Unit in order to facilitate the camera's images interpretation. In some embodiments, thermal sensors, radars or other position reading systems can be used for the same purpose or for other purposes. In some embodiments, the computer reads one Canopy Deck positioning information, or one information per moving component if there are several, but in other embodiments the computer may read or use several sources of information for instance inclinometer, encoder, computer vision or other systems, alternatively or combined.

Figure 12:
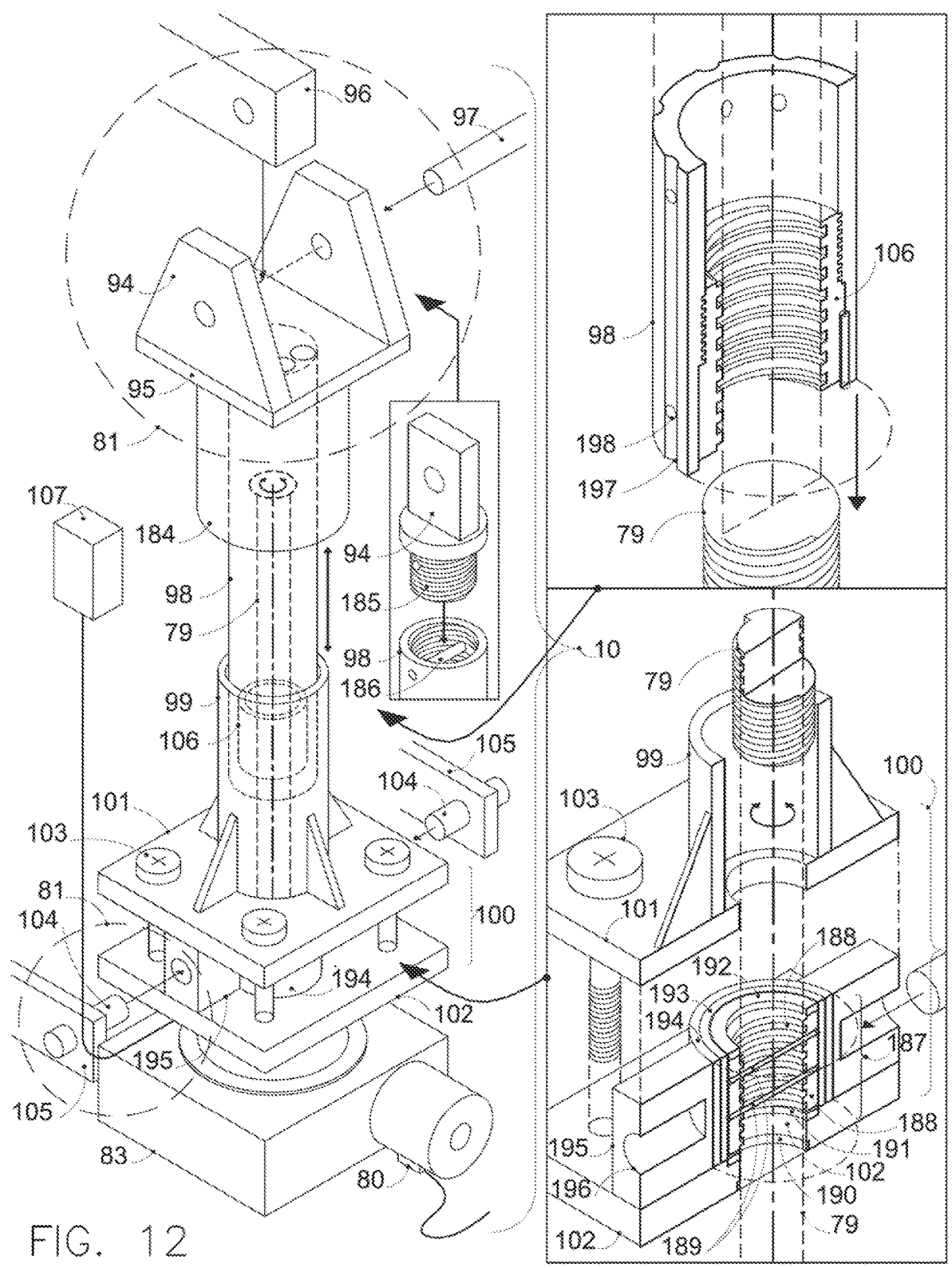
FIG. 12 illustrates an embodiment of a drive and control system for a Canopy Deck or other systems.

FIG. 12 illustrates an example embodiment of drive and control system (10) for Canopy Deck or other systems. This description also refers to elements described in other figures. In some cases, elements from this figure and other figures can be combined together. This is a general exploded isometric view with exploded details.

In this example of embodiment, a Drive System (10) connects a column to a Deck Frame Lug (96) attached to a Deck Frame via a Drive System Connection (81). The Drive System Connection includes a Deck Frame Lug (96), two Drive Lugs (94) by a Pin (97) or other systems. The Drive Lug (94) is connected to the Sliding Tube (98) via a plate (95) welded to the Sliding Tube (98), or in another example of embodiment it has a thread (185) and it is screwed to the Sliding Tube (98) and locked using pins (186) or set screws. In this embodiment, the Drive System Connections (81) have Pins parallel to the axis of rotation. A motor (80) or a motor with a gearbox (83) spins a Power Screw or Self-Locking Power Screw (79) and a Longitudinally Travelling Nut (106) travels along the Power Screw longitudinal axis. The Longitudinally Travelling Nut (106) is affixed to the Sliding Tube (98). In this embodiment, the Longitudinally Travelling Nut is screwed inside the Sliding Tube. In some embodiments, the Power Screw is in steel and the Longitudinally Travelling Nut in bronze, but other materials are possible.

The Sliding Tube (98), driven by the Longitudinally Travelling Nut (106), slides inside the Fixed Tube (99). The two sliding tubes have a tight fit, and they always overlap in order for the Fixed Tube (99) to guide the Sliding Tube so it remains aligned with the Power Screw axis. Attached to the Sliding Tube is a flexible bellow, a boot or a sliding protective tube (184) hides the Power Screw and the Sliding Tube and protects them from contamination, including when the Drive System extends.

The Power Screw spins but does not move. It is held in place by the Power Screw Collar System (187), which is held inside a Collar Housing Component (100) connected to the column. In some embodiments of the invention, the Power Screw-based Drive System uses traditional bearings for example ball bearings, needle bearings, thrust bearings or other types of bearings to hold the sometimes journaled Power Screw and transfer the loads to the column. However, these widely used industrial type systems are often designed for high speed/low loads applications and they may require precision machining, lubrication and maintenance. In some embodiments, a Drive System for sun-tracking Modular Unit has opposite requirements, namely, very high loads (although only high in case of exceptional storms) and very low speed while lubrication is not always possible. The Power Screw Collar System (187) described in these embodiments is completely different and requires less machining. A nut is screwed on and affixed to the Power Screw (79) so it spins with the Power Screw. This nut will be referred to as the Spinning Nut, or SPNT (188). As it does not move relatively to the Power Screw, there is no risk of galling and it can be made of the same material as the Power Screw, for example steel, or any other material. The Spinning Nut (188) is screwed on the Power Screw and united to it by any efficient means. In this figure, the Spinning Nut and the Power Screw are united by set screws or pins (189). The Power Screw and Spinning Nut spin together and can be kept in place, perpendicularly to their axis of rotation by many means. For example the Power Screw goes through round bearings (190) maintained by the Collar Housing Component (100). In some cases, a round bearing (193) is around the outer face of a round Spinning Nut. The loads parallel to the Power Screw axis are collected by thrust bearings or thrust washers below (191) and above (192) the Spinning Nut and transmitted to the Collar Housing Component (100). When the Power Screw and the Spinning Nut spin and receive a load, the Spinning Nut presses against the thrust washers and cannot move. Using such a washer system creates a much larger contact area, it may be the whole Spinning Nut area, than traditional thrust bearing systems which rely on the small contact areas of a journaled shaft. Using a larger area of contact allows in some cases to use bearing materials that accept less pressure, such as low friction bearing material or self-lubricating material such as bronze with embedded oil, which in some cases removes the need for lubrication and on-site maintenance of the Power Screw Collar System. A nut to Power Screw connection is strong and rated, and many years will pass before any wear is noticeable on the nut's rubbing upper and lower surfaces, which makes it a simple and reliable solution. The Collar Housing Component (100) is basically a block in which a cylindrical hole has been created and which is connected to a supporting structure, the column in this example, either with a fixed connection or Rotation Enabling Connection as in this example. The block can be made up of several components, or can be cast, machined or fabricated in any way. The Collar Housing Component (100) and Power Screw Collar System (187) just described are designed to hold the Power Screw tight and allow for no movement or rotation except for the Power Screw spin. But, in some other embodiments, they could be designed and fabricated to allow some degree of rotation in order to solve the aforementioned issues of one or two axis rotation enabling Drive System to column or Drive System to Canopy Deck connections.

In this example embodiment, the Collar Housing Component includes a Collar Housing Component Tube (194) which house the Spinning Nut (188) and its possible round bearing (193). Below and above the Collar Housing Component Tube (194) are a top plate (101) and a lower plate (102) which are connected by bolts (103), or can be welded, screwed, or connected any other way. On the sides on the Collar Housing Component Tube (194) are affixed two Collar Housing Component Blocks (195), which are used for creating the Rotation Enabling Connection between the Collar Housing Component (100) and the Column Lug (105). Many embodiments of Rotation Enabling Connection are possible. In this example, a hole is drilled in the Collar Housing Component block and a Pin (104) goes through the hole (196) in the Column Lug and the hole in the Collar Housing Component Block, which allows the Collar Housing Component to turn around the Pin's axis without turning around the Power Screw axis. In some cases, a bolt is used in lieu of this pin and is screwed into the threaded hole in the Collar Housing Component Block. In some cases, the Collar Housing Component is supported by two symmetrical Pins (104) in order to create a balanced connection to the column. A mono pin connection or a two-axis connection may be created too.

The motor (80) and/or gear box (83) is attached to the Collar Housing Component and in some cases the Power Screw is machined and becomes the motor shaft. In some cases, a separate shaft is used to transmit power between the motor and the Power Screw. In some cases, as in this figure, the motor is aligned with the Power Screw. In some cases, it is not.

In some embodiments, the Longitudinally Travelling Nut (106), the Power Screw, or the Power Screw Collar System require lubrication. The Power Screw, tubes, and Power Screw Collar System may be greased or lubricated with oil. A plug or a breather may be created at the top of the Sliding Tube or in the plate (95) to allow for refills, as well as in the Collar Housing Component in order to allow for oil change. With oil lubrication, it is possible to fill the Fixed Tube with oil in order to dip the Longitudinally Travelling Nut and the Sliding Tube in oil when the Drive System retracts but when the Sliding Tube plunges in the Fixed Tube, it may cause the oil to overflow. Two solutions are illustrated in this figure. The Fixed Tube or the Collar Housing Component is connected to an oil tank (107) working as an expansion tank. A series of grooves (197) and holes (198) made in the Sliding Tube above and below the STN allow the oil to circulate between the two tubes and provide lubrication both to the Longitudinally Travelling Nut from inside the Sliding Tube et to the outer of the Sliding Tube when it slides inside the Fixed Tube.

Figure 13:
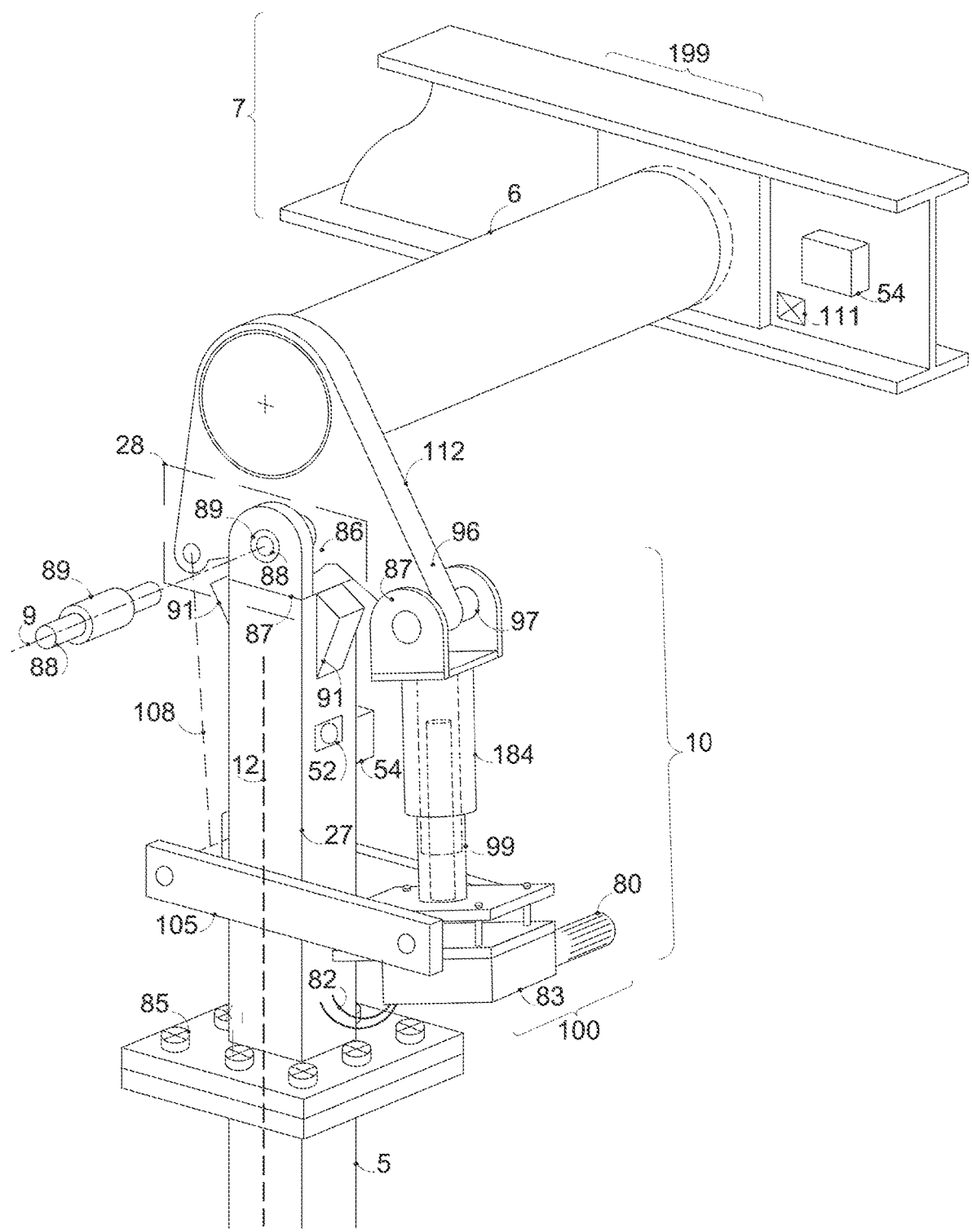
FIG. 13 illustrates an embodiment of Canopy Deck to column connection and Drive System for a Modular Unit.

FIG. 13 illustrates an embodiment of Canopy Deck to column connection and Drive System (10) for Modular Unit. This description also refers to elements described in other figures. In some cases, elements from this figure and other figures can be combined together.

In this example of embodiment, the pipe (6) extends beyond the Cross Beam (7), the column (5, 27) is connected to the pipe (6) via an Rotation Enabling Connection (81), and the Drive System, similar to that of FIG. 11 and FIG. 12 is connected to the pipe using a Pipe Arm, or PIAR (112). The Pipe Arm aims at attaching the Drive System at a distance from the axis of rotation (9) in order to create a lever that reduces the efforts on the Drive System, at strengthening the pipe's tip and enabling stopping systems. The Cross Beam (7) is connected to and carried by the pipe (6) at a distance from the column. The Cross Beam in some cases supports electrical or electronics boxes (54), components or Accessories. In embodiments with an inclinometer (111), it can be on the Cross Beam, on the pipe or on the Canopy Deck. The Cross Beam can be connected to the pipe in several ways. A central portion (199) of the Cross Beam can be welded or bolted to the pipe in the shop and the rest of the Cross Beam is bolted or hinged on it. The pipe (6), using a connection plate, may be bolted or connected to the sides of the Cross Beam. In some cases, the portion of the pipe beyond the Cross Beam can part of a pre-fabricated connection assembly including the Upper Supporting Column (27), the Drive System (10), their mechanical and electrical connections, in some cases their electronic boxes and accessories, that is very easy to install on site.

In this embodiment, the pipe (6) is connected to the Upper Supporting Column (27) by a an embodiment of Rotation Enabling Connection (28) in which a Rotating Lug (86) attached to the pipe (6) is connected by a Pin (88) to two Fixed Lugs (87), although in some cases, two Fixed Lug are connected to one Rotating Lug. In this embodiment, the Pipe Arm and the Rotating Lug may be connected or they may be one piece and their lower part is in some embodiments designed to hit a Stop Block (91) when the Canopy Deck's maximum rotation angle is reached.

The Pipe Arm (112) is attached to the pipe and extends to one or more side of the pipe to provide Deck Frame Lug (96) for the Drive System (10). In some cases, the same is true on both sides of the pipe, which allows to have several Drive Systems or space for a possible temporary locking system (108). The Pipe Arm length, or its extension out of the pipe, determines the distance between the pipe axis, which is some embodiments is the Canopy Deck's axis of rotation (9) and in some embodiments is not. In some embodiments, the attachment point is very close to the pipe, or even integrated with the pipe, and in some embodiments it is away from the pipe and creates a longer lever. In heavy load embodiments, the Pipe Arm has to transmit large efforts and needs to be designed accordingly. The Pipe Arm can be a beam or structural member connected to the pipe, or going through the pipe for more strength and connected on both sides of the pipe, or it can use a cap plate connected to the tip of the pipe, or it can have any design. In the embodiment of this figure, it is a beam or a made-up beam that is welded or bolted to the pipe or to the round cap plate that is welded or bolted at the pipe's tip. In this example of embodiment, the Pipe Arm is part of an assembly that wraps around the pipe and is connected to it in order to better transfer the loads to the pipe.

Figure 14:
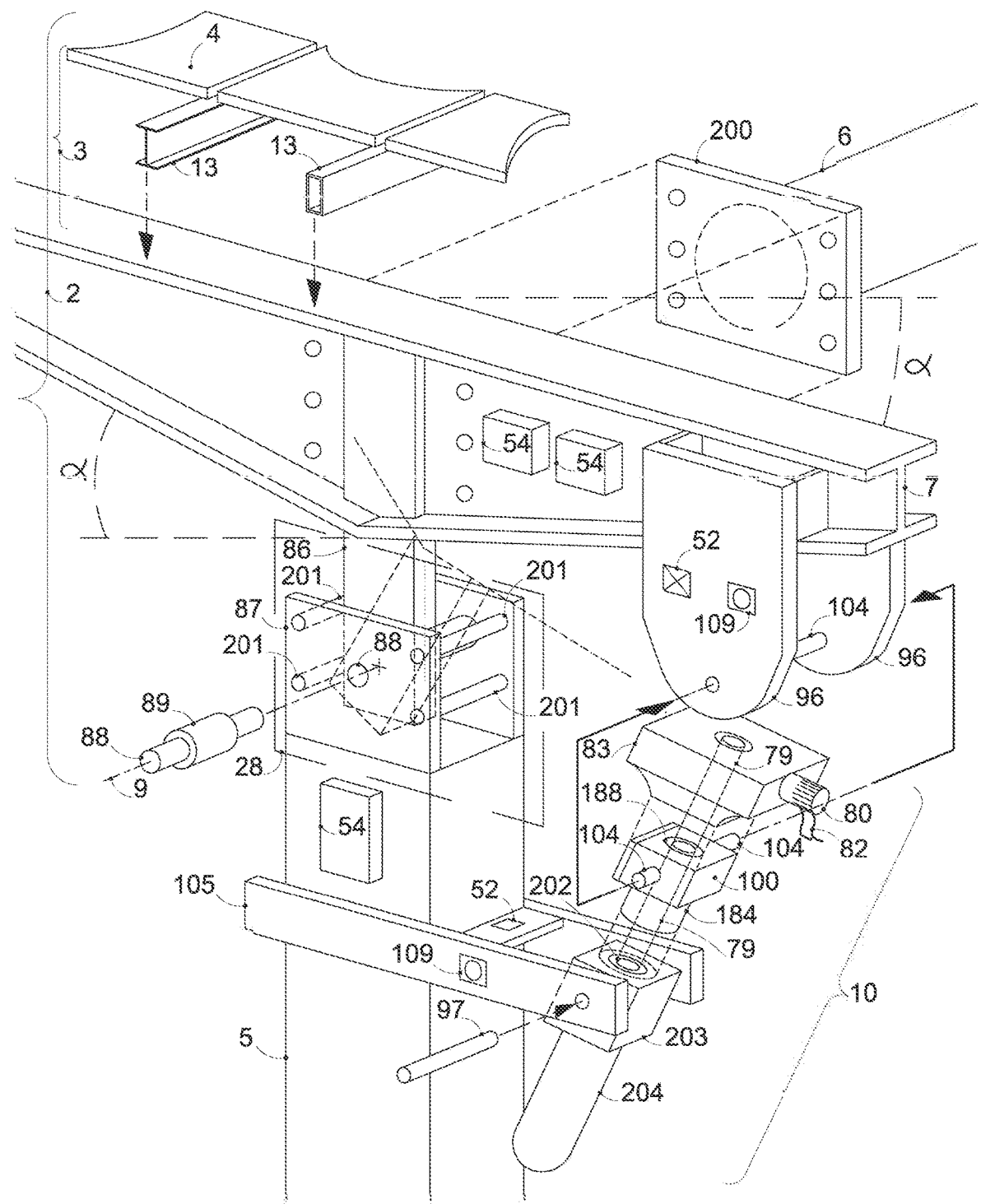
FIG. 14 illustrates an embodiment of Canopy Deck to column connection and Drive System for a Modular Unit.

FIG. 14 illustrates an embodiment of Canopy Deck to column connection and Drive System (10) for Modular Unit. This description also refers to elements described in other figures. In some cases, elements from this figure and other figures can be combined together. This is a general exploded isometric view with exploded details. Some of the components used in this embodiment are described with more details in other figures and vice-versa.

In this example embodiment, a Canopy Deck (2) is connected to a column (5) using an embodiment of Rotation Enabling Connection (28). The Canopy Deck includes Upper Blocks (3), which include panels (4) and Upper Block Supporting Members (13) attached to the Cross Beam (7). A pipe (6) is bolted to the Cross Beam using a connection plate (200). For this embodiment to be compatible with erection methods like those illustrated in FIG. 10, the Rotation Enabling Connection (28), at the time of erection, allows the Canopy Deck to tilt up to 90 degrees so it can come parallel to the column (5). This embodiment can also be used with the erection methods of FIG. 1 and FIG. 8 as it allows completing the Canopy Deck off-location and lifting it to its final location on top of the column, and connecting it simply by inserting the Rotation Enabling Connection's Pin (88) possibly with a bearing (89), in the Rotation Enabling Connection's (28) Rotating Lug (86) and the column's Fixed Lugs (87) and attaching the Drive System (10). In this embodiment, the Canopy Deck is blocked from tilting over limit by four rods (201) inserted in Fixed Lug holes. The Rotating Lug (86) is strongly connected to the Cross Beam (7) and extends beyond the axis of rotation (9). When the Canopy Deck tilts, the Rotating Lug (86) pivots around the Pin (88) until its opposite sides hit two of the four Stop Rods (201). The four Stop Rods (201) are placed symmetrically relatively to the Pin (88) so that the Rotating Lug (86) hits in the same time one upper Stop Rod, for example on the right, and one lower Stop Rod, for example on the left. This way, the Canopy Deck can be stopped without creating any additional effort in the Pin. The four Stop Rods may be replaced with plates, profiles or any other system able to stop the Rotating Lug rotation. The Stop Rods can be removable. They may be removed during the erection if a wide Canopy Deck rotation is needed, and inserted once the erection no longer requires a wide rotation.

The Column Lug (105), in some cases, is removable. In some embodiments, it may be used as a supporting leg during the erection operation of FIG. 10 or it may need to be removed to allow for the Canopy Deck to fold on the column side. In some embodiments, it includes Accessories such as sensors (52) or cameras (109). The Deck Frame Lug (96) may also be removable for the same reasons as the Column Lug. They both may be made of several parts in order to grab the Drive System (10) from both sides. When the Column Lugs or the Deck Frame Lugs are removable, they may come as part of the Drive System (10) assembly at the time of installation.

This embodiment of Drive System (10) is similar to that of FIG. 11 and FIG. 12 but works the opposite way. The motor (80) and gear box (83) are on top, as are the Collar Housing Component (100) containing the Power Screw Collar System and the Spinning Nut (188). In this embodiment, there is no Longitudinally Travelling Nut. It is replaced by a Fixed Nut, also referred to as Fixed Nut (202), located in the Fixed Nut Housing also referred to as Fixed Nut Housing (203). When the motor (80) spins the Power Screw (79), the Power Screw is held united to the Canopy Deck side by the Spinning Nut, Power Screw Collar System and Collar Housing Component and it pushes or pulls the Fixed Nut, which cannot move as it is held in place by the Fixed Nut Housing (203). Therefore, the Power Screw moves up and down and pushes or pulls the Canopy Deck. When the Drive System retracts, the Power Screw travels beyond the Fixed Nut and in some embodiments dips in the lubricant contained in a mobile oil tank (204). When the Drive System extends, the Power Screw travels out of the mobile oil tank (204) and lubricates the Fixed Nut. A bellow, boot or tube (184) can be used to cover and protect the screw when the Drive System extends. The mobile oil tank can be united to the Fixed Nut Housing and rotate when the Drive System does, or it can be fixed. In some embodiments, such Drive Systems are partly or completely hidden or integrated into the column or other structures and the oil tank may be completely hidden in the column. In this example, a one axis Drive System rotation is enabled as the Collar Housing Component (100) is connected to the Deck Frame Lug (96) by one or two Pins (104) and as the Fixed Nut Housing (203) is connected to the Column Lugs (105) by two Pins (97). As for other figures, the components may be machined or designed differently and the two axis rotations or flexibility may be added in some embodiments.

Figure 15:
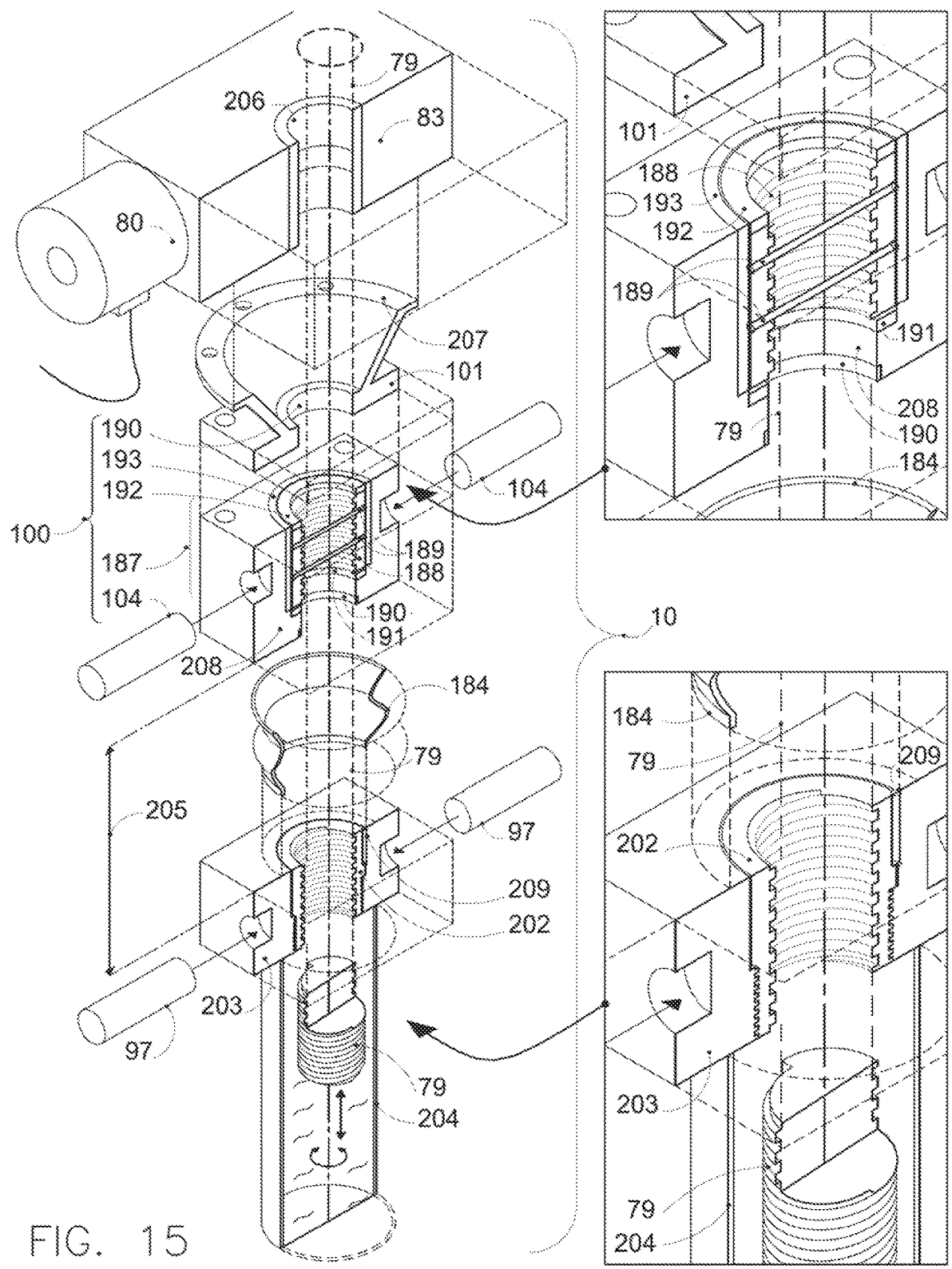
FIG. 15 illustrates an embodiment of a drive and control system for a Canopy Deck or other systems.

FIG. 15 illustrates an example of embodiment of Drive System (10) based on the embodiment of Drive System illustrated in FIG. 14. This description also refers to elements described in other figures. In some cases, elements from this figure and other figures can be combined together. This is a general exploded isometric section with exploded details A motor (80), or a motor plus a gear box (83) spins a Power Screw (79). The motor or gearmotor assembly is either attached to the Collar Housing Component (100) using an ad-hoc flange (207), moves with the Drive System, and in some cases, as in this figure, the Power Screw is machined into a shaft passing through the motor bore (206), or a power transmission system is placed between the Power Screw and the motor or in some cases the motor is not attached to any Drive System dependent structure. A Spinning Nut (188) is united to the Power Screw. In the figure, Pins (189) going both through the Spinning Nut (188) and the Power Screw threads are used but it can be done in many ways, such as for example set screws, glue, mechanical bonding, etc. The Spinning Nut turns with the Power Screw. The Power Screw goes through the Collar Housing Component (100) and radial bearings (190) keep it aligned. In some cases, a round bearing (193) is around the outer face of the spinning nut. A Power Screw Collar System (187) is created inside the Collar Housing Component. The Spinning Nut (188) is locked between lower (191) and upper (192) thrust washers. Therefore, the Power Screw can spin but cannot move longitudinally nor transversally. All of the load is transmitted to the Collar Housing Component via the thrust washers. As the Power Screw rotation is very slow, such a system may not need lubrication if low friction and self-lubricating bearing material is used as in this figure, but lubricated options also exist. The Power Screw Collar System (187) is locked inside the Collar Housing Component, between the Collar Housing Component's lower (208) and upper (101) walls or plates once the Collar Housing Component is closed and bolted. The Collar Housing Component is hinged to the Deck Frame Lug (96) but one Pin (104) on each side, which allows it to rotate around an axis perpendicular to the axis of rotation. In this example, a one axis drive system rotation is enabled as the Collar Housing Component (100) is connected to the Desk Frame Lug (96) by one or two Pins (104). Also, the pins (189) and (209) are one example of the ways to lock the nuts. Set screws, glue or other methods can be used additionally or alternatively.

The Power Screw extends from the Collar Housing Component to the Fixed Nut (202) which is united to a housing Fixed Nut Housing (203), which can also rotate around an axis perpendicular to the axis of rotation using two Pins (97) going through the Column Lugs. The Fixed Nut cannot turn with the Power Screw as it is affixed to or screwed in the Fixed Nut Housing and locked by Pins (209). When the Power Screw turns, the Fixed Nut travels longitudinally to increase or decrease the distance (205) between the Collar Housing Component (100) and the Fixed Nut (203). The Fixed Nut cannot move but the Collar Housing Component can push or pull the Deck Frame Lug it is attached to, which causes the Canopy Deck to tilt or to stay put if the motor is not turning the Power Screw. In some embodiments, the Power Screw might be visible in the variable space between the Collar Housing Component and the Fixed Nut Housing and could be subject to environmental contamination, particularly if the Power Screw is greased or lubricated, which would reduce its life expectancy. Therefore, a bellow or protective Power Screw cover (184) can be added. In some cases, an oil tank (204) is available beyond the Fixed Nut Housing and the Power Screw dips in lubricant when it travels to shorten the Drive System and lubricates the Fixed Nut when it travels back up.

Figure 16:
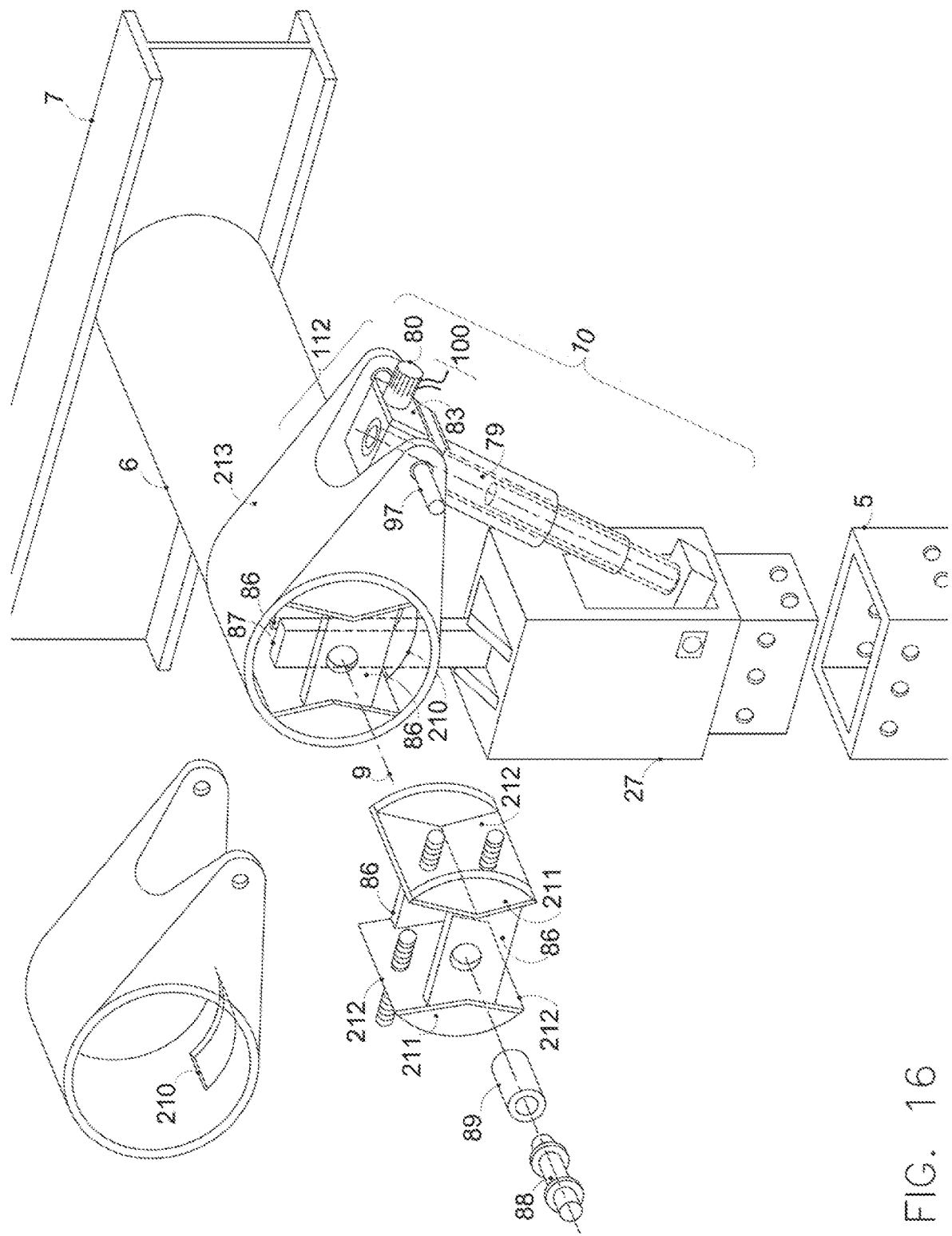
FIG. 16 illustrates an embodiment of a Canopy Deck to column connection and Drive System for a Modular Unit.

FIG. 16 illustrates an embodiment of Canopy Deck to column connection and Drive System (10) for Modular Unit. This description also refers to elements described in other figures. In some cases, elements from this figure and other figures can be combined together. This is a general exploded isometric view with exploded details. Some of the components used in this embodiment are described with more details in other figures and vice-versa.

This example has a pipe (6) to Upper Supporting Column (27) like in FIG. 13 but in this case the axis of rotation (9) is the center of the pipe, the Drive System (10) is a version of the one of FIG. 15 and the column (5) to Upper Supporting Column (27) is different, as is the blocking system. In this embodiment, the bottom of the Upper Supporting Column (27) has a reduced size so it fits perfectly inside the column's top and is bolted or welded to it. On top of the Upper Supporting Column (27) is a Fixed Lug (87) that includes a center hole designed to house the pipe's (6) supporting Pin (88) located at the axis of rotation (9), which in some cases is also the pipe's center. The Fixed Lug (87) rises through a slit (210) created in the pipe (6). Two Rotating Lugs (86) are affixed inside the pipe's tip. The pipe, and with it, in some cases, all the Canopy Deck, is moved down to the top of the Upper Supporting Column so the Fixed Lug (87) slips inside the pipe between the two Rotating Lugs (86), the Pin goes through the holes of the Rotating Lugs and Fixed Lug and the Canopy Deck is supported by the Upper Supporting Column. Bearings plates or washers can be added between the lugs.

Two triangular prisms (211) including plates (212) placed at an angle on both sides of the Pin (88) and symmetrically relatively to the Fixed Lug act as Stop Blocks to prevent the Canopy Deck from rotating beyond the permitted range. When the angle is reached, the Fixed Lug hits in the same time the lower left and upper right plates, or the lower right and upper left plates, which blocks the rotation without bringing any effort in the Pin.

This figure illustrates another embodiment of Pipe Arm (112), which has a fork, or is made of two arms or lugs connected together, in order to reach the two sides of the Collar Housing Component (100), Gearbox (83) or motor (80) and to hold them using Pins (97). The Pipe Arm is a made-up beam, or it could also use regular beams, which is both welded or bolted to the pipe (6) and which in some cases has a plate or tube (213) which wraps around at least a part of the pipe's circumference, or that wraps completely around the pipe and connects both the Pipe Arm's top and bottom in order to create a strong connection between the Pipe Arm and the pipe.

The Drive System (10) is partly or entirely hidden or integrated into the column or Upper Supporting Column (27). It extends or retracts to push or pull the Canopy Deck.

Different connections and different drive systems may be designed by different engineers. Although the system uses hinges, rotulas, and connections, other solutions are possible.

One invention may include a tilting canopy. Another invention may include an Upper Block. Another invention may include a modular canopy. Another invention may include a method using prefabrication before erection. Another invention may include a foldable deck frame. Another invention may include the split column. Another invention may include a lifting process. Another invention may include a power screw and nut combination where one is travelling and one is fixed. Another invention may include the user of a self-locking screw. Another invention may include a system that is not necessarily a carport and not necessarily solar. It can be a new kind of building. Another invention may include a drive that controls a rotating roof by controlling the distance between a fixed structure and a point of the turning roof. They may come with cables or chains or 4' diameter gears, which is often impractical but possible. The drive can have rotation enabling joints. One could engineer the flexibility on the nut without hinges at the drive tips. A roof can have several drives. The drive uses a screw, which may cover if hydraulic, actuator or other options.

The foregoing description of the preferred embodiments of the present invention is by way of example only, and other variations and modifications of the above-described embodiments and methods are possible in light of the foregoing teaching. The embodiments described herein are not intended to be exhaustive or limiting. The present invention is limited only by the following claims.

The invention claimed is:

1. A solar tracking carport, comprising:
a supporting structure including at least two columns;
a three-dimensionally rigid canopy deck having a deck length in a deck longitudinal direction from a first edge to a second edge and having a deck width, the three-dimensionally rigid canopy deck including
at least one solar panel;
a deck frame configured to support the at least one solar panel, the deck frame including a load transmitting structure extending substantially across the deck width of the three dimensionally rigid canopy deck, the deck frame having only one axis of rotation positioned substantially centrally between the first edge and the second edge and defining a first canopy deck portion and a second canopy deck portion, the first canopy deck portion configured to be disposed over a first parking spot, the second canopy deck portion configured to be disposed over a second parking spot;
a rotation enabling connection configured to rotatably connect the three-dimensionally rigid canopy deck to the at least two columns of the supporting structure;
a first drive system configured to control tilting of the three-dimensionally rigid canopy deck about the one axis of rotation to a programmatically set first maximum angle in a first direction and to a programmatically set second maximum angle in a second direction, the programmatically set first maximum angle preventing the first edge of the three-dimensionally rigid canopy deck from going above or below a first threshold height, the programmatically set second maximum angle preventing the second edge of the three-dimensionally rigid canopy deck from going above or below a second threshold height; and
at least one switch or sensor configured to generate a signal when the three-dimensionally rigid canopy deck is at a third maximum angle in the first direction beyond the programmatically set first maximum angle but below a first physical threshold or at a fourth maximum angle in the second direction beyond the programmatically set second maximum angle but below a second physical threshold, the signal being used to inform a controller of a danger condition that the first drive system has exceeded a programmatic angle limit of the three-dimensionally rigid canopy deck.

2. The carport of claim 1, wherein the first drive system includes at least two upper supporting column portions configured to couple to the at least two columns.

3. The carport of claim 1, wherein the deck frame includes at least two cross beams or at least two longitudinal beams.

4. The carport of claim 1, wherein the three-dimensionally rigid canopy deck includes one or more upper blocks, each of the upper blocks having a block longitudinal direction and being rigid at least in the block longitudinal direction, each of the upper blocks including the at least one solar panel, and wherein the deck frame is configured to support the one or more upper blocks.

5. The carport of claim 4, wherein each of the one or more upper blocks includes at least two upper block supporting members and at least two transverse members.

6. The carport of claim 4, wherein each of the one or more upper blocks includes supporting points configured to couple to a crane.

7. The carport of claim 1, further comprising a torque transmitting member extending substantially across the deck width of the three dimensionally rigid canopy deck and along the one axis of rotation, wherein the torque transmitting structure includes a pipe, a tube, a beam or a truss.

8. The carport of claim 7, wherein the rotation enabling connection includes at least one pipe arm.

9. The carport of claim 8, wherein the first drive system is coupled to the at least one pipe arm.

10. The carport of claim 1, wherein the deck frame is foldable.

11. The carport of claim 1, wherein the first drive system includes a self-locking screw.

12. The carport of claim 1, wherein the first drive system includes a power screw and a nut, and wherein one of the power screw and the nut is configured to travel and the other of the power screw and the nut is not configured to travel.

13. The carport of claim 1, wherein the rotation enabling connection includes at least one lug coupled to the deck frame.

14. The carport of claim 1, further comprising a control system configured to control the first drive system.

15. The carport of claim 14, further comprising a user interface configured to enable a user to configure the control system.

16. The carport of claim 14, further comprising sensors configured to sense environmental factors or system conditions.

17. The carport of claim 16, wherein the control system is configured to park the three-dimensionally rigid canopy deck in a predetermined position based on the environmental factors.

18. The carport of claim 16, wherein the control system is configured to recalibrate the system in response to a trigger condition.

19. The carport of claim 18, wherein the trigger condition includes passage of a set time period.

20. The carport of claim 1, wherein the carport is modular.

21. The carport of claim 1, further comprising a second drive system synchronized with the first drive system.

22. The carport of claim 1, wherein each of the at least two columns including at least one articulated joint.

* * * * *